(12) United States Patent
Kishida et al.

(10) Patent No.: US 7,468,169 B2
(45) Date of Patent: Dec. 23, 2008

(54) PROCESS FOR PRODUCING CALCIUM TRISULFOALUMINATE AND APPARATUS FOR USE IN SAID PROCESS

(75) Inventors: Takayuki Kishida, Hyogo (JP); Yuichi Ogawa, Hyogo (JP); Yoshiki Kojima, Hyogo (JP); Takuya Ono, Hyogo (JP); Kenichi Mitsui, Hyogo (JP); Tetsuya Hirabayashi, Hyogo (JP); Masaki Nakano, Hyogo (JP)

(73) Assignee: OJI Paper Co., Ltd., Tokyo (JP)

( * ) Notice: Subject to any disclaimer, the term of this patent is extended or adjusted under 35 U.S.C. 154(b) by 0 days.

(21) Appl. No.: 11/702,017

(22) Filed: Feb. 2, 2007

(65) Prior Publication Data

US 2007/0196264 A1    Aug. 23, 2007

Related U.S. Application Data

(63) Continuation of application No. PCT/JP2005/013609, filed on Jul. 25, 2005.

(30) Foreign Application Priority Data

Aug. 4, 2004  (JP) ............................. 2004-227553
Apr. 21, 2005  (JP) ............................. 2005-123689

(51) Int. Cl.
*C01F 11/00* (2006.01)
(52) U.S. Cl. .................. 423/111; 423/155; 423/166; 423/544; 423/555; 423/625; 423/635
(58) Field of Classification Search ................ 423/111, 423/155, 166, 544, 555, 625, 635
See application file for complete search history.

(56) References Cited

U.S. PATENT DOCUMENTS 3,391,995 A    7/1968  Rosenstock et al.

(Continued)

FOREIGN PATENT DOCUMENTS

JP    S53 014692 A    2/1978

(Continued)

OTHER PUBLICATIONS

"Pigment for Coating and Filler for Paper"; Translated by Ooe, Reizaburo; Yoshimoto, Saburo; Issued on Jan. 20, 1989; pp. 183-188.

(Continued)

*Primary Examiner*—Timothy C Vanoy
(74) *Attorney, Agent, or Firm*—Alston & Bird LLP

(57) ABSTRACT

This invention provides a production process, which can stably produce high-quality satin white (calcium trisulfoaluminate) having very small and homogeneous particulate shapes suitable for incorporation into coated paper for printing, and an apparatus for use in said process. In this process for producing calcium trisulfoaluminate, a calcium hydroxide suspension (A) is reacted with an aqueous aluminum sulfate solution (B) to produce calcium trisulfoaluminate (C). The aqueous aluminum sulfate solution (B) is added in plurality of stages to the calcium hydroxide suspension (A). At least any one stage of the plurality of stages addition, addition of the aqueous aluminum sulfate solution (B) to the calcium hydroxide suspension (A) is carried out in such a manner that the aqueous aluminum sulfate solution (B) is continuously added to the calcium hydroxide suspension (A) being continuously transferred.

18 Claims, 8 Drawing Sheets

U.S. PATENT DOCUMENTS

| | | | | | |
|---|---|---|---|---|---|
| 3,992,220 | A | * | 11/1976 | Baudouin et al. | 106/467 |
| 4,002,484 | A | * | 1/1977 | Baudouin | 106/467 |
| 4,140,540 | A | * | 2/1979 | Caspar et al. | 106/461 |
| 5,562,587 | A | * | 10/1996 | Kessler et al. | 588/256 |
| 2006/0094921 | A1 | * | 5/2006 | Roper | 588/257 |

FOREIGN PATENT DOCUMENTS

| | | |
|---|---|---|
| JP | 54-34407 A | 3/1979 |
| JP | S54 34407 A | 3/1979 |
| JP | 05 163017 A | 6/1993 |
| JP | 5-163017 A | 6/1993 |

OTHER PUBLICATIONS

International Search Report corresponding to International Application No. PCT/JP2005/013609 dated Aug. 23, 2005.

* cited by examiner

PROCESS FOR PRODUCING CALCIUM TRISULFOALUMINATE AND APPARATUS FOR USE IN SAID PROCESS

RELATED APPLICATIONS

This application is a continuation of international patent application PCT/JP2005/013609, filed on Jul. 25, 2005, which in turn claims priority to Japanese Patent Application 2004-227553, filed on Aug. 4, 2004. and Japanese Patent Application 2005-123689, filed Apr. 21, 2005.

FIELD OF THE INVENTION

The present invention relates to a process for producing calcium trisulfoaluminate (general name: satin white) which may be applied to coated paper for printing and the like, and an apparatus for use in said process.

BACKGROUND OF THE INVENTION

In recent years, high quality of the coated paper for printing is more and more demanded as the printed product of fine visualization and colorization has been developed such that it becomes more and more important to have high quality in appearance of the final printed product such as print gloss and quality of white paper such as glossiness of white paper, smoothness, and whiteness.

It is known a method of adding satin white as a pigment to a pigment coating liquid used to produce coated paper for printing is a easy method of imparting high smoothness, white paper glossiness, degree of whiteness, and degree of opaqueness to the coated paper for printing. Here, satin white is a general name of a compound in the alumina complex system and has the chemical name of calcium trisulphoaluminate whose chemical formula is $3CaO.Al_2O_3.3CaSO_4.31\text{-}32H_2O$.

This satin white is available as a white pigment having a needle-like crystal structure and a satin white product having very small particulates and homogeneous particle shapes is in particular excellent for a blade coating process of coated paper for printing among such satin white products.

As a basic reaction condition in producing the satin white, a method of mixing an aqueous aluminum sulfate $Al_2(SO_4)_3$ solution with an aqueous suspension of calcium hydroxide $Ca(OH)_2$ is known (refer to non-patent reference 1). In particular, the following points in the manufacture are noted: (1) to use high-purity reactant chemicals, (2) to add an aqueous aluminum sulfate solution to an aqueous suspension of calcium hydroxide as the order of addition, and (3) to keep the molar ratio strictly in the range from 6.0 to 7.0 wherein the molar ratio is a reaction molar ratio of calcium hydroxide to aluminum sulfate: $Ca(OH)_2/Al_2(SO_4)_3$.

Therefore, it is difficult to obtain desired satin white when the reaction condition is beyond such a range, which may further cause adverse effects such as production of aluminum oxide ($Al_2O_3$) and calcium sulfate ($CaSO_4$) as by-product compounds of the satin white producing process. Thus, it is necessary to take a special care about the reaction condition in producing satin white and it is further important to control the reaction condition optimally between the calcium hydroxide and aluminum sulfate as the raw materials in order to obtain satin white having very small particulates and homogeneous particle shapes.

In the method of producing such satin white, a method of mixing the aqueous aluminum sulfate solution with the calcium hydroxide suspension and causing reaction in a batch manner is introduced (refer to patent reference 1) in addition to that explained by the above non-patent reference 1.

However, since the aqueous aluminum sulfate solution is added little by little to the calcium hydroxide suspension for a long period of time in the reaction method in the batch manner, satin white crystal particulates generated in an early stage of the reaction become larger while satin white crystal particulates generated in a late stage of the reaction cannot grow large enough and remain small. Therefore, it has been difficult to prepare homogeneous particle shapes of generated satin white particulates because differences of the reaction products are rendered in the crystal growth.

With respect to a method of producing very small and homogenous particle shapes of satin white, a preparation method for producing satin white particulates in the range from 0.1 to 2.0 μm is disclosed (refer to patent reference 2) wherein the method utilizes a continuous mixing agitator (Pipeline Homo Mixer) and comprises pouring prescribed amounts of calcium hydroxide suspension and aqueous aluminum sulfate solution into a mixer at once so as to mix and cause reaction of these materials as the mixing molar ratio ($CaO/Al_2O_3$) is kept in the range of 7.2±0.2.

On the other hand, since the reaction for producing the satin white is an acid-base reaction of the acid (aluminum sulfate) and the base (calcium hydroxide), the reaction is originally characterized by immediate and violent reaction process once both raw materials are mixed. Therefore, the satin white is formed as the reaction proceeds immediately after both raw materials are completely and homogeneously mixed at a prescribed reaction molar ratio corresponding to the point of neutralization of reaction where the reaction is completed such that both reaction raw materials are in a state ready for the reaction. In the reality, however, the aluminum sulfate as one of the reaction raw materials of the satin white is dissolved in water completely so as to be an aqueous solution and ready for the reaction whereas the calcium hydroxide as the other reaction raw material has a quite low water solubility of 0.2% and is in a state of suspension with hardly-solved calcium hydroxide such that the total amount of calcium hydroxide is not ready for the reaction.

Therefore, even if the prescribed amounts of calcium hydroxide suspension and aqueous aluminum sulfate solution corresponding to the complete reaction amounts for yielding the satin white are mixed at once as described in the patent reference 2, the reaction mixture composition temporarily lacks the calcium hydroxide necessary for the reaction as all the calcium hydroxide is not ready for the reaction with the aqueous aluminum sulfate solution due to the extremely low solubility to water, and the calcium sulfate is in excess such that the reaction condition is beyond the range for producing the satin white. Thus, the reaction does not stop at a stage for producing the satin white, but further proceeds to a stage where the reaction for yielding by-products such as aluminum oxide and calcium sulfate. Then, there is an issue that the satin white as a desired product cannot be obtained.

Therefore, in the producing method as describe in the patent reference 2, in order to control the particle shape of the satin white, a continuous mixing agitator is employed to mix the calcium hydroxide and the aluminum sulfate as the reaction raw materials at once. And the method is characterized in that the mixing molar ratio ($CaO/Al_2O_3$) of the calcium hydroxide suspension and the aqueous aluminum sulfate solution is kept in the range of 7.2±0.2, where the calcium hydroxide is in excess of the synthetic reaction, in order to avoid the calcium hydroxide deficient condition and the aluminum sulfate excess condition.

However, the reaction molar ratio $(Ca(OH)_2/Al_2(SO_4)_3)$ is 6 at the theoretical reaction end point where the synthetic reaction of the satin white is completed whereas the reaction molar ratio $(Ca(OH)_2/Al_2(SO_4)_3)$ is set to 7.2±0.2 such that the calcium hydroxide is in excess of the synthetic reaction as described in the patent reference 2. Thus, unreacted calcium hydroxide remains in the synthesized satin white such that the calcium ion $(Ca^{2+})$ is released in the satin white composition from the unreacted calcium hydroxide, which was a factor to cause insufficient dispersion of satin white and the like in a pigment coating liquid if such satin white is combined into the pigment coating liquid for producing coated paper for printing.

Therefore, in the case where the satin white was combined into a coating liquid for coated paper for printing, it was necessary to take a good care of the insufficient dispersion of the satin white such that there was an issue that excess amount of disperser for the stability must be added to the satin white dispersed liquid and that sodium hydroxide must be added to the coating liquid including the satin white so as to make the liquid in strong alkaline state to yield a higher pH (pH=12-13) in order to prevent the calcium ion $(Ca^{2+})$ from being dissolved.

Also, if the pigment coating liquid to which the satin white is added is made in such strong alkaline state, there was an issue that the coated paper for printing turned yellowish and deteriorated in the whiteness due to the strong alkaline such that the quality and marketability of the coated paper for printing were deteriorated.

In the method for producing the satin white by mixing prescribed amounts of calcium hydroxide suspension and aqueous aluminum sulfate solution at once to cause the reaction wherein the prescribed amounts corresponds to the theoretical amounts for the complete reaction yielding the satin white, as described in the patent reference 2, a method for producing the satin white by adding divided amounts of calcium hydroxide suspension and aqueous aluminum sulfate solution as the reaction raw materials in two respective stages instead in one stage is disclosed (patent reference 3). The method is a batch method wherein 30-90% of the prescribed amount of aqueous aluminum sulfate solution is added in the first stage and the rest amount of aqueous aluminum sulfate solution is added in the second stage.

However, the publication (the patent reference 3) discloses a manner that the calcium hydroxide suspension is added to the aqueous aluminum sulfate solution, which is characterized by the opposite order to that of the regular method for producing the satin white. Since the reaction molar ratio of the aluminum sulfate to the calcium hydroxide is in much excess in an early stage if such an addition order is applied, aluminum oxide and calcium sulfate as reaction by-products are formed such that it is difficult to obtain the satin white to be desired. Further, in the publication, the aqueous aluminum sulfate solution and the calcium hydroxide suspension are mixed and reacted with each other in a batch manner such that it is difficult to homogenize the particle diameters of the satin white.

Non-patent Reference 1: "Pigment for Coating and Filler for Paper" translated by Ooe, Reizaburo; Yoshimoto, Saburo; Issued on Jan. 20, 1989, pages 183-188. Published by Uni Shuppan Kabushiki Kaisha Patent Reference 1: JP-H05-163017-A Patent Reference 2: JP-S53-014692-A Patent Reference 3: U.S. Pat. No. 3,391,995

DETAILED DESCRIPTION OF THE INVENTION

Figure 1:
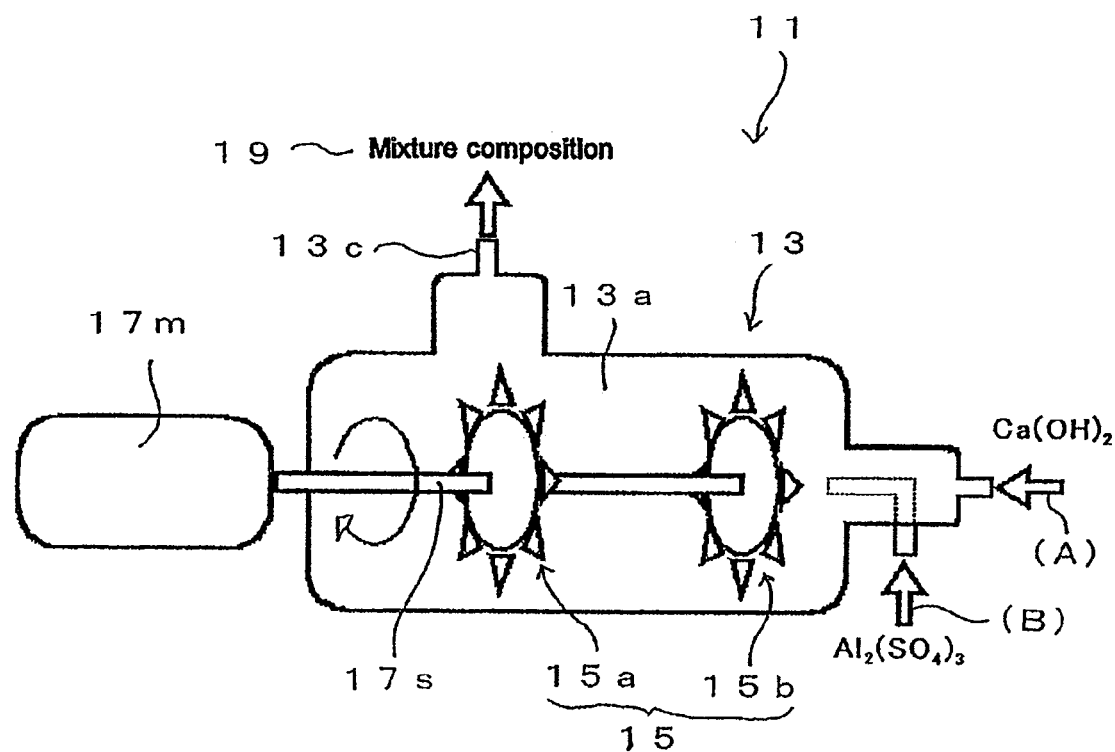
FIG. 1 is a general sectional view showing a structure of a mixing device as mixing means comprising: a PIPELINE HOMO MIXER (trademark) of Tokushu Kika Kogyo Co., Ltd.

Problems to be Solved by the Invention

As described above, the method for producing the satin white of high quality with very small particulates and homogeneous particle shapes suitable for applying to the coated paper for printing was not established in the state of art.

Here, in the present invention, it is an object to provide a method and a device therefor for producing stably a high quality of satin white (calcium trisulphoaluminate) having very small and homogeneous particle shapes.

Means for Solving the Problems

The method (hereafter referred to as "present method") for producing the satin white (calcium trisulphoaluminate) is a method for producing calcium trisulphoaluminate (C) by reacting calcium hydroxide suspension (A) with aqueous aluminum sulfate solution (B), more specifically, by adding the aqueous aluminum sulfate solution (B) to the calcium hydroxide suspension (A) in a plurality of stages wherein at least one of the additions in the respective plurality of stages is conducted by adding the aqueous aluminum sulfate solution (B) continuously to the calcium hydroxide suspension (A) being transferred continuously.

Also, in the present method, the at least one of the additions may comprise a continuous addition in the first stage (hereafter referred to as "continuous addition method in the first stage").

And, in the continuous addition method in the first stage, the at least one of the additions may be applied in all of the plurality stages except the last stage.

Further, in the present method, a subsequent addition, which may be conducted in the second or later stage of the plurality of stages, may be conducted after a predetermined period of time from the addition having been conducted just before the subsequent addition (hereafter referred to as "predetermined period elapsing method").

In the predetermined period elapsing method, the predetermined period of time may be 15 or more seconds.

Also, in the present method, the subsequent addition, which may be conducted in the second or later stage of the plurality of stages, is conducted under a condition that a pH value of the composition to which the aluminum sulfate is to be added is 11.0 or higher.

And in the present method, the molar ratio (a/b) of a molar number 'a' of calcium hydroxide suspension (A) to a total molar number 'b' of added aqueous aluminum sulfate solution (B) may range from 5.5 to 8.0.

According to the present method, the aqueous aluminum sulfate solution (B) is added as much as 85% or less of the reference molar number that is one-sixth of the molar number of the calcium hydroxide suspension (A) in the first addition in the first stage of the plurality of stages, and the total molar number of the added aqueous aluminum sulfate solution (B) in both the first addition and the second addition in the second stage of the plurality of stages may be 98% or less of the reference molar number (hereafter referred to as "addition molar number limit method").

In the addition molar number limit method, the molar number of aqueous aluminum sulfate solution (B) added in the first addition in the first stage may be equal to or less than 10% of the reference molar number.

In addition molar number limit method, the number of additions in the plurality of stages may be at least three (hereafter referred to as "3-or-more-addition method").

In the 3-or-more-addition method, a pH value of the composition including the calcium trisulphoaluminate (C) being produced after all additions of the aqueous aluminum sulfate solution (B) in the plurality of stages are completed may be 12.0 or less (hereafter referred to as "low pH method").

Here, in the present invention, the composition including the calcium trisulphoaluminate (C) being produced by the low pH method is provided.

The present method may also further comprise: a dehydration process for making a dehydrated composition by dehydrating the composition including the calcium trisulphoaluminate (C) after all additions of the aqueous aluminum sulfate solution (B) in the plurality of stages are completed; and a redispersion process for making a redispersed composition in a slurry state by adding water to the dehydrated composition produced in the dehydration process (hereafter referred to as "redispersed method").

Here, in the present invention, the redispersed composition having been produced by the redispersed method such that the pH value of the composition is equal to or less than 12.0 is provided.

Also, the redispersed method may further comprise: a disperser addition process for adding a dispersion agent, before the dehydration process, to the composition including the calcium trisulphoaluminate (C) after all additions of the aqueous aluminum sulfate solution (B) in the plurality of stages are completed.

Also, the present method may further comprise: a carbon dioxide gas contact process for making the composition contact with carbon dioxide gas wherein the composition including the calcium trisulphoaluminate (C) has been produced after all additions of the aqueous aluminum sulfate solution (B) in the plurality of stages are completed.

In the present method, at least either concentration of the calcium hydroxide suspension (A) or the aqueous aluminum sulfate solution (B) may be equal to or less than 12 weight %.

In the present method, the average particle diameter of the calcium trisulphoaluminate (C) may range from 0.1 to 1.5 µm.

The device of the present invention (hereafter referred to as "present device") is utilized in the present method and may further comprise: mixing means for producing a mixture composition by agitating and mixing continuously the aqueous aluminum sulfate solution (B) being transferred continuously with the calcium hydroxide suspension (A) being transferred continuously in any of the non-last continuous additions in the plurality of stages except the last stage; an intermediate tank for accepting continuously and retaining for a predetermined period of time the mixture composition having been produced by the mixing means.

In the present device, the predetermined period of time from when the aqueous aluminum sulfate solution (B) is added in any of the additions in the plurality of stages to when the aqueous aluminum sulfate solution (B) is added again in an immediately subsequent addition process to the any of the additions may be determined to be equal to or more than 15 seconds.

In the present device, the predetermined period of time may be determined such that the pH value of the mixture composition, to which the aqueous aluminum sulfate solution (B) is added again in an immediately subsequent addition process to the any of the additions, is to be equal to or more than 11.0.

In the present device, the any of the additions may be applied to all of the non-last continuous additions in the plurality of stages except the last stage.

And, in the present device, the mixing means may comprise: a main body containing an internal space where the mixture composition of the calcium hydroxide suspension (A) and the aqueous aluminum sulfate solution (B) flows continuously; and a stirring part moving in a state that the element is in contact with the mixture composition.

Effect of the Invention

According to the manufacturing method (the present method) for producing the calcium trisulphoaluminate (general name: satin white) of the present invention, the satin white having very small and homogenous particle shapes may be stably produced.

Description of Notations
   11 mixing device
   13 main body
   13*a* internal space
   13*c* outlet
   15 stirring part
   15*a* first stirring element
   15*b* second stirring element
   17*m* drive motor
   17*s* drive shaft
   19 mixture composition
   21 mixing device
   23 main body
   23*a* internal space
   23*c* outlet
   25 stirring part
   27*m* drive motor
   27*s* drive shaft
   29 mixture composition
   31 mixing device
   33 main body
   33*a* internal space
   33*a*1 first internal space
   33*a*2 second internal space
   33*a*3 third internal space
   33*a*4 fourth internal space
   33*a*5 fifth internal space
   33*c* outlet
   34*a*, 34*b*, 34*c*, 34*d* partition plate 35 stirring part
36 aperture
37m diaphragm
37s drive shaft
38a, 38b, 38c, 38d stirring element
39 mixture composition
51a, 51b, 51c inline mixer
53a, 53b, 53c pH restoration tank
54 cushion tank
55 filter press
56 redispersion (process)
58 reaction vessel (batch type)
61 reaction vessel (batch type)
71 inline mixer Best Mode of Carrying Out the Invention (The Present Method)

The present method is a method of producing calcium trisulfoaluminate (C) (general name: satin white) by the reaction of a calcium hydroxide suspension (A) and an aqueous aluminum sulfate solution (B). The aqueous aluminum sulfate solution (B) is added in a plurality of stages to the calcium hydroxide suspension (A). In at least one of the plurality of stages for adding the aqueous aluminum sulfate solution (B) to the calcium hydroxide suspension (A), a continuous addition that the aqueous aluminum sulfate solution (B) is continuously added to the calcium hydroxide suspension (A), which is being transferred continuously, is conducted.

Here, the calcium hydroxide suspension (A) in the first addition in the first stage of the plurality of stages (prior to the actual addition of the aqueous aluminum sulfate solution) is a suspension of merely calcium hydroxide (calcium hydroxide suspension), whereas in additions in the second and later stages (after the actual addition of aqueous aluminum sulfate solution), the calcium hydroxide suspension (A) means a mixture of the calcium hydroxide suspension and the aqueous aluminum sulfate solution (i.e., a mixture in which a production reaction of satin white is being conducted).

In other words, the present method is characterized in that the amount of the aqueous aluminum sulfate solution is divided into a predetermined number of parts, which are added to the calcium hydroxide suspension in the same number of additions in respective stages thereof.

In the manufacture of satin white with the reaction of the calcium hydroxide suspension and the aqueous aluminum sulfate solution, aluminum sulfate as a raw material used in the reaction for producing satin white is completely dissolved in water and becomes an aqueous solution, and the entire solution immediately becomes ready for the reaction whereas the total amount of the calcium hydroxide is hardly ready for the immediate reaction since the calcium hydroxide as the other raw material used in the reaction has a very low solubility of 0.2% in water such that the calcium hydroxide is hardly dissolved in water and is in a state of suspension.

Accordingly, instead of being added all at once, the amount of aluminum sulfate is divided into a predetermined number of parts, each of which is within a prescribed amount range corresponding to a limit amount of the less-reactive calcium hydroxide being able to react immediately in each of the same number of stages. Such a multistage addition can avoid the presence of excess aluminum sulfate in the reaction system and prevent the formation of reaction by-product materials such as aluminum oxide and calcium sulfate.

Further, in the present method, in addition to the above-mentioned divisional addition of the aqueous aluminum sulfate solution, this method is characterized in that the aqueous aluminum sulfate solution (B) is continuously added to the calcium hydroxide suspension (A) being transferred continuously in any one stage in the multistage addition of the aqueous aluminum sulfate solution (B) to the calcium hydroxide suspension (A).

Although a so-called "batch method" that the aqueous aluminum sulfate solution is added little by little to the predetermined amount of calcium hydroxide suspension for a long period of time by the multistage addition of the aluminum sulfate in accordance with the present invention, a method of "continuous addition" of adding the aqueous aluminum sulfate solution to the calcium hydroxide suspension being continuously transferred is superior to the so-called batch method in regard to controlling the system to produce very small and homogenous particle shapes of the satin white. Thus, the method of "continuous addition" is used in at least one stage in the multistage addition of adding the aqueous aluminum sulfate solution in a plurality of stages.

The method of "continuous addition" with respect to the addition of the aqueous aluminum sulfate in the method of "continuous addition" of the present invention may also be employed in the first stage in the multistage addition of adding the aqueous aluminum sulfate in a plurality of stages. And further the method of "continuous addition" may be employed in all stages except the last stage in the multistage addition of adding the aqueous aluminum sulfate in the plurality of stages. Further, the method of "continuous addition" may be employed in all the stages including the last stage in the multistage addition.

Thus, in order to prepare crystal particles of satin white having very small and homogenous particle shapes as described before, the method of "continuous addition" that can easily control growth of the crystal particles is employed in the first stage in which the crystal growth is quite effectively controlled such that the very small and homogenous particle shapes of satin white may be prepared. Further, the method of "continuous addition" may be employed in more stages in the multistage addition of adding the aqueous aluminum sulfate solution in the plurality of stages so as to produce satin white crystal particles having as very small and homogeneous particle shapes as possible.

It is preferable to employ as few "batch methods" as possible in the multistage addition of adding a predetermined amount of aqueous aluminum sulfate solution in the plurality of additions in the respective stages since the batch method may cause non-uniform crystal particles in shape of satin white.

However, there is an advantage in using the "batch method" in the last addition (in the last stage) in the multistage addition of adding the aqueous aluminum sulfate solution in the plurality of stages. As mentioned before, the synthesis reaction of satin white is an acid-based reaction, where the reaction toward the end tends to produce an abrupt change in the pH such that it is demanded to control the addition of raw materials with a high degree of accuracy near the end point of the reaction, so that it is also demanded to control the addition of the aqueous aluminum sulfate solution with the high degree of accuracy near the end point of the reaction.

In the reaction control near the end point of the reaction, the "batch method" where small amounts of the aqueous aluminum sulfate solution are added bit by bit to a predetermined amount (normally, large quantity) of the calcium hydroxide suspension is superior to the method of "continuous addition" of adding the aqueous aluminum sulfate solution continuously to the calcium hydroxide suspension being continuously transferred.

Regarding the crystal growth of satin white, it is possible to make the amount of the last addition of the aqueous aluminum sulfate solution as low as to be less than several percent of the predetermined total addition amount of the aqueous aluminum sulfate solution by dividing the total addition amount into a plurality of pieces and adding such pieces in so many stages. Thus, the effects on the crystal growth of satin white in the last stage can be reduced so much that the "batch method" may be employed in adding the aqueous aluminum sulfate solution in the last stage in which the addition amount of the aqueous aluminum sulfate solution can be the lowest in the predetermined divisional addition amounts in the plurality of stages.

The subsequent additions conducted in the second and subsequent stages among all divisional additions of adding the predetermined amount of aqueous aluminum sulfate solution (B) in total may be initiated after a predetermined period of time elapses after the addition having been conducted just before each of the subsequent additions.

Here, the phrases: "subsequent additions" and "addition having been conducted just before each of the subsequent additions" indicate the addition order that any one of the "subsequent additions" is conducted after the "addition having been conducted just before". For example, if the "addition having been conducted just before" is the addition in the first stage, then the "subsequent addition" means the addition in the second stage. Likewise, if the "addition having been conducted just before" is the addition in the second stage, then the "subsequent addition" means the addition in the third stage.

Furthermore, either the method of "continuous addition" method or the "batch method" can be selected to add the predetermined amount of the aqueous aluminum sulfate solution in the plurality of stages by dividing such amount into pieces in accordance with the present invention. Therefore, either the method of "continuous addition" or the "batch method" can be adopted for the "subsequent addition" as well as either the method of "continuous addition" or the "batch method" can be adopted for the "addition having been conducted just before the subsequent addition". Thus, there are four cases by selecting from the method of "continuous addition" or the "batch method" for the "subsequent addition" and the "addition having been conducted just before the subsequent addition", respectively. They are: (1) the "continuous addition" for the "immediately preceding addition of the subsequent addition", and the "continuous addition" for the "subsequent addition"; (2) the "continuous addition" for the "immediately preceding addition of the subsequent addition", and the "batch method" for the "subsequent addition"; (3) the "batch method" for the "immediately preceding addition of the subsequent addition", and the "continuous addition" for the "subsequent addition"; and (4) the "batch method" for the "immediately preceding addition of the subsequent addition" as well as for the "subsequent addition". Respective periods of time from the "immediately preceding addition of the subsequent addition" to the "subsequent addition" in the four cases are explained below.

(1) "Continuous Addition" for "Immediately Preceding Addition of the Subsequent Addition" and "Continuous Addition" for the "Subsequent Addition"

In this case, it is the period of time for the mixture of aqueous aluminum sulfate solution and calcium hydroxide suspension formed by the "immediately preceding addition of the subsequent addition" (the mixture in which the satin white formation reaction is in progress) to flow from the immediately-preceding addition position where the "immediately preceding addition of the subsequent addition" is made to the subsequent addition position where the "subsequent addition" is made. For example, suppose 'V' is the volume of flow path from the immediately-preceding addition position to the subsequent addition position and 'c' is the volumetric flow rate of the mixture, then the period of time is calculated by "V/c".

(2) "Continuous Addition" for "Immediately Preceding Addition of the Subsequent Addition" and "Batch Method" for the "Subsequent Addition"

In this case, it is the period of time for the mixture of aqueous aluminum sulfate solution and calcium hydroxide suspension formed by the "immediately preceding addition of the subsequent addition" (the mixture in which the satin white formation reaction is in progress) to flow from the immediately-preceding addition position where the "immediately preceding addition of the subsequent addition" is made to the subsequent addition position where the "subsequent addition" is started.

(3) "Batch Method" for "Immediately Preceding Addition of the Subsequent Addition" and "Continuous Addition" for the "Subsequent Addition"

In this case, it is the period of time for the mixture of aqueous aluminum sulfate solution and calcium hydroxide suspension formed by the "immediately preceding addition of the subsequent addition" (the mixture in which the satin white formation reaction is in progress) to flow from the immediately-preceding addition position where the "immediately preceding addition of the subsequent addition" is completed to the subsequent addition position where the "subsequent addition" is made.

(4) "Batch Method" for "Immediately Preceding Addition of the Subsequent Addition" and "Batch Method" for the "Subsequent Addition"

In this case, it is the period of time for the mixture of aqueous aluminum sulfate solution and calcium hydroxide suspension formed by the "immediately preceding addition of the subsequent addition" (the mixture in which the satin white formation reaction is in progress) to flow from the immediately-preceding addition position where the "immediately preceding addition of the subsequent addition" is completed to the subsequent addition position where the "subsequent addition" is started.

As described above, the period of time from the "immediately preceding addition of the subsequent addition" to the "subsequent addition" is determined to be the predetermined period of time.

The reason for setting up a time interval between the "subsequent addition" and the "immediately preceding addition of the subsequent addition" is as follows. As a result of further consideration about the reaction conditions of the satin white that the present inventors made, when the predetermined second amount of aqueous aluminum sulfate solution was added continuously in the second stage after almost no time (e.g., 10 seconds or so) from when the maximum amount of aqueous aluminum sulfate solution being acceptable for the calcium hydroxide was added in the case where the predetermined amount of aqueous aluminum sulfate solution was dividedly added in a plurality of stages, the crystal particle shapes of the satin white were heavily deformed such that the desired satin white was not obtained even though the second addition of aluminum sulfate was within the range of the predetermined amount. Contrastingly, when the second amount of aqueous aluminum sulfate solution (the same amount of aqueous aluminum sulfate solution as having been added after 10 second from the first stage) was added in the second stage after an interval (about 30 minutes), the desired satin white having needle-like crystal shapes were obtained.

In this experiment, it is not necessarily clear why the obtained satin white had differences in the state, but the reason for this may be thought as follows. It is considered that the difference in reactivity of calcium hydroxide was caused by the different time intervals between additions of the aqueous aluminum sulfate solution. The calcium hydroxide, which was one of the raw materials used in the reaction of satin white, was originally in a solid state and might have reacted with aluminum sulfate only after it was dissolved. Here, as mentioned above, the reactivity is very low because the calcium hydroxide has a very low solubility in water. The different dissolved states of the calcium hydroxide in water might have been caused by different lengths of the time intervals between the additions of the aqueous aluminum sulfate solution since the calcium hydroxide has such a low solubility in water. Then, it is plausible that the difference in the reactivity might have been caused by the difference in the soluble state of the calcium hydroxide. In the other words, when no time interval between additions of aluminum sulfate was provided, a certain period of time was not provided until the lowered reactivity of the calcium hydroxide due to the first reaction was recovered, that is, the solid calcium hydroxide was dissolved. Then, the aluminum sulfate was added again even though the reactivity of the calcium hydroxide was still low such that a proper formation reaction of the satin white could not be provided and the desired satin white was not obtained. On the other hand, as a time interval between additions of aluminum sulfate was provided, the lowered reactivity of the calcium hydroxide was recovered during the time interval such that the proper formation reaction of the satin white could be provided so as to yield the desired satin white even after the latter addition of the aluminum sulfate.

As mentioned above, it is very important to consider the low solubility (=low reactivity) of calcium hydroxide, which is a raw material used in the reaction, in the production of satin white. Then, it is also very important that the tolerable capacity to the reaction of calcium hydroxide (the amount of calcium hydroxide ready for an immediate reaction with aluminum sulfate) is observed by adding the prescribed amount of aluminum sulfate in a plurality of stages while the prescribed amount is divided into as many parts. Thus, it is very important to restore the reactivity of the calcium hydroxide (to restore the soluble state in water).

Therefore, in this invention, the subsequent addition of the aqueous aluminum sulfate solution is conducted with a predetermined time interval from the immediately preceding addition of the aqueous aluminum sulfate solution such that the reactivity of the calcium hydroxide is restored so as to maintain the proper formation reaction of the desired satin white.

The slow process of restoration of the reactivity of the calcium hydroxide may be measured by value changes of pH in the mixture composition where the end of the reaction has not been reached as the aqueous aluminum sulfate solution is mixed with the calcium hydroxide suspension.

In the "continuous addition" of the method of producing satin white by continuously mixing the continuously transferred aqueous aluminum sulfate solution to the continuously transferred calcium hydroxide suspension, the value change of pH in intermediate stages of producing the satin white are described as follows. The value of pH in the calcium hydroxide suspension, to which no aluminum sulfate is added, may be in the range of about 12.5 to 12.7, then the value of pH in the mixture composition is temporarily reduced to about the range of 11.5 to 12.0 when the aqueous aluminum sulfate solution is added to this calcium hydroxide suspension in the first stage. The value of pH in the mixture composition is restored to be about the range of 12.5-12.7 as the remaining unreacted calcium hydroxide is dissolved if the mixture composition is left as it is.

However, the pH in the mixture composition mixed by the "continuous addition" method is not restored in a moment, but it takes a certain period of time for the pH restoration since the solubility of the calcium hydroxide in water is very low. Therefore, it takes 15 or more seconds for the pH in the mixture composition to be restored and stabilized to be in about the original pH level once the pH in the mixture composition is lowered.

Therefore, the required time interval (period of time from the immediately preceding addition of the subsequent addition to the subsequent addition) to be set until the subsequent addition of the aqueous aluminum sulfate solution by the "continuous addition" method is described as follows. As the minimum time interval in which the reactivity of the calcium hydroxide is surely conducted, it is preferable that the time interval is 15 seconds or longer from the immediately preceding addition of the subsequent addition. It is more preferable that the time interval is 5 minutes or longer and it is particularly preferable that the time interval is 30 minutes or longer. It is not preferable that the time interval is to be set to less than 15 seconds since the restoration of the reactivity of the calcium hydroxide is insufficient.

As the upper limit of the time interval set for the additions of the aforementioned aluminum sulfate solution, it is considered that the maximum time interval is about five hours (300 minutes) such that the reactivity of the calcium hydroxide is restored enough since the time interval is long enough if the reactivity of the calcium hydroxide is restored completely.

Although it is OK to have a time interval of 5 or more hours until the subsequent addition of the aluminum sulfate with respect to the restoration of the reactivity of the calcium hydroxide, it is not preferable to have the time interval of 5 or more hours because it takes too long until the formation reaction of the satin white is completed since the aqueous aluminum sulfate solution is added in a plurality of stages as the total amount thereof is divided into as many parts.

With respect to the time interval between the additions of the aqueous aluminum sulfate solution, it is also preferable to employ similar time intervals to those used in the "continuous addition" method in the case of the "batch" method where the aqueous aluminum sulfate solution is added little by little to the calcium sulfate suspension, depending on the addition rate and the addition amount of the aqueous aluminum sulfate solution since the reactivity of the calcium hydroxide is restored in order to conduct a proper and stable formation reaction of the satin white.

Also, in this method, the subsequent addition, which is the second or later addition among the additions of the aqueous aluminum sulfate solution (B) in the plurality of stages in a divided manner may be conducted as the value of pH in the composition which the aqueous aluminum sulfate solution (B) is added to is 11.0 or higher.

Here the "subsequent addition" refers to each addition of the aqueous aluminum sulfate solution to the calcium hydroxide suspension from in the second stage to in the last stage, as the addition of the aqueous aluminum sulfate solution is divided in as many stages.

Also, here, "the composition to which the aqueous aluminum sulfate solution (B) is added in the subsequent addition" is a mixture of the calcium hydroxide suspension (A) and aqueous aluminum sulfate solution (B), and refers to the composition, to which the predetermined amount (total amount) of aqueous aluminum sulfate solution (B) has not been added yet, just prior to the addition of the aqueous aluminum sulfate solution (B) in the subsequent addition (before the addition in the last stage). More specifically, it is the composition where satin white and unreacted calcium hydroxide remain.

The state that the value of pH in the composition is 11.0 or higher, to which the aqueous aluminum sulfate solution (B) is added in the subsequent addition, is considered as follows.

As mentioned earlier, it is important to maintain and restore the reactivity of calcium hydroxide, which is a raw material, in the addition of aqueous aluminum sulfate solution for the production of satin white. Additionally, the recovery status of the calcium hydroxide in the composition, as obtained by adding aqueous aluminum sulfate solution to calcium hydroxide suspension, can be understood by observing the change of the value of pH in the composition. Thus, it is necessary to restore the reactivity (=increasing restoration in pH) in the mixture composition before adding aluminum sulfate.

Accordingly, in this invention, it is preferable that the pH value of the mixture before adding aluminum sulfate is 11.0 or higher. It is more preferable that the pH value is 12.0 or more. In order to restore the reactivity of the calcium hydroxide to the completely stable condition, it is particularly preferable to adjust the pH value in the range of 12.5 to 13.0 (the maximum pH is normally 13.0). If the pH value of the mixture before the addition of the aluminum sulfate is less than 11.0, the situation is not preferable since it is very likely that the calcium hydroxide in the mixture is not restored sufficiently. Then, suppose the aqueous aluminum sulfate solution is added to such mixture, it is difficult to cause the formation reaction of the satin white in a proper and stable manner such that a large amount of reaction byproducts such as aluminum oxide and calcium sulfate are produced.

In the present method, the ratio (a/b) of the molar number 'a' of the calcium hydroxide suspension (A) to the molar number 'b' of the total addition amount of the aqueous aluminum sulfate solution (B) to be added in the plurality of stages as the amount is divided into as many parts may also be in the range of 5.5 to 8.0 during the production of satin white.

Here, the molar number 'a' of the calcium hydroxide suspension, with respect to the calcium hydroxide suspension without any additions of the aqueous aluminum sulfate solution (i.e., the suspension before the first addition in the first stage of the aqueous aluminum sulfate solution), is the equivalent molar number (in concrete, the quotient of the mass F divided by the molecular weight of the molecular formula: $Ca(OH)_2$) of the total weight (mass F=f1+f2) of the calcium hydroxide dissolved in water (f1) and the calcium hydroxide suspended as solid particles in water (f2) divided by the molar number corresponding to the molecular formula: $Ca(OH)_2$. In a similar manner, the total addition molar number 'b' of the aqueous aluminum sulfate solution is the equivalent molar number (in concrete, the quotient given by dividing the total mass included in W by the molecular weight of the molecular formula: $Al_2(SO_4)_3$) of the total weight of the aluminum sulfate included in the total weight W of the aqueous aluminum sulfate solution having been added, wherein the total weight W having been added in the plurality of stages is given by W=W1+W2+ . . . +Wn utilizing the addition weight W1 of the aqueous aluminum sulfate solution in the first stage, the addition weight W2 in the second stage, . . . , and the addition weight Wn in the last ('n'th stage), divided by the molar number corresponding to the molecular formula: $Al_2(SO_4)_3$ (aluminum sulfate anhydride).

Accordingly, the ratio (a/b) of the molar number 'a' of the calcium hydroxide suspension (A) to the molar number 'b' of the total addition amount of the aqueous aluminum sulfate solution (B) in the plurality of stages is theoretically equal to 6.0 (a/b=6.0). This shows that 6 moles of calcium hydroxide and 1 mole of aluminum sulfate are required to produce 1 mole of satin white. Therefore, when the satin white is produced according to this invention, it is very preferable that the reaction molar ratio (a/b) of the calcium hydroxide to the aluminum sulfate is set to be 6.0 (a/b=6.0) so as to minimize the waste.

It is, however, very difficult to terminate the reaction precisely at the point where the reaction is completed because the reactivity of the calcium hydroxide is very low. Thus, it is preferable that the reaction molar ratio (a/b) of the calcium hydroxide and the aluminum sulfate is made 5.5 (a/b=5.5) or more as the lower limit when the satin white is produced according to the present invention. It is more preferable that the lower limit is set to be 5.8, and it is particularly preferable that the lower limit is set to be 6.0. And for the upper limit of the molar ratio (a/b), it is preferable that the ratio is set to be 8.0 or less, and more preferably that it is set to be 7.0 or less, and particularly preferable that it is set to be 6.0 (normally, for the favorable range of reaction molar ratio (a/b) of the calcium hydroxide and the aluminum sulfate, it is preferable that a/b=5.5 to 8.0, and particularly preferable that a/b=5.8 to 7.0.). If the reaction molar ratio (a/b) of the calcium hydroxide and the aluminum sulfate during the production of the satin white is set to be less than 5.5, the proportion of the aluminum sulfate to the calcium hydroxide is in excess, and undesired reaction byproducts such as aluminum oxide and calcium sulfate are formed in a large quantity. So, the condition is not preferable. Conversely, if the reaction molar ratio exceeds 8.0, the proportion of aluminum sulfate to calcium hydroxide is insufficient and a large quantity of unreacted calcium hydroxide remain in the satin white. So, the condition is not preferable.

In the present method, the molar number of the aqueous aluminum sulfate solution (B) may be added in the first stage among the plurality of stages where the divided amounts are added, the molar number being equal to or less than 85% of the reference molar number corresponding to the one-sixth of the molar number of the calcium hydroxide suspension (A), such that the molar number of the total addition amount of the aqueous aluminum sulfate solution added in the second addition in the second stage and the first addition with respect to the multistage addition may be equal to or less than 98% of the reference molar number (addition molar number limitation method).

Here, the "reference molar number" is one-sixth the molar number 'a' of calcium hydroxide suspension (A). Since the chemical stoichiometric mixture ratio (a/b) of the molar number 'a' of calcium hydroxide (A) and the molar number 'b' of aluminum sulfate (B) is theoretically 6.0 (a/b=6.0) in the production of satin white, the "reference molar number" of the aluminum sulfate (B) is one-sixth the molar number of the calcium hydroxide (A), when the molar number of the calcium hydroxide suspension (A) is 1. Here, the molar number of the calcium hydroxide suspension, with respect to the calcium hydroxide suspension without any additions of the aqueous aluminum sulfate solution (i.e., the suspension before the first addition in the first stage of the aqueous aluminum sulfate solution), is, in a similar manner as mentioned before the equivalent molar number (in concrete, the quotient of the mass F divided by the molecular weight of the molecular formula: $Ca(OH)_2$) of the total weight (mass F=f1+f2) of the calcium hydroxide dissolved in water (f1) and the calcium hydroxide suspended as solid particles in water (f2) divided by the molar number corresponding to the molecular formula: $Ca(OH)_2$.

The addition amount of the aqueous aluminum sulfate solution (B) in the first addition (first stage) and the second addition (second stage) is limited in order to control the amount of the aqueous aluminum solution to be added to the calcium hydroxide suspension within the tolerable range of the calcium hydroxide for the stable production of the satin white in consideration of the low reactivity of the calcium hydroxide.

Therefore, the molar number equal to or less than 85% of the reference molar number corresponding to one-sixth of the molar number of the calcium hydroxide suspension (A) is preferable for the first addition (first stage) of the aqueous aluminum sulfate solution. It is more preferable to add the molar number equal to or less than 70% of the reference molar number. It is the most preferable to add the molar number equal to or less than 50% of the reference molar number. Regarding the lower limit of the amount of aqueous aluminum sulfate solution in the first addition (first stage), the molar number equal to or more than 0.1% of the reference molar number is usually preferable. It is more preferable to make the molar number equal to or more than 0.5% of the reference molar number. It is the most preferable to make the molar number equal to or more than 1% of the reference molar number. Regarding the total amount of the aqueous aluminum sulfate solution (B) added in the first addition (first stage) and the second addition (second stage) in the multi-stage addition, it is preferable that the molar number of the total amount is equal to or less than 98% of the reference molar number. It is particularly preferable that the molar number of the total amount is equal to or less than 90% of the reference molar number. Regarding the lower limit of the total amount of the aqueous aluminum sulfate solution (B) added in the first addition (first stage) and the second addition (second stage), it is usually preferable to make the molar number equal to or more than 20% of the reference molar number. It is more preferable to make the molar number equal to or more than 50% of the reference molar number. It is the most preferable to make the molar number equal to or more than 70% of the reference molar number.

If the molar number of the aqueous aluminum sulfate solution in the first addition (first stage) to the calcium hydroxide suspension (A) is more than 85% of the reference molar number, and if the molar number of the total aqueous aluminum sulfate solution added in the first addition (first stage) and the second addition (second stage) exceeds 98% of the reference molar number, the conditions are not preferable since the amount of aluminum sulfate exceeds the reaction tolerance capacity of the calcium hydroxide so as to yield a large quantity of reaction byproducts such as aluminum oxide and calcium sulfate.

Regarding the addition molar number limit method, the molar number of the aqueous aluminum sulfate solution (B) in the first addition may be made equal to or less than 10% of the aforementioned reference molar number.

By making the molar number of the aqueous aluminum sulfate solution (B) equal to or less than 10% of the reference molar number, the particle diameters of the satin white can be dramatically reduced. But it is more preferable to make the molar number equal to or less than 5% of the reference molar number. Further, it is the most preferable to make the molar number equal to or less than 2% of the reference molar number (here, it is preferable to make the molar number equal to or more than 0.1% of the reference molar number with regard to the lower limit of the molar number).

Regarding the addition molar number limit method, the multistage addition may include at least three stages (hereinafter referred to as "3-or-more-addition method").

It is necessary to consider the low reactivity of the calcium hydroxide in the production of satin white, and to limit the amount of aqueous aluminum sulfate solution added to the calcium hydroxide suspension within the tolerable capacity of the calcium hydroxide. To produce a stable satin white, it is preferable that the amount of aqueous aluminum sulfate solution added to the calcium hydroxide suspension in up to the second stage is controlled equal to or less than 98% of the reference molar number. Thus, it is difficult to reach substantially the end of the reaction for the satin white by conducting up to two additions of the aqueous aluminum sulfate solution (B). Accordingly, it is preferable to conduct at least three additions of the aqueous aluminum sulfate solution (B), which are conducted in a plurality of stages in a divided manner.

Further, it is desirable to make the number of stages of adding the aqueous aluminum sulfate solution to the calcium hydroxide suspension as few as possible, since it is possible to control the particle diameters of the satin white crystals to be very small. It is preferable that the total number of stages in which a plurality of additions of the aqueous aluminum sulfate solution to the calcium hydroxide suspension are conducted in a divided manner is made equal to or less than 10, and it is more preferable to make the total number equal to or less than 7. It is particularly preferable to make the total number equal to or less than 5.

If the number of stages for additions of the aqueous aluminum sulfate solution is more than 10, the condition is not preferable since it becomes difficult to control the crystal particle shapes of the satin white because the condition of the mixing by the "continuous addition" method as one of the features of the present invention is substantially the same as that of on-and-off additions of the aluminum sulfate by the "batch method".

Furthermore, the molar number of the total amount of the aqueous aluminum sulfate solution (B) may be more than 100% of the aforementioned reference molar number in the 3-or-more-addition method. This would cause the calcium hydroxide suspension to react sufficiently so as to produce satin white. Additionally, it can weaken the alkaline property of the produced composition that includes the calcium trisulfoaluminate (C).

In the 3-or-more-addition method, the pH value of the produced composition that includes the calcium trisulfoaluminate (C) may be equal to or less than 12.0 after completion of the multistage addition of the total aqueous aluminum sulfate solution (B).

Here, in the method of measuring "the pH value of the composition that includes the calcium trisulfoaluminate (C)," it is preferable to measure the pH value at least 10 minutes, or more preferably at least 5 hours after the completion of the last addition of the aqueous aluminum sulfate solution in order to ensure a stable condition of the residual calcium hydroxide. It is also preferable to use a pH meter having been calibrated at least once in the day of measurement by using the pH reference solution. For example, the pH value of the composition at 25° C. that includes the calcium trisulfoaluminate (C) can be measured 24 hours after completion of the last addition of the aqueous aluminum sulfate solution. Furthermore, the Rakom Tester pH meter (pH Scan WPBN/by As One Corporation) may be used as a tool for measurement. The composition can be measured by dipping the pH electrodes into the dispersion fluid of the composition including the calcium trisulfoaluminate (C). Here, the pH meter is calibrated using the NIST calibration solution (two types: pH 6.86 and pH 9.18) before carrying out the measurement.

In the conventional method of producing of satin white, as mentioned above, it is a disadvantage that the pH value of the satin white suspension is strong alkaline (pH 12.5-12.7) since the residual calcium hydroxide is dissolved into the produced satin white as a result that unreacted calcium hydroxide exists in the produced satin white because the condition that the calcium hydroxide is in excess is maintained in order to prevent the byproducts such as aluminum oxide and calcium sulfate by means of constantly keeping the excess amount of calcium hydroxide for the amount of aluminum sulfate.

When coated paper for printing is produced by mixing the satin white in a pigment coating liquid, the satin white having been produced by the conventional method so that the satin white suspension is strong alkaline, it is an issue that the coated paper for printing is deteriorated in the whiteness so as to be yellowish, which is so-called phenomenon of "alkali burn".

However, in the present invention, the low reactivity of calcium hydroxide suspension is taken into account and the formation of unreacted calcium hydroxide in the satin white suspension is controlled by utilizing the multistage addition of the predetermined amount of aqueous aluminum sulfate solution until the end of the reaction. This method facilitates the stable production of low-alkaline and high-quality satin white. Thus, in the present method, it is possible to regulate the pH value of the composition including the satin white not exceeding 12.0 by optimizing the addition amounts of the aqueous aluminum sulfate solution. The pH value could also be reduced to be a preferable value not exceeding 10.5, and a more preferable value not exceeding 9.5 by further optimizing the amount of aqueous aluminum sulfate solution. And with respect to the lower limit of the pH value, it is preferable to make the pH value at least 8.5, and particularly preferable to make the pH value at least 9.2.

If the pH value of the composition including the produced satin white exceeds 12.0, the condition is not preferable since a large quantity of unreacted calcium hydroxide remains as mentioned before. On the other hand, if the pH value is less than 8.5, the condition is not preferable since the state is beyond the end of the reaction such that an excess amount of the aqueous aluminum sulfate is added and that the crystal shapes of the produced satin white are collapsed and that byproducts such as aluminum oxide and calcium sulfate are formed.

This pH value can be regulated by adjusting the addition amounts of the aqueous aluminum sulfate solution. More specifically, the pH value can be regulated by changing the ratio (a/b) of the molar number 'a' of the calcium hydroxide suspension (A) to the molar number 'b' of the total amount of the aqueous aluminum sulfate solution (B) added in the plurality of stages. If the ratio (a/b) is increased, the pH value is also increased and if the ratio (a/b) is decreased, the pH value is decreased. Thus, the ratio (a/b) may be adjusted in order to obtain the prescribed pH value.

The present method may further comprise a dehydration process for producing a dehydrated composition by dehydrating the composition that includes the calcium trisulfoaluminate (C) produced after all additions in the plurality of stages of the aqueous aluminum sulfate solution (B); and a redispersion process for producing a redispersed slurry composition by adding water to the dehydrated composition (hereinafter referred to as "redispersion method").

It is convenient to be used readily a dispersed liquid (in a slurry state) having stably dispersed calcium trisulfoaluminate (C) since the dispersed liquid is kept in a stable dispersion state of the calcium trisulfoaluminate (C) when the calcium trisulfoaluminate (C) produced by the present method is used to be combined with the pigment coating liquid for manufacture of the coated paper for printing (For example, the redispersed composition in which the calcium trisulfoaluminate (C) is stably dispersed may be prepared by conducting the redispersion process after the dehydration process in order to produce the redispersed composition having the (weight) concentration of the calcium trisulfoaluminate (C) higher than the (weight) concentration of the calcium trisulfoaluminate (C) in the composition produced after all additions in the plurality of stages of the aqueous aluminum sulfate solution (B) are completed.).

The calcium trisulfoaluminate (C) produced by the present method can be used to prepare a dispersion liquid (in a slurry state) in which the calcium trisulfoaluminate (C) is stably dispersed and the following procedures may be employed. If the present method further comprises: a dehydration process for producing a dehydrated composition by dehydrating the composition including the calcium trisulfoaluminate (C) produced after completion of all additions in the plurality of stages of the aqueous aluminum sulfate solution (B); and a redispersion process for producing a dispersion composition in a slurry state by adding water to the dehydrated composition, it is possible to obtain a dispersion liquid (in a slurry state) having the stably-dispersed calcium trisulfoaluminate (C) as the redispersed composition.

Here, the dehydration process is for separating and removing water from the composition (hereinafter, referred to as "original composition"), which includes the calcium trisulfoaluminate (C), after completion of all additions in the plurality of stages of the aqueous aluminum sulfate solution (B) so that the ratio (k3/k4) of a fraction (weight) (k3) of the calcium trisulfoaluminate (C) to a fraction (weight) (k4) of the dehydrated composition is greater than the ration (k1/k2) of a fraction (weight) (k1) of the calcium trisulfoaluminate (C) to the original composition (weight) (k2) and is not limited to this. The dehydration process is carried out in such a way that the ratio (K1/k2) of the calcium trisulfoaluminate (C) in the original composition is typically 0.1 to 12 weight % and the ration (k3/K4) of the calcium trisulfoaluminate (C) in dehydrated composition is typically 30 to 40 weight %. Moreover, the dehydration process may be carried out by the operations such as filtration, centrifugal separation, and pressure dehydration.

Furthermore, the redispersion process may be a process for producing the redispersion composition in a slurry state by adding water to the dehydrated composition obtained through the dehydration process. The "water" used here may be anything that includes water. The meaning of "water" may include pure water, purified water, ion-exchanged water, tap water from the water supply, and water for industry use. It may also include water with additives as appropriate (for example, the additives include a dispersion agent to disperse the calcium trisulfoaluminate (C) well enough to make the composition in a slurry state). Moreover, it should be understood that the dehydrated composition may be properly stirred by a stirrer after the addition of water and be further stirred until a slurry state is attained. Here, the ratio of the calcium trisulfoaluminate (C) in the redispersion composition is not limited, but the ratio (k5/k6) of the fraction (weight) (K5) of the calcium trisulfoaluminate (C) to the amount (weight) (k6) of the redispersion composition is typically from 20 to 30 weight %.

The redispersion method may also comprise a disperser addition process for adding a dispersion agent to the composition including the calcium trisulfoaluminate (C) after completion of all additions in the plurality of stages of the aqueous aluminum sulfate solution (B). The addition of dispersion agent to the composition is conducted before the dehydration process.

As mentioned above, the disperser addition process for adding the dispersion agent to the composition prior to the dehydration process allows the dehydration process to proceed smoothly. It also allows the calcium trisulfoaluminate (C) to be properly dispersed in the redispersed composition in the redispersion process. The "dispersion agent" to be used here is not limited, but may be any dispersion agent as far as it is for dispersion of the pigment. By way of example, a dispersion agent in the polyacrylic acid system or the like may be utilized.

As to the quantity of dispersion agent, if a large quantity of dispersion agent is added during the disperser addition process, a large quantity of dispersion agent exists in the composition to be dehydrated so as to increase the load in the dehydration process and reduce the efficiency of dehydration. Contrastingly, if a very small quantity of dispersion agent is added, the necessary dehydration time may be extended so as to reduce the efficiency in dehydration and prevent improvement in dispersibility in the redispersed composition. It is therefore preferable to set a range that satisfies both. The ratio (k8/k7) of the solid content (k8) of the dispersion agent to be added to the composition to the solid content (k7) of the composition including the calcium trisulfoaluminate (C) after completion of all additions of the aqueous aluminum sulfate solution (B) in the plurality of stages, is typically from 0.2 to 2.0 weight %, and the preferred ratio is from 0.3 to 1.0 weight %.

The present method may further comprise: the carbon dioxide gas contact process for making the composition including the calcium trisulfoaluminate (C), as produced after the completion of all additions of the aqueous aluminum sulfate solution (B) in the plurality of stages, in contact with carbon dioxide gas.

As mentioned earlier, if the composition including the calcium trisulfoaluminate is highly alkaline, an issue of a so-called "alkaline burn" phenomenon may be caused wherein the coated paper for printing prepared with coating liquid by mixing the satin white in the coating liquid tends to be subject to discoloration to be yellowish, and have a lower degree of whiteness. It is, therefore, preferable to reduce the alkalinity of the composition including the calcium trisulfoaluminate (C) to be manufactured by the present method. In order to reduce the alkalinity of the composition, the molar ratio (a/b) of the molar number 'a' of the calcium hydroxide suspension (A) to the molar number 'b' of the total addition amounts of the aqueous aluminum sulfate solution (B) in the plurality of stages may be adjusted. In addition to this adjustment, the composition including the calcium trisulfoaluminate (C) may be made in contact with carbon dioxide gas. By exposing the composition to the carbon dioxide gas, the alkaline part (calcium hydroxide) of the composition is neutralized by the carbon dioxide gas (carbonic acid) and subsequently reduces the alkalinity of the composition.

Furthermore, the carbon dioxide contact process for making the composition including the calcium trisulfoaluminate (C) in contact with carbon dioxide gas may be carried out at any time in the process as far as it is a process to make the composition in contact with the carbon dioxide gas wherein the composition including the calcium trisulfoaluminate (C) is produced after completion of the additions of the aqueous aluminum sulfate solution (B) in the plurality of stages. For example, the carbon dioxide contact process may be conducted such that the composition including the calcium trisulfoaluminate (C) is made in contact with the carbon dioxide gas immediately after the last addition of the aqueous aluminum sulfate solution (B) among the additions in the plurality of stages is completed (No other processes are conducted after the last addition. It is the original composition in the case of the aforementioned redispersion method.). Furthermore, the contact process may include a process for making the dehydrated composition and/or the redispersion composition in contact with the carbon dioxide gas in the case of the aforementioned redispersion method. The reason why the carbon dioxide contact process must be conducted after completion of all additions of the aqueous aluminum sulfate solution (B) in the plurality of stages is to prevent the calcium hydroxide, which is supposed to react with aluminum sulfate, from being neutralized by the carbon dioxide gas.

Also, with respect to the carbon dioxide gas contact process, the method of making the composition including the calcium trisulfoaluminate (C) in contact with the carbon dioxide gas is not limited, but may be anything as far as the composition becomes in contact with the gaseous matter that includes carbon dioxide gas (The preferable concentration (volume %) of the carbon dioxide gas in the gaseous matter is preferably equal to or more than 10 vol %, and more preferably the concentration is equal to or more than 70 vol %. The concentration is, of course, equal to or less than 100 vol %.). Furthermore, the ratio (G/L) of the volumetric flow 'G' of the gaseous matter and the volume 'L' of the composition during the contact process may be changed according to conditions such as concentration of carbon dioxide in the gaseous matter, the pH value to be reduced through the carbon dioxide contact process, the content rate of the calcium trisulfoaluminate (C) in the composition, the efficiency of stirring in the carbon dioxide gas contact process, the retention period of time in the carbon dioxide gas contact process, and the temperature in the carbon dioxide gas contact process and so on. The method of making the composition including the calcium trisulfoaluminate (C) in contact with carbon dioxide gas in the carbon dioxide contact process is not limited. By way of example, the method may include a method of making carbon dioxide gas in contact with the composition in an inline mixer (closed system) and a method of blowing the gas directly into the Cowles Dissolver (open system), and so on. Furthermore, the pH value of the composition including the calcium trisulfoaluminate (C), which has been contacted with carbon dioxide gas in the carbon dioxide contact process, decreases with an increase of the amount of the carbon dioxide gas the composition has been contacted with. Thus, the pH value can be readily adjusted by adjusting the amount of carbon dioxide gas. The pH value is preferably equal to or less than 12.0, more preferably equal to or less than 10.5, and most preferably equal to or less than 9.5 (The pH value is typically at least 8.5 as the lower limit of the pH value, and more preferably at least 9.2. Thus, the range of the pH value is typically from 8.5 to 12.0.).

Either concentration of the calcium hydroxide suspension (A) or the aqueous aluminum sulfate solution (B) may be equal to or less than 12 weight %.

Here, as mentioned before, the concentration of calcium hydroxide suspension is a concentration of the calcium hydroxide suspension in a state before any amount of aqueous aluminum sulfate solution is added (i.e. before the first addition of the aqueous aluminum sulfate solution in the first stage). It is the weight percentage of the total content amount (mass F=f1+f2) in the calcium hydroxide suspension wherein the total content amount is the sum of the amount (f1) of calcium hydroxide dissolved in water and the amount (f2) of calcium hydroxide suspended in water in a solid state.

As mentioned before, it is necessary to instantly and homogenously mix the calcium hydroxide suspension as a base and the aqueous aluminum sulfate solution as an acid in order to produce the satin white. If the concentration of each reaction raw material used in the reaction is too high, it is difficult to carry out the instant and homogenous mixing of the raw materials and the reaction mixture composition (suspension) may become highly viscous such that the viscosity thereof exceeds 2000 mPa·s, which may impede mixing the raw materials.

Therefore, it is preferable that at least one of the concentrations of the calcium hydroxide suspension (A) and the aqueous aluminum sulfate solution (B) is equal to or less than 12 weight %. It is more preferable that at least one of them is equal to or less than 8 weight %, while it is particularly preferable if both concentrations are equal to or less than 8 weight %.

And in order to make the raw materials mixed instantly and homogenously so as to facilitate a stable reaction to produce the satin white, the concentrations of raw materials used in the reaction are preferably as low as possible. However, if the concentrations are too low, the volume of the reaction liquid may become too large and it is necessary to employ manufacturing facilities having an extremely large processing ability for the reaction. Therefore, it is not preferable to reduce the concentrations more than enough.

Accordingly, at least one of the concentrations of the calcium hydroxide suspension (A) and the aqueous aluminum sulfate solution (B) may preferably be at least 0.1 weight %. It is even more preferable that at least one of the concentrations is at least 1%.

In the present method, it is preferable to reduce the average particle diameter of the calcium hydroxide solid particles in the calcium hydroxide suspension (A) as low as or less than 20 micrometers, which may be measured by the precipitation method. It is even more preferable to reduce the average particle diameter as low as or less than 15 micrometers. And it is extremely preferable to reduce the average particle diameter as low as or less than 5 micrometers.

Here, the "average particle diameter measured by the precipitation method" is the average particle diameter obtained by the "precipitation method" as the state of the precipitating particles is measured by the permeability of X-ray. As the measurement method, by way of example, the Sedigraph 5100 by Micrometrics Corporation in the United States may be employed to measure the particle size distribution of the calcium hydroxide and the diameter at 50 cumulative weight percent is obtained as the average particle diameter (d50). Here, 0.1% of aqueous solution of phosphate dispersion agent (component: sodium pyrophosphate) is added to the calcium hydroxide suspension, and the calcium hydroxide suspension for measurement was obtained by diluting the suspension and dispersing the calcium hydroxide such that the concentration of the solid content of calcium hydroxide is approximately 4%. Moreover, the measurement was conducted under the conditions of a relative density of calcium hydroxide: 2.24 g/cm$^3$ and a measurement temperature: 35° C.

The solid calcium hydroxide particles are dissolved and become smaller because they are consumed in the reaction with the aluminum sulfate when the calcium hydroxide suspension and aqueous aluminum sulfate solution are mixed and react with each other. In order to carry out the instant and homogenous solid-liquid reaction, it is preferable to increase the area of the reaction in the solid-liquid reaction by making the solid calcium hydroxide particles minute and homogenous. Accordingly, it is preferable to make the average particle diameter of the calcium hydroxide particles equal to or less than 20 micrometers, and it is more preferable to make it equal to or less than 15 micrometers. And it is extremely preferable to make it equal to or less than 5 micrometers.

When the calcium hydroxide particles have coarse-grained particle shapes of more than 20 micrometers, the specific surface area of calcium hydroxide is so small that reaction area with the aluminum sulfate is so small that the reaction rate may not be enhanced. Therefore, the addition amount of the aluminum sulfate cannot be increased and such conditions are not preferable. Furthermore, if the sizes of the calcium hydroxide particles are not homogenous, decreasing rates in the sizes of calcium hydroxide particles due to the consumption by reaction with aluminum sulfate are inhomogeneous. Thus, the condition is not preferable since it is likely that coarse-grained calcium hydroxide particles are left unreacted and remain in the composition.

The average diameter of particles of the calcium trisulfoaluminate (C) to be manufactured may be in the range of 0.1 to 1.5 micrometer in the present method.

Here, the "average particle diameter" is the diameter obtained by the "precipitation method" as the state of the precipitating particles is measured by the permeability of X-ray in the same way as described with the case of the calcium hydroxide before.

The blade-coating method is generally used for the manufacture of coated paper for printing since extremely smooth surface and white glossiness of such paper are required. If a coarse pigment is used in the coating method, the coatability of the coating layer is lowered and thereby reducing its smoothness and glossiness. The coarse pigments may also cause "streaks" and the like by scratching the coated layer in the coating process.

In order to prevent the reduction of the smoothness and glossiness of the coated paper, and "streaks" as the coarse pigment scratches the coated layer, it is preferable to make the average particle diameter measured by the precipitation method equal to or more than 0.1 micrometer as the lower limit, and it is in particular preferable to make the average particle diameter equal to or more than 0.2 micrometer. Furthermore, it is preferable that the average particle diameter equal to or less than 1.5 micrometers as the upper limit, and it is more preferable to make the particle diameter equal to or less than 1.2 micrometers. It is in particular preferable to make the particle diameter equal to or less than 1 micrometer (It is typically preferable that the particle diameter ranges from 0.1 to 1.5 and it is more preferable that the ranges from 0.2 to 1.0.).

If the average particle diameter of the produced satin white measured using the precipitation method exceeds 1.5 micrometers, the surface smoothness and glossiness of the coated paper for printing is reduced as mentioned before such that the condition is not preferable. However, if the average particle diameter is less than 0.1 micrometer, a coating process for the coated paper for printing, or the surface smoothness and glossiness of the coated paper for printing are not affected. However, the diameter of the particles may be smaller than necessary such that the amount of adhesive required to bond the pigment and strengthen the coated layer is increased. Therefore, the condition is not preferable since it is not economical.

In order to enlarge the average particle diameter of the calcium trisulfoaluminate (C) produced by the present method, the number of stages for additions of the aqueous aluminum sulfate solution (B) to the calcium hydroxide suspension (A) may be increased, and the volumetric flow in the continuous addition of the aqueous aluminum sulfate solution (B) to the calcium hydroxide suspension (A) being transferred may be decreased (i.e. to increase the retention period in the continuous addition). Conversely, in order to reduce the average particle diameter of the calcium trisulfoaluminate (C) produced by the present method, the number of stages for additions of the aqueous aluminum sulfate solution (B) to the calcium hydroxide suspension (A) may be decreased, and the volumetric flow in the continuous addition of the aqueous aluminum sulfate solution (B) to the calcium hydroxide suspension (A) being transferred may be increased (i.e. to decrease the retention period of time in the continuous addition), and the amount of the aqueous aluminum sulfate solution (B) added to the calcium hydroxide suspension (A) in the first stage may be decreased. Therefore, such conditions may be changed and adjusted in order to obtain the desired average particle diameter.

(Present Device)

The present device utilized in the present method comprises: mixing means for continuously stirring and mixing the continuously transferred aqueous aluminum sulfate solution (B) with the continuously transferred calcium hydroxide suspension (A) to form a mixture composition in any of the continuous additions in the plurality of stages except the last stage; and an intermediate tank for accepting continuously and retaining for a predetermined period of time the mixture composition produced by the mixing means.

Here, the continuously transferred calcium hydroxide suspension (A), to which the aqueous aluminum sulfate solution (B) is continuously added in any of the continuous additions in the plurality of stages wherein the any of the continuous additions is a first addition in the first stage (i.e., no addition of the aqueous aluminum sulfate solution is made before the first addition), is a pure calcium hydroxide suspension unmixed with the aqueous aluminum sulfate solution (B). However, if the any of the continuous additions in the plurality of stages except the last stage is a continuous addition in the second or later stage (after the aqueous aluminum sulfate solution is added), the continuously transferred calcium hydroxide suspension (A) is a mixture composition (mixture of the calcium hydroxide suspension and the aqueous aluminum sulfate solution) to which the aqueous aluminum sulfate solution has been added and in which the reaction for producing the satin white is in progress.

As mentioned earlier, in the present device, it is characterized by mixing the raw materials used in the reaction by the "continuous addition" method to make the satin white particles very small and homogenous, and restoring the reactivity of the calcium hydroxide by providing a predetermined period of time interval after adding the aqueous aluminum sulfate solution. Therefore, the present device comprises: mixing means for continuously mixing the raw materials used in the reaction and thereby forming a mixture composition; and an intermediate tank for accepting continuously and retaining for a predetermined period of time the mixture composition having been produced by the mixing means.

The intermediate tank is not limited to this, but may be anything which may accept continuously and retain for the predetermined period of time the mixture composition having been produced by the mixing means so as to restore the reactivity of the calcium hydroxide as far as it is capable of doing so (This can be done by simply providing the predetermined period of time interval until the next addition of aqueous aluminum sulfate solution while the mixture composition is left as is.). Therefore, it could be a reservoir or a tank having the capacity to hold the mixture composition. Furthermore, it could be a distribution pipe having the same capacity as the reservoir or tank does, and being capable of retaining the mixture composition for the predetermined period of time interval.

In the present device, the aforementioned predetermined period of time between any of the additions and the addition in the immediately subsequent addition process to the any of the additions of the aqueous aluminum sulfate solution (B) may be determined to be at least 15 seconds.

The purpose to provide the predetermined period of time interval between the two additions of the aluminum sulfate is to allow the calcium hydroxide to restore its reactivity before making the calcium hydroxide react with the aqueous aluminum sulfate solution again. As mentioned earlier, it is preferable to have the time interval of at least 15 seconds, and it is more preferable to have the time interval of at least 5 minutes. It is in particular preferable to have the time interval of at least 30 minutes. Furthermore, the time interval of more than five hours may be provided between the two additions. It is considered that the time interval of five hours (300 minutes) or so is long enough to allow the calcium hydroxide to restore its reactivity. Thus, it is not preferable to have the time interval of more than 5 hours because it may take too long to complete the reaction for producing the satin white.

Also, in the present device, the aforementioned period of time between any of the additions of the aqueous aluminum sulfate solution (B) and the immediately subsequent addition to the any of the additions may be set such that the pH value of the aforementioned mixture composition becomes equal to or more than 11.0.

Here, the "immediately subsequent addition after the any of the additions" is an addition of the aqueous aluminum sulfate solution, which is carried out consecutively and immediately after the any of the additions of the aluminum sulfate in the plurality of stages. For example, if the "any of the additions" is the first addition in the first stage, the second addition in the second stage is the "immediately subsequent addition after the any of the additions." Similarly, if the "any addition" is the second stage addition, the third stage addition is the "immediately subsequent addition after the any of the additions."

The mixture composition, to which the aqueous aluminum sulfate solution is added, is the "mixture composition" of produced satin white and unreacted calcium hydroxide, where the aqueous aluminum sulfate solution has already been added to the calcium hydroxide aqueous solution and the formation reaction of the satin white is in progress.

In order to carry out a proper and stable satin white formation reaction using the calcium hydroxide having low reactivity, it is necessary to make the calcium hydroxide in the mixture composition restore the reactivity at the time when the aqueous aluminum sulfate solution is added to the calcium hydroxide suspension or the mixture composition including the calcium hydroxide.

The reactivity of the calcium hydroxide can be determined by the dissolved amount of the calcium hydroxide into water, i.e. the pH value of the mixture composition. It is therefore necessary to increase the pH value of the mixture composition to a prescribed level in order to restore the reactivity of the calcium hydroxide.

Therefore, it is preferable to make the pH value of the mixture composition equal to or more than 11.0 before adding the aluminum sulfate to allow the calcium hydroxide sufficiently to restore its reactivity. It is more preferable to make the pH value equal to or more than 12.0. And it is in particular preferable to make the pH value range from 12.5 to 13.0 in order to restore the reactivity of the calcium hydroxide in a completely stable state. On the other hand, if the pH value of the mixture composition prior to the addition of the aluminum sulfate is less than 11.0, it is very likely that the calcium hydroxide in the mixture composition does not sufficiently restore the reactivity. When the aqueous aluminum sulfate solution is added to the mixture composition in this state, it becomes difficult to carry out the satin white formation reaction in a proper and stable manner, thereby forming a large quantity of reaction byproducts such as aluminum oxide and calcium sulfate. Thus, this condition is not preferable.

In the present device, the aforementioned "any of the additions" may be applied to all the aforementioned non-last continuous additions.

This is because the "continuous addition" method, in which a mixture composition is formed by continuously stirring and mixing the continuously transferred aqueous aluminum sulfate solution (B) with the continuously transferred calcium hydroxide suspension (A), is an excellent method for preparing very small and homogenous crystal particles of satin white. Furthermore, in order to produce as small and homogenous satin white crystal particles as possible, it is also desirable to apply the "continuous addition" to all additions in the plurality of stages except the last stage.

Therefore, it is particularly preferable to use the "continuous addition" method in the addition of a predetermined amount of aqueous aluminum sulfate solution by dividing the amount into a predetermined number of parts such that additions in the same number of stages except the last stage are carried out in the continuous addition method. It is preferable to avoid the "batch method", which may cause the formation of uneven satin white crystal particles, as much as possible.

However, the addition in the last stage of the aqueous aluminum sulfate solution may also be carried out by the "continuous addition" method as conducted in the preceding stages. Furthermore, as mentioned earlier, the "batch method" may be used if the molar number of the aluminum sulfate to be added is small.

In the present device, the aforementioned mixing means may comprise: a main body incorporating an internal space to make the mixture of the calcium hydroxide suspension (A) and the aqueous aluminum sulfate solution (B) flow continuously; and a stirring part that moves in contact with the mixture in the internal space.

Here, the main body, which has the internal space to make the mixture of the calcium hydroxide suspension (A) and the aqueous aluminum sulfate solution (B) flow continuously, is not limited, but may be anything as far as it has an internal space that can allow the mixture to flow. For example, what has a cylindrical shape, a tank shape, or a tower shape may be used. And what has a combination of two or more kinds of shapes may also be used.

Also, the stirring part is not limited, but may be anything as far as it moves in contact with the mixture in the internal space. By way of example, it may include stirring devices of a propeller-type, a paddle-type, a turbine-type, a ribbon-type, a screw-type, a single-cone type, and a double-cone type and so on. It may also include a stirring device having a combination of two or more of these types.

Thus, it is possible to mix properly the mixture flowing continuously in the internal space of the main body as the stirring part moves in contact with the mixture in the internal space.

Here, many kinds of ready-made mixing means having the main body and stirring parts are known. By way of example, a Pipeline Homo Mixer (trademark) manufactured by Tokushu Kika Kogyo Co., Ltd. (a so-called inline mixer having a turbine-type rotating stirrer inside a thin cylindrical main body), a Homo-Mix Line-Flow (trademark) manufactured by Tokushu Kika Kogyo Co., Ltd. (a so-called reaction-tank type of inline mixer having a turbine-type rotating stirrer inside a spacious tank-like main body), and the "L-mix II" (trademark) manufactured by Japan Chemical Engineering & Machinery Co., Ltd. (Multiple reaction spaces are piled up to make a tower. Plank-shaped vertically moving stirring parts are provided internally in each of these spaces. So-called multistage reaction-tower type of inline mixer.) may be named.

FIG. 1 is a schematic perspective view of a mixing device 11 being composed of the Pipeline Homo Mixer (trademark) manufactured by Tokushu Kika Kogyo Co., Ltd. The structure of mixing device 11 is explained with reference to FIG. 1.

The mixing device 11 comprises: a hollow cylindrical main body 13; and a stirring part 15, which rotates in the internal space 13a of the main body 13. The main body 13 is held in such a way that the axis of the cylinder is substantially horizontal, but it is not limited to this. For example, the main body 13 can be set up in such a way that the axis is vertical. The calcium hydroxide suspension (A) and the aqueous aluminum sulfate solution (B) are pressure-fed from one of the two ends of the cylinder (both bases of the cylinder), into the internal space 13a of the cylinder. On the other hand, the drive shaft 17s is placed in such a way that it penetrates the wall of the other of the two ends. The seal component (not shown in the figure), which is placed on the face of the wall, supports the drive shaft in a liquid-tight manner and in a rotatable manner. A drive motor 17m is attached to one end of the drive shaft 17s to drive the drive shaft 17s. A first stirring element 15a and a second stirring element 15b are also fixedly attached to the drive shaft 17s, in the internal space 13a. The first stirring element 15a and second stirring element 15b used here are turbine types. However, as mentioned earlier, other types may also be used. Here, stirring part 15 comprises the first stirring element 15a and the second stirring element 15b, and the stirring part 15 (first stirring element 15a and second stirring element 15b) is rotated in the internal space 13a of the main body 13 by means of the drive shaft 17s upon operation of the drive motor 17m.

If such a mixing device 11 is employed, the mixture of the calcium hydroxide suspension (A) and the aqueous aluminum sulfate solution (B) loaded into the internal space 13a of the main body 13 may be made to flow continuously in the internal space 13a, and the stirring part 15 (first stirring element 15a and second stirring element 15b) in the internal space 13a of the main body 13 rotates when it comes in contact with the mixture. This action allows the formation of a mixture composition 19 by continuously stirring and mixing the transferred continuously aqueous aluminum sulfate solution (B) in the continuously transferred calcium hydroxide suspension (A). The mixture composition 19 is discharged through the outlet 13c and is stored for a predetermined time in the intermediate tank (not shown in the figure), to which it is being transferred continuously.

Here, the stirring part 15 is composed of the first stirring element 15a and the second stirring element 15b. However, the stirring part 15 is not limited to that comprising: the first stirring element 15a and the second stirring element 15b as described above. Besides the stirring part 15 which has either the first stirring element 15a or the second stirring element 15b (thus, the number of element is one) may be employed. The stirring part 15 having more than two stirring elements (thus, the number of elements is three or more) may also be employed (not shown in the figure).

Figure 2:
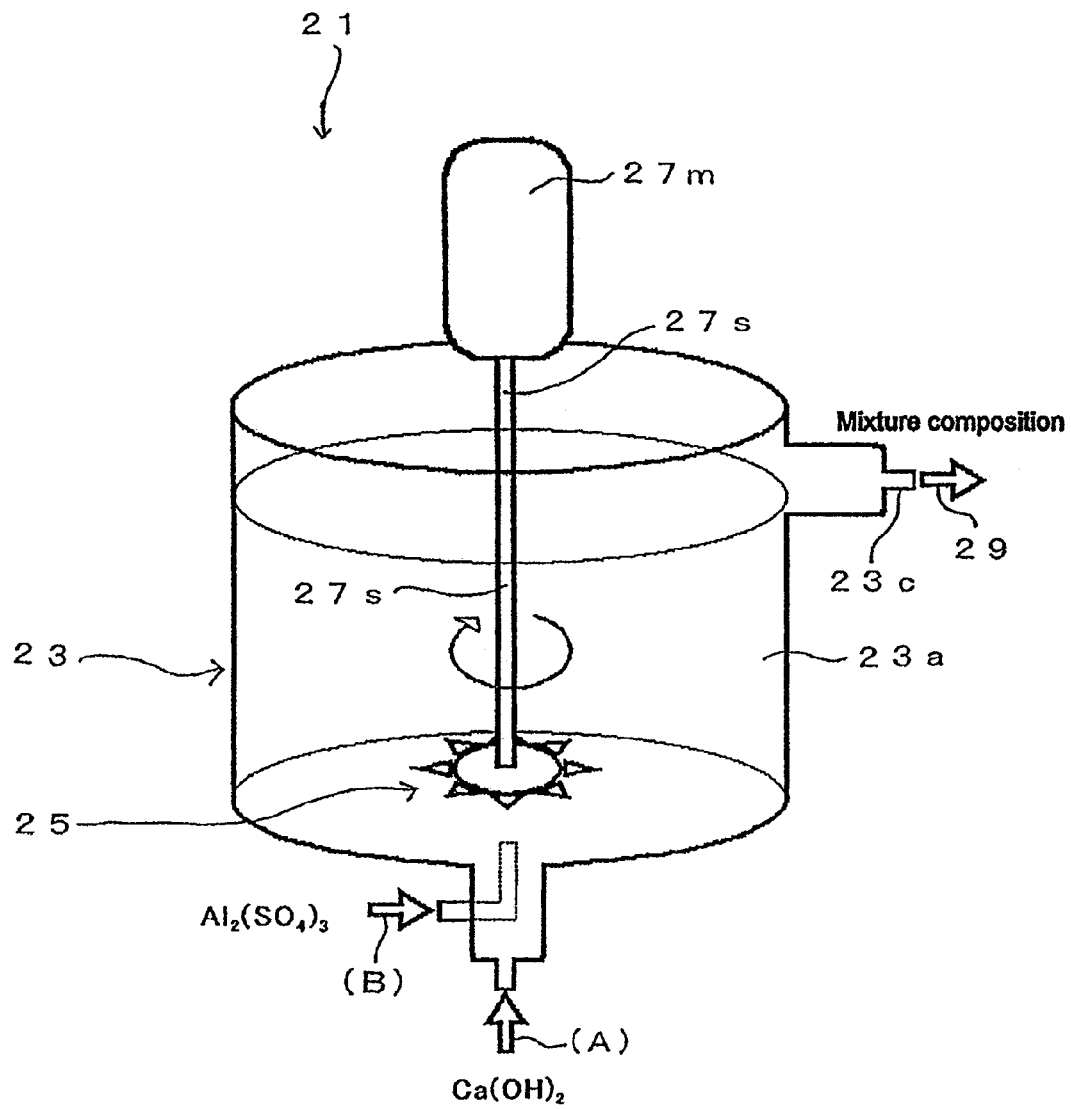
FIG. 2 is a general perspective view showing a mixing device as mixing means comprising: a HOMOMIC LINE FLOW (trademark) of Tokushu Kika Kogyo Co., Ltd.

FIG. 2 is a schematic perspective view of a mixing device 21 as the mixing means, which comprises the previously mentioned Homo-Mix Line-Flow (trademark) manufactured by Tokushu Kika Kogyo Co., Ltd. The structure of the mixing device 21 is explained with reference to FIG. 2.

The mixing device 21 comprises: a hollow cylindrical main body 23 (a wide, cylindrical vessel); and a stirring part 25 that rotates in the internal space 23($a$ of the main body 23. The main body 23 is held in such a way that the axis of the cylinder is vertical. The calcium hydroxide suspension (A) and the aqueous aluminum sulfate solution (B) are pressure-fed from one (in this case the lower side) of the two ends of the cylinder (both bases of the cylinder), into the internal space 23$a$ of the cylinder. On the other hand, the drive shaft 27$s$ is placed in such a way that it penetrates the wall of one of the two ends (upper side in this case). The seal component (not shown in the figure), which is placed on the face of the wall, supports the drive shaft 27$s$ in a liquid-tight manner and in a rotatable manner. A drive motor 27$m$ is attached to one end of the drive shaft 27$s$ in order to drive the drive shaft 27$s$. A stirring part 25 is also affixed to the drive shaft 27$s$, in the internal space 23$a$ of the main body 23. The stirring part 25 used here is of the turbine type, but other types may be used. Upon operating the drive motor 27$m$, the stirring part 25 rotates in the internal space 23$a$ of the main body 23, via the drive shaft 27$s$.

If the above-mentioned type of mixing device 21 is used, the mixture of the calcium hydroxide suspension (A) and the aqueous aluminum sulfate solution (B) loaded in the internal space 23$a$ of the main body 23 can be made to flow continuously in the internal space 23$a$, and the stirring part 25 in the internal space 23$a$ of the main body 23 rotates as it is in contact with the mixture. This action allows the formation of a mixture composition 29 by continuously stirring and mixing the transferred continuously aqueous aluminum sulfate solution (B) with the transferred continuously calcium hydroxide suspension (A). The mixture composition 29 is discharged through the outlet 23$c$ of the main body 23 and stayed for a predetermined period of time in the intermediate tank (not shown in the figure), to which it is being continuously transferred.

Figure 3:
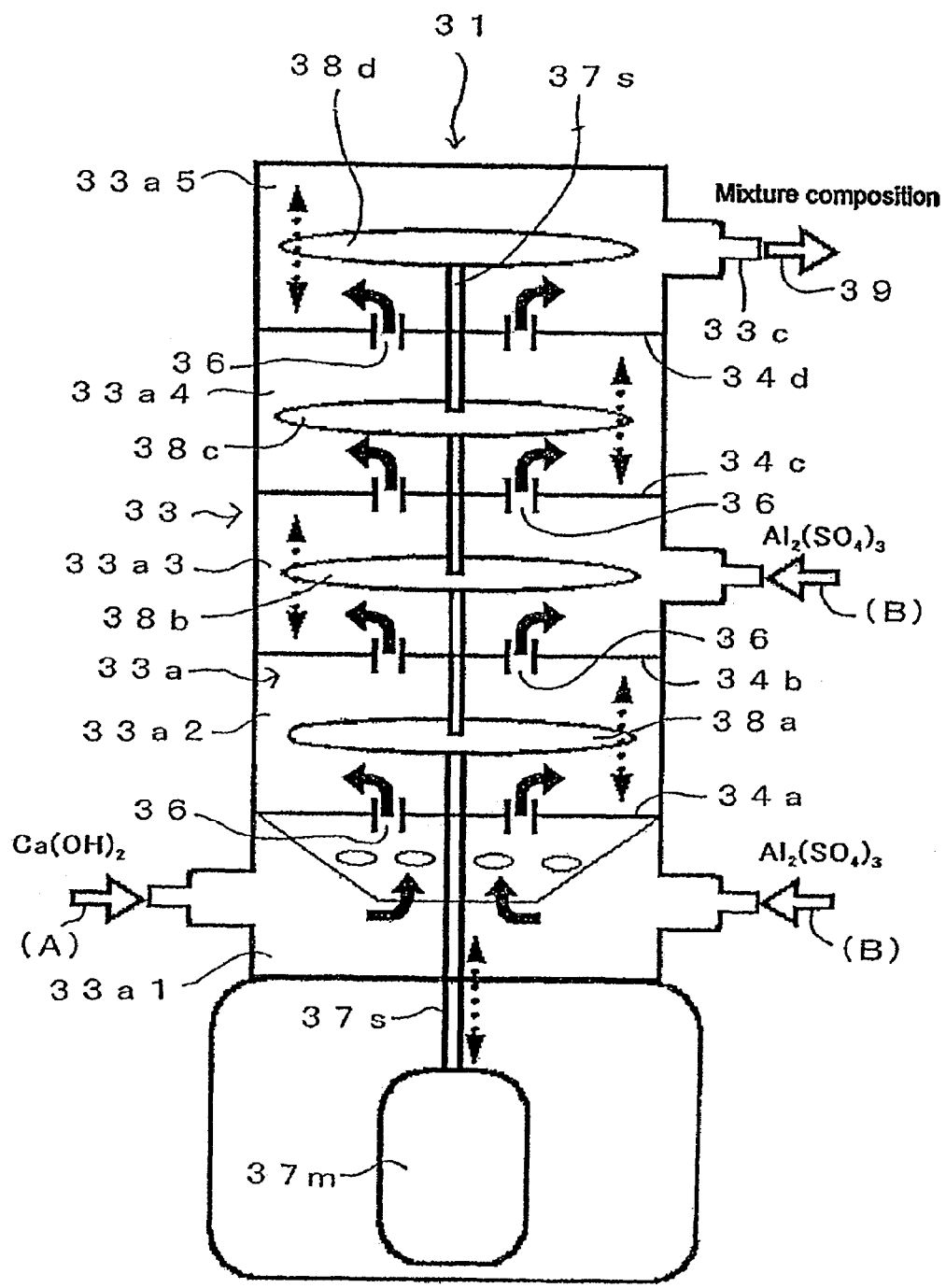
FIG. 3 is a general sectional view showing a structure of a mixing device as mixing means comprising: "L-mix II" (trademark) of Japan Chemical Engineering & Machinery Co., Ltd.

FIG. 3 is a schematic perspective view of a mixing device 31 as the mixing means, which is composed of the previously mentioned L-mix II (trademark) manufactured by Japan Chemical Engineering & Machinery Co., Ltd. The structure of the mixing device 31 is explained with reference to FIG. 3.

The mixing device 31 has a hollow cylindrical main body 33 and a stirring part 35 which makes a reciprocal motion in the internal space 33$a$ of the main body 33. The main body 33 is held in such a way that the axis of the cylinder is vertical. Partition plates 34$a$, 34$b$, 34$c$, 34$d$ are fixed to the interior wall of the main body 33 such that the internal space 33$a$ is divided along the axis of the cylinder. The internal space 33$a$ is partitioned into five parts i.e., first internal space 33$a$1, second internal space 33$a$2, third internal space 33$a$3, fourth internal space 33$a$4, and fifth internal space 33$a$5, by the respective partition plates 34$a$, 34$b$, 34$c$ and 34$d$. Furthermore, all the partition plates 34$a$, 34$b$, 34$c$, 34$d$ have apertures 36 through which the spaces on the two sides partitioned by the partition plates 34$a$, 34$b$, 34$c$, 34$d$ communicate with each other (for example, in the case of the partition plate 34$b$, the second internal space 33$a$2 and third internal space 33$a$3 communicate with each other). On the other hand, the drive shaft 37$s$ is placed nearly parallel to the axis of the cylinder of the main body 33, which penetrates the wall defining the main body 23 at one end (the lower side in this case) of the ends (both bases of the cylinder). The seal component (not shown in the figure) on the wall supports the drive shaft 37$s$ in a liquid-tight manner and in a slidable manner (freely slidable along the length of the drive shaft 37$s$). Then, the sliding drive shaft 37$s$ penetrates the partition plates 34$a$, 34$b$, 34$c$, 34$d$ along the longitudinal direction thereof such that the shaft 37$s$ is capable of sliding freely. A diaphragm 37$m$ is provided at one end of the drive shaft 37$s$ (in this case the lower end) in order to allow the drive shaft 37$s$ to make the reciprocal movement along the longitudinal direction. The stirring elements 38$a$, 38$b$, 38$c$, 38$d$ are also fitted to the drive shaft 37$s$ in the second internal space 33$a$2, third internal space 33$a$3, fourth internal space 33$a$4, and fifth internal space 33$a$5, respectively, in such a way that they do not slide over the drive shaft 37$s$. The stirring elements 38$a$, 38$b$, 38$c$, 38$d$ used here are all disc-shaped, but other shapes may be used as well. On operating the diaphragm 37$m$, the stirring elements 38$a$, 38$b$, 38$c$, 38$d$ make the reciprocal movement in the internal space 33$a$ (in this case the second internal space 33$a$2, third internal space 33$a$3, fourth internal space 33$a$4, and fifth internal space 33$a$5) of the main body 33, via the drive shaft 37$s$.

The calcium hydroxide suspension (A) and the aqueous aluminum sulfate solution (B) are then pressure-fed to the first internal space 33$a$1, while the aqueous aluminum sulfate solution (B) is pressure-fed to the third internal space 33$a$3 (It is not necessary to feed the aqueous aluminum sulfate solution (B) in the middle of it in an additional manner as describe above.).

If such a type of mixing device 31 is used, the mixture of the calcium hydroxide suspension (A) and the aqueous aluminum sulfate solution (B) loaded into the internal space 33$a$ of the main body 33 may be made to flow continuously in the internal space 33$a$. (The mixture flows continuously in the order of first internal space 33$a$1, second internal space 33$a$2, third internal space 33$a$3, fourth internal space 33$a$4, and fifth internal space 33$a$5. Additionally, a part of the aqueous aluminum sulfate (B) is mixed in the third internal space 33$a$3.) Moreover, the stirring elements 38$a$, 38$b$, 38$c$, 38$d$ make the reciprocal movement in the internal space 33$a$ of the main body 33 as the stirring elements are in contact with the mixture. This action enables the formation of a mixture composition 39 by continuously stirring and mixing the continuously transferred aqueous aluminum sulfate solution (B) with the continuously transferred calcium hydroxide suspension (A). The mixture composition 39 is discharged through the outlet 33$c$ of the main body 33 and stays for a predetermined period of time in the intermediate tank (not shown in the figure), to which it is being continuously transferred.

((C) Purity Measurement of Calcium Trisulfoaluminate)

The amount (purity) of calcium trisulfoaluminate (C) can be assessed from its diffraction peak intensity or diffraction peak area obtained by X-ray diffractometry. For example, when it is measured by desktop-type X-ray diffractometer "MiniFlex"(trademark) manufactured by Rigaku Corporation (X-ray generation part: output 30 KV, 15 mA; X-ray tube standard: Cu) in the condition of X-ray wavelength of 1.5421 angstrom ($\lambda$=1.5421 Å), measurement rate (step): 0.04 count/second, and measurement range: 5 to 20 degree, and in data-conversion mode, the calcium trisulfoaluminate (C) produces two peaks, i.e., one peak in the range from 8 to 10 degree (hereafter referred to as "first peak") and the other peak in the range from 15.5 to 17 degree (hereafter referred to as "second peak"). The amount (purity) of calcium trisulfoaluminate (C) may be determined using the areas of the first peak and/or second peak ('s1' is the area of first peak and 's2' is the area of the second peak).

In addition, in the method (the present method) for producing the calcium trisulfoaluminate (C) according to the present invention, a prescribed amount of the aqueous aluminum sulfate solution (B) is divided into the plurality of parts such that each part is added in each of the plurality of stages to the calcium hydroxide suspension (A) so as to make the calcium hydroxide suspension (A) and the aqueous aluminum sulfate solution (B) react with each other. Thus, the status of the reaction of the calcium hydroxide suspension (A) and the aqueous aluminum sulfate solution (B) can be assessed by the amount of calcium hydroxide in the composition including the calcium trisulfoaluminate (C) obtained by the present method. Here, the calcium hydroxide also produces diffraction in the X-ray diffractometry. The amount of calcium hydroxide in the composition can be determined by this resultant diffraction peak intensity or the diffraction peak area. For example, when a desktop-type X-ray diffractometer "MiniFlex"(trademark) manufactured by Rigaku Corporation (X-ray generation part: output 30 KV; 15 mA, X-ray tube standard: Cu) is employed under the conditions of X-ray wavelength 1.5421 angstrom ($\lambda$=1.5421 Å), measurement rate (step): 0.04 count/second, and measurement range: 5 to 20 degree, and in the data-conversion mode, the calcium hydroxide produces a peak in the range from 17.5 to 19 degree (hereinafter referred to as "third peak"). The amount of calcium hydroxide can be determined by using the area of this third peak ('s3' is the area of the third peak).

The status of the reaction of the calcium hydroxide suspension (A) and the aqueous aluminum sulfate solution (B) can be evaluated by the ratio of the amount of calcium hydroxide in the composition including the calcium trisulfoaluminate (C) obtained by the manufacturing method (the present method) to the amount of the calcium trisulfoaluminate (C) in the composition. The amount of calcium hydroxide in the composition can be determined by the X-ray diffraction peak intensity 'IA' or the diffraction peak area 'SA' produced by the calcium hydroxide in the composition, and the amount of the calcium trisulfoaluminate (C) in the composition can be determined by the X-ray diffraction peak intensity 'IC' or the diffraction peak area 'SC' produced by the calcium trisulfoaluminate (C) in the composition. Thus, the ratio of the amounts of calcium hydroxide 'WA' and the (C) calcium trisulfoaluminate hydroxide 'WC' in the composition (it is needless to say that a small value of 'WA/WC' is preferred since the proportion of calcium trisulfoaluminate (C) is large) can be evaluated either by 'IA/IC' or 'SA/SC'. For example, if the ratio is determined by 'SA/SC', 'SA' should be third peak area 's3' and 'SC' may be 's1', 's2', or '(s1+s2)' (more specifically, the value of 'SA/Sc' should be any one of 's3/s1' and 's3/s2' and 's3/(s1+s2)'. It is preferable to determine the ratio by 'SA/SC=s3/(s1+s2)', where 'SA=s3' and 'SC=(s1+s2)', since the ratio of the amounts of calcium hydroxide 'WA' and calcium trisulfoaluminate hydroxide (C) 'WC' in the composition can be accurately determined. While the value of 's3/(s1+s2)' is equal to or more than 0, a preferable proportion of the calcium trisulfoaluminate (C) in the composition is determined in a view of combining the composition with the pigment coating liquid for manufacturing coated paper for printing. Therefore, the value of 's3/(s1+s2)' is equal to or less than 0.5, and it is preferable that the value is equal to or less than 0.3, and it is more preferable that the value is equal to or less than 0.25, and it is the most preferable that the value is equal to or less than 0.2 (typically, the minimum limit of 's3/(s1+s2)' is 0). Thus, a composition including the calcium trisulfoaluminate (C) that has the above value of 's3/(s1+s2)' can be used to be combined with the pigment coating liquid for manufacturing coated paper for printing.

Figure 8:
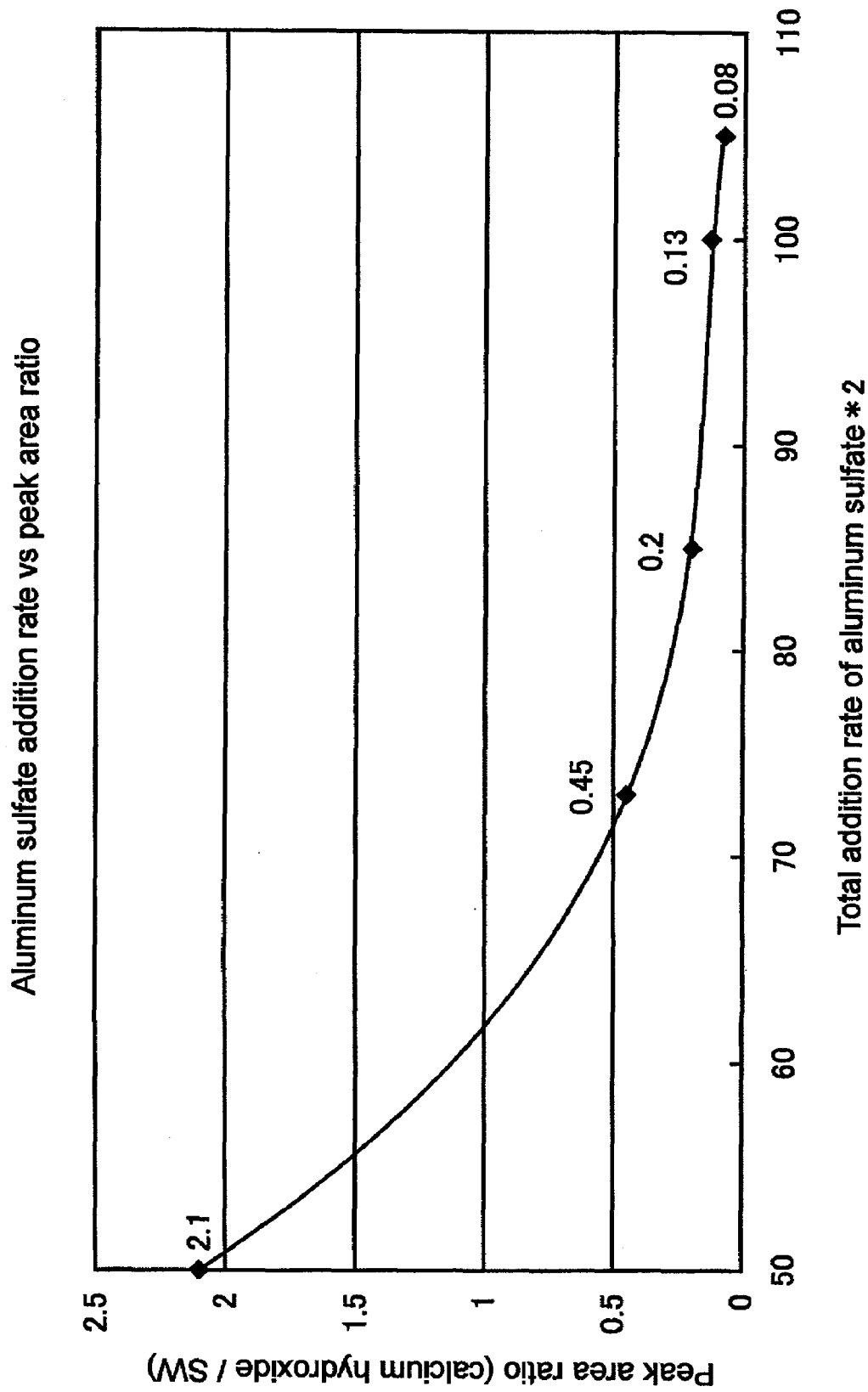
FIG. 8 shows a graph having a horizontal axis of a rate of a molar number b, which is the total addition amount of the aqueous aluminum sulfate solution, to a reference molar number bs (b/bs×100:unit %) and a vertical axis of plotting values of s3/(s1+s2).

FIG. 8 shows a graph where the ratio of the molar number 'b' of the total amount of the aqueous aluminum sulfate solution (B) and the reference molar number 'bs' ('b/bs'×100: unit %) is taken on the horizontal axis ("total addition rate of aluminum sulfate" in FIG. 8), and the value of 's3/(s1+s2)' taken on the vertical axis ("peak area ratio (calcium hydroxide/'SW')" in FIG. 8). In FIG. 8, the composition including the calcium trisulfoaluminate (C) was produced as follows. In other words, a point of 0.45 in the vertical axis is obtained from Example 12 (to be describe later), a point of 0.2 in the vertical axis is obtained from Example 1 (to be describe later), a point of 0.13 in the vertical axis is obtained from Example 3 (to be describe later) and a point of 0.08 in the vertical axis is obtained from Example 6 (to be describe later). A point of 2.1 of the vertical axis value in Example 1 was obtained when the aqueous aluminum sulfate solution (B) was added only in the first stage (the addition amount of the aqueous aluminum sulfate solution (B) was 116 g/min (50% of the reference molar number)) with an amount of 50% of the reference molar number. The points plotted in FIG. 8 were also obtained by adding the aqueous aluminum sulfate solution (B) to the calcium hydroxide suspension (A) in the plurality of stages, where at least one of the additions in the plurality of stages was carried out by the continuous addition of adding continuously the aqueous aluminum sulfate solution (B) to the calcium hydroxide suspension (A) being transferred continuously. Though the graph in FIG. 8 is the result of the above-mentioned conditions, there would be almost no change in the value of 's3/(s1+s2)' even if the conditions are changed, as long as the ratio '(b/bs)' is the same, i.e., where 'b' is the molar number of the total amount added and 'bs' is the reference molar number.

It is now clear from the graph in FIG. 8 that the ratio '(b/bs)' should be nearly more than 0.70 (70%) if the value of 's3/(s1+s2)' is to be in the above-mentioned preferable range equal to or less than 0.5; a ratio '(b/bs)' of nearly more than 0.80 (80%) if the value of 's3/(s1+s2)' is to be in the above-mentioned preferable range of less than 0.3; a ratio '(b/bs)' of nearly more than 0.85 (85%) if the value of 's3/(s1+s2)' is to be in the above-mentioned preferable range of less than 0.25; and a ratio '(b/bs)' of nearly more than 0.90 (90%) if the value of 's3/(s1+s2)' is to be in the above-mentioned preferable range of less than 0.2. (As mentioned earlier, it is normally preferred to have the ratio '(b/bs)' near or below 1.15 (115%)).

Furthermore, if the sample is a suspension including solid state calcium trisulfoaluminate (C) being suspended in liquid such as water like the composition including the calcium trisulfoaluminate (C) produced by the manufacturing method of this invention (the present method), it is preferable to utilize solid contents as the sample for the X-ray diffractometry wherein the solid content is extracted from the suspension in order to conduct the above-mentioned X-ray diffractometry.

The solid components can be extracted from the composition by using filtration (including both press filtration and filtration under reduced pressure (absorption filtration)), centrifugation, static separation and liquid distillation, and a combination thereof. In particular, if the filtration (including both press filtration and filtration under reduced pressure (absorption filtration)) is employed, it is possible to extract efficiently solid component from the suspension. And more specifically, it is preferable to employ the filtration under reduced pressure (absorption filtration) because the operation is simple. Here, the filter medium used in such filtration can be anything that can separate the solid components from the suspension. For example, #6 filter paper (manufactured by Advantec Co., Ltd.) or any similar medium can be used.

Subsequently, the solid components (typically, in a cake shape) extracted from the suspension are placed (set out) on the sample holder (typically made of glass) of the X-ray diffractometer. It is preferable to level the surface of the sample placed on the glass holder so that there is no unevenness or scratching. This can be very easily done by using a spatula or a small spurtle, since the solid components extracted from the suspension are soft and minute.

As mentioned above, if the X-ray diffractometry is carried out for a suspension including the calcium trisulfoaluminate (C) in a similar manner as in the case of the composition including the calcium trisulfoaluminate (C) produced by the present method, the X-ray diffractometry may be carried out by the method wherein the method may comprise: a solid component separation process for extracting the solid contents from the suspension by filtration (including both press filtration and filtration under reduced pressure (absorption filtration)), centrifugation, static separation and liquid distillation, and a combination thereof; a sample placing process for placing the sample of the solid contents extracted in the solid component separation process on the sample holder for the X-ray diffractometry; and an X-ray irradiation process for irradiating X-ray to the solid contents placed on the sample holder in the sample placing process.

The components of the composition, which includes the calcium trisulfoaluminate (C) to be manufactured by present method, can readily be identified since it has limited components (raw material: calcium hydroxide; product: calcium trisulfoaluminate; byproduct: calcium sulfate) in the measurement range from 5 to 20 degree, and because the X-ray diffraction peaks are simple.

EXAMPLE 1

In the following, although the present invention is concretely explained with the examples given below, the present invention is not limited to them. Unless otherwise noted, the parts and % denote the mass parts and mass %.

(pH Measurement Method)

The pH of the composition that includes the satin white in the examples and the comparative examples shown below were determined by the method as described below.

Using the Lacombe tester pH meter (the pH scan WPBN model, manufactured by As One Corporation), the pH value of the pigment dispersion solution was determined by directly immersing the pH electrode into the various dispersion solutions. The pH value was determined after pH calibration by using the NIST calibration solution (two types: pH 6.86 and pH 9.18).

(Preparation of 6% Calcium Hydroxide Suspension)

A 1.24 kg calcium hydroxide (brand name: JIS special slaked lime; manufactured by Okutama Kogyo Co., Ltd.) whose purity as $Ca(OH)_2$ is 96.4% (1.20 kg as $Ca(OH)_2$)) was allowed to disperse in 18.76 kg of water to form 20.0 kg of 6% calcium hydroxide suspension. The temperature of the suspension was adjusted to 40° C.

(Preparation of 10% Calcium Hydroxide Suspension)

A 2.07 kg calcium hydroxide (brand name: JIS special slaked lime; manufactured by Okutama Kogyo Co., Ltd.) whose purity as $Ca(OH)_2$ is 96.4% (2.00 kg as $Ca(OH)_2$)) was allowed to disperse in 17.93 kg of water to form 20.0 kg of 10% calcium hydroxide suspension. The temperature of the suspension was adjusted to 40° C.

(Preparation of 14% Calcium Hydroxide Suspension)

A 2.90 kg calcium hydroxide (brand name: JIS special slaked lime; manufactured by Okutama Kogyo Co., Ltd.) whose purity as $Ca(OH)_2$ is 96.4% (2.80 kg as $Ca(OH)_2$)) was allowed to disperse in 17.10 kg of water to form 20.0 kg of 14% calcium hydroxide suspension. The temperature of said suspension was adjusted to 40° C.

As mentioned above, the preparations of all the 6%, 10%, and 14% calcium hydroxide suspensions were carried out by allowing the calcium hydroxide to disperse in water. However, the means of preparation is not limited to this, so similar methods can also be used. An example of a similar method is that of allowing calcium oxide to be digested in water (cold water and warm water).

(Purity Determination of Aluminum Sulfate)

An accurately weighted prescribed amount of aluminum sulfate (brand name: aluminum sulfate 13-14 hydrate; manufactured by Kishida Chemical Co., Ltd., as the reagent) was heated at 500° C. for five hours. Subsequently the purity of the aluminum sulfate anhydride ($Al_2(SO_4)_3$, which does not contain crystal water, was determined. As a result, the concentration as aluminum sulfate anhydride [$Al_2(SO_4)_3$] of the reagent was 58.70%.

(Preparation of 6% Aqueous Aluminum Sulfate Solution)

A 2.04 kg aluminum sulfate (brand name: aluminum sulfate 13-14 anhydride; Kishida Chemical Co., Ltd., as a reagent) (1.2 kg as $Al_2(SO_4)_3$ anhydride), whose purity was determined as mentioned above, was dissolved in 17.96 kg of water to form 20.0 kg of 6% aqueous aluminum sulfate solution. The temperature of the aqueous solution was adjusted to 40° C.

(Preparation of 10% Aqueous Aluminum Sulfate Solution)

A 3.41 kg aluminum sulfate (brand name: aluminum sulfate 13-14 anhydride; Kishida Chemical Co., Ltd., as the reagent) (2.0 kg as $Al_2(SO_4)_3$ anhydride), whose purity was determined as mentioned above, was dissolved in 16.59 kg of water to form 20.0 kg of 10% aqueous aluminum sulfate solution. The temperature of said aqueous solution was adjusted to 40° C.

(Preparation of 14% Aqueous Aluminum Sulfate Solution)

A 4.77 kg aluminum sulfate (brand name: aluminum sulfate 13-14 anhydride; Kishida Chemical Co., Ltd., as the reagent) (2.8 kg as $Al_2(SO_4)_3$ anhydride), whose purity was determined as mentioned above, was dissolved in 15.23 kg of water to form 20.0 kg of 14% aqueous aluminum sulfate solution. The temperature of the aqueous solution was adjusted to 40° C.

EXAMPLE 1

Figure 4:
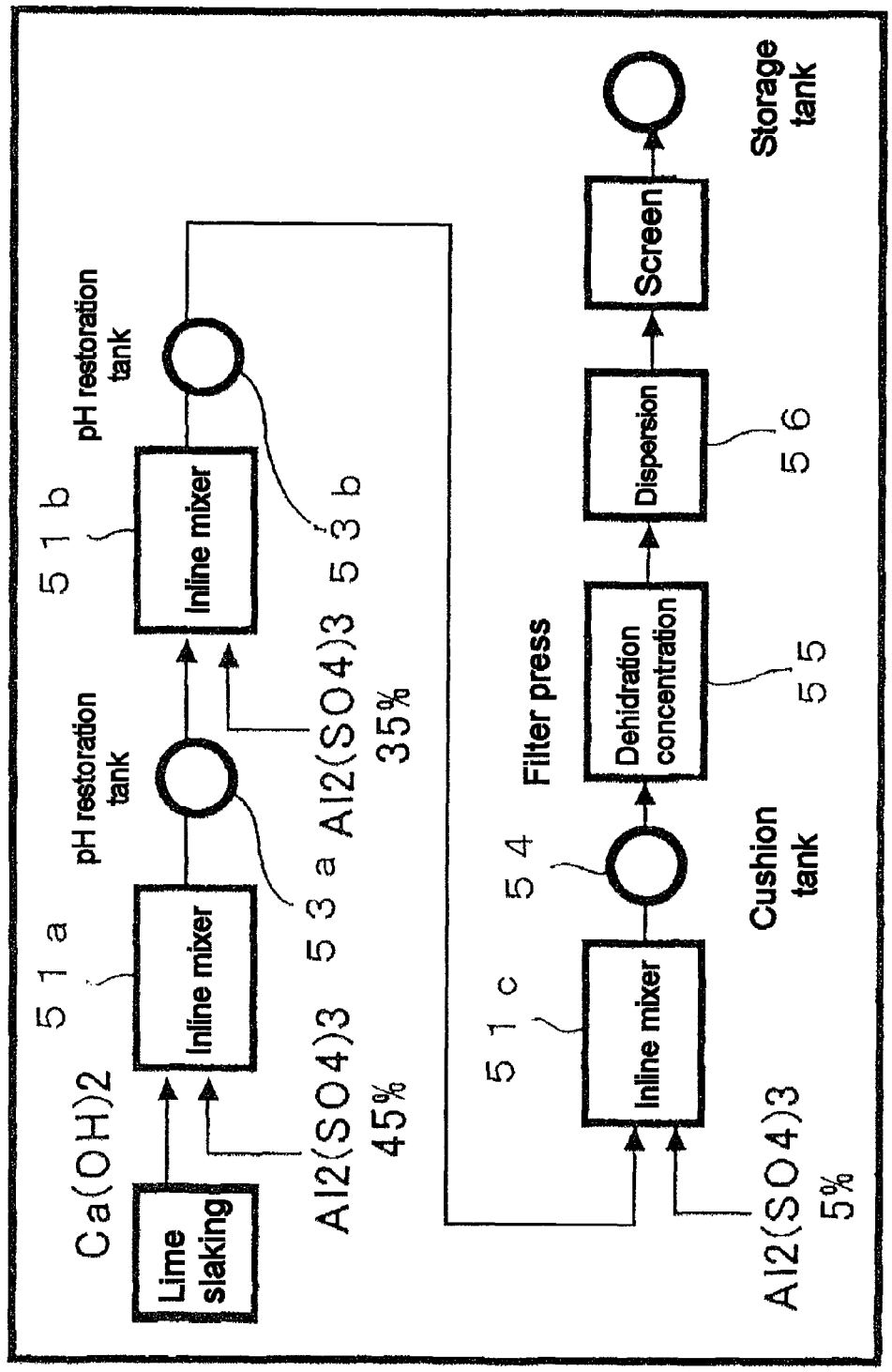
FIG. 4 shows a flow chart illustrating operational procedures of Example 1.

FIG. 4 shows a general flow diagram that illustrates the operating procedure of Example 1. The operation of Example 1 is explained with reference to FIG. 4. The "inline mixer" in FIG. 4 is the Pipeline Homo Mixer (trademark) manufactured by Tokushu Kika Kogyo Co., Ltd. (specifically, the TK Pipeline Homo Mixer), which was already described in FIG. 1. However, in this case the first stirring element 15a shown in FIG. 1 has been removed and stirring part 15 is composed of only the second stirring element 15b (so that, in this case, a Pipeline Homo Mixer with only one stirring element is used). Thus a Pipeline Homo Mixer manufactured by Tokushu Kika Kogyo Co., Ltd. (specifically the TK Pipeline Homo Mixer), from which the first stirring element 15a is removed and the stirring part 15 is composed of only the second stirring element 15b, is hereinafter referred to as "single-stirrer inline mixer."

(1) First-Stage Addition of Aqueous Aluminum Sulfate Solution to Calcium Hydroxide Suspension The previously mentioned 6% calcium hydroxide suspension and 6% aqueous aluminum sulfate solution were simultaneously and continuously injected at 300 g/min and 104 g/min (45% of the reference molar number; the method for calculation of the reference molar number will be discussed later), respectively, into the inline mixer 51a (Pipeline Homo Mixer), which was set to rotate at 9000 rpm. The injection was carried out for 14 minutes. The mixture composition thus obtained (the composition discharged from the inline mixer 15a) was continuously fed into the pH restoration tank 53a (intermediate tank in this invention) to stay there for 30 minutes and the pH was restored. The pH value of the mixture composition (hereinafter referred to as "first composition"), following the pH restoration, was 12.7.

The method for calculation of the reference molar number is briefly explained here. The molecular weights of calcium hydroxide and aluminum sulfate are 74.1 and 342.16, respectively. The solid content in the 6% calcium hydroxide suspension 300 g/min is 18 g/min, and its molar number (molar number in unit time) is 18/74.1=0.243 moles/minute. Therefore, the reference molar number (which is one-sixth the molar number of calcium hydroxide suspension) is 0.243×1/6=0.0405 moles/minute.

On the other hand, 104 g×6%=6.24 g/min aluminum sulfate is contained in 6% aqueous aluminum sulfate solution 104 g/min. When converted to a molar number, it becomes 6.24 g/min×1/342.16=0.0182 moles/min.

Therefore, the ratio of aqueous aluminum sulfate solution to be added in the first stage to the reference molar number is calculated as follows: (0.0182 moles/min)/(0.0405 moles/min)=45%.

(2) Addition of Aqueous Aluminum Sulfate Solution In Second Stage

As mentioned in (1) above, the previously mentioned mixture composition (first composition) and 6% aqueous aluminum sulfate solution were simultaneously and continuously injected at 404 g/min and 81 g/min (35% of the reference molar number), respectively, into the inline mixer 51b (Pipeline Homo Mixer), which was set to rotate at 9000 rpm. The injection was carried out for 12 minutes. The mixture composition thus obtained (as discharged from the inline mixer 51b) was continuously fed into the pH restoration tank 53b (the intermediate tank in this invention) and stayed there for 30 minutes to restore the pH. The pH value of the mixture composition following pH restoration (hereinafter referred to as the "second composition") was 12.5.

(3) Addition of Aqueous Aluminum Sulfate Solution In Third Stage (End of Reaction)

As mentioned in (2) above, the previously mentioned mixture composition (second composition) and 6% aqueous aluminum sulfate solution were simultaneously and continuously injected at 485 g/min and 11 g/min (5% of the reference molar number), respectively, into the inline mixer 51c (Pipeline Homo Mixer), which was made to rotate at 9000 rpm. The injection was carried out for 10 minutes. (end of reaction) The mixture composition thus obtained (the composition discharged from the inline mixer 51c) was continuously fed into the cushion tank 54 to obtain the composition after the reaction (hereinafter referred to as the "post-reaction composition"). The pH of post-reaction composition was 12.5.

The calculation method of the ratio '(a/b)' of the molar number 'a' of the calcium hydroxide suspension (A) to the molar number 'b' of the total amount of the aqueous aluminum sulfate solution (B) added in the plurality of stages is briefly explained here.

The amount of 6% calcium hydroxide last used is 300 g/min×10 minutes=3000 g, while its solid content is 180 g. Thus, the molar number 'a' of $Ca(OH)_2$ is 2.43 moles.

Furthermore, the total amount of 6% aluminum sulfate added in the plurality of stages is 196 g/min×10 minutes=1960 g, while its solid content is 117.6 g. Thus, the molar number 'b' of $Al_2(SO_4)_3$ is 0.344 moles.

Therefore, the mole ratio $(Ca(OH)_2/Al_2(SO_4)_3=a/b)$ is 7.1.

Additionally, the proportion of total amount of aluminum sulfate added was 85% of the reference molar number (=45%+35%+5%).

The post-reaction composition (post-reaction composition, original composition) was dehydrated by filter press 55 to form an approximately 32 to 34% composition (dehydration composition). This was followed by the redispersion 56 of the dehydrated composition in water to make the solid content 27%. In such redispersion process 56, a polyacrylic dispersion agent (trademark Aron T-50; manufactured by Toa Gosei Kagaku) was added beforehand to the dehydrated composition at a ratio of 0.5 parts to the amount of solid content. The amount of dispersion agent added was adjusted so that the viscosity of the redispersed composition solution was approximately 10 mPa·s. The amount of dispersion agent required to attain the prescribed viscosity (around 10 mPa·s) was in the ratio of 3.0 parts to the solid content in the composition.

As in the example, the post-reaction compositions (post-reaction composition, original composition) in the Examples 2-18 and comparative Examples 1 and 2 were also dehydrated by filter press to form a dehydrated composition, which was followed by redispersion 56 in water.

EXAMPLE 2

The post-reaction composition was obtained in the same way as in Example 1, except for the pH restoration time of 1 min. (30 min. in Example 1) set before carrying out the second and third stages of aluminum sulfate addition. The pH values of each mixture composition after pH restoration, before the second and third stages of addition of aqueous aluminum sulfate solution, were 12.2 and 11.8, respectively.

Furthermore, the amount of dispersion agent required to redisperse the post-reaction composition to form a 27% dispersion solution and attain the prescribed viscosity was in the ratio of 3.0 parts to the solid content in the composition.

EXAMPLE 3

The post-reaction composition was obtained in the same way as in Example 1, except that the aqueous aluminum sulfate solution was added in the first stage at 185 g/min (80% of the reference molar number); the mixture composition (first composition) and aqueous aluminum sulfate solution were added in the second stage at 485 g/min and 35 g/min (15% of the reference molar number), respectively; and the mixture composition (second composition) and aqueous aluminum sulfate solution were added in the third stage at 520 g/min and 11 g/min (5% of the reference molar number), respectively. In this case, the pH value of each mixture composition after the pH restoration, prior to the second and third stages of addition of aqueous aluminum sulfate solution, were 12.8 and 12.4, respectively.

In Example 3 the amount of 6% calcium hydroxide last used is 300 g/min×10 minutes=3000 g, while its solid content is 180 g. Thus the molar number 'a' of $Ca(OH)_2$ is 2.43 moles.

Furthermore, the total amount of 6% aluminum sulfate added in the plurality of stages is 231 g/min×10 minutes=2310 g, while its solid content is 138.6 g. Thus, the molar number 'b' of $Al_2(SO_4)_3$ is 0.405 moles.

Therefore, the molar ratio $(Ca(OH)_2/Al_2(SO_4)_3=a/b)$ is 6.0.

Additionally, the proportion of total amount of aluminum sulfate added was 100% of the reference molar number while the pH value of the post-reaction composition was 10.6. Furthermore, the amount of dispersion agent required to redisperse the post-reaction composition to form a 27% dispersion solution and attain the prescribed viscosity was in the ratio of 2.5 parts to the solid content in the composition.

EXAMPLE 4

Additions in Three Stages in which the Ratio of Each Addition was Changed

The post-reaction composition was obtained in the same way as in Example 1, except that the aqueous aluminum sulfate solution was added in the first stage at 58 g/min (25% of the reference molar number); the mixture composition (first composition) and aqueous aluminum sulfate solution were added in the second stage at 358 g/min and 162 g/min (70% of the reference molar number), respectively; and the mixture composition (second composition) and aqueous aluminum sulfate solution were added in the third stage at 520 g/min and 11 g/min (5% of the reference molar number), respectively. In this case the pH value of each mixture composition (first composition and second composition) after the pH restoration, prior to the second and third stages of the addition of aqueous aluminum sulfate solution, were 12.8 and 12.4, respectively.

In the Example 4 the amount of 6% calcium hydroxide last used is 300 g/min×10 minutes=3000 g, while its solid content is 180 g. Thus, the molar number 'a' of $Ca(OH)_2$ is 2.43 moles.

Furthermore, the total amount of 6% aluminum sulfate added in the plurality of stages is 231 g/min×10 minutes=2310 g, while its solid content is 138.6 g. Thus, the molar number of $Al_2(SO_4)_3$ "b" is 0.405 moles.

Therefore, the mole ratio $(Ca(OH)_2/Al_2(SO_4)_3=a/b)$ is 6.0.

Additionally, the proportion of total amount of aluminum sulfate added was 100% of the reference molar number while the pH value of the post-reaction composition was 9.7. Furthermore, the amount of dispersion agent required to redisperse the post-reaction composition to form a 27% dispersion solution and attain the prescribed viscosity was in the ratio of 2.5 parts to the solid content in the composition.

EXAMPLE 5

Additions in Four Stages

Only the last addition in the fourth stage was carried out by the "batch method", i.e. three continuous additions in the first to third stages+the batch method in the last stage.

Figure 5:
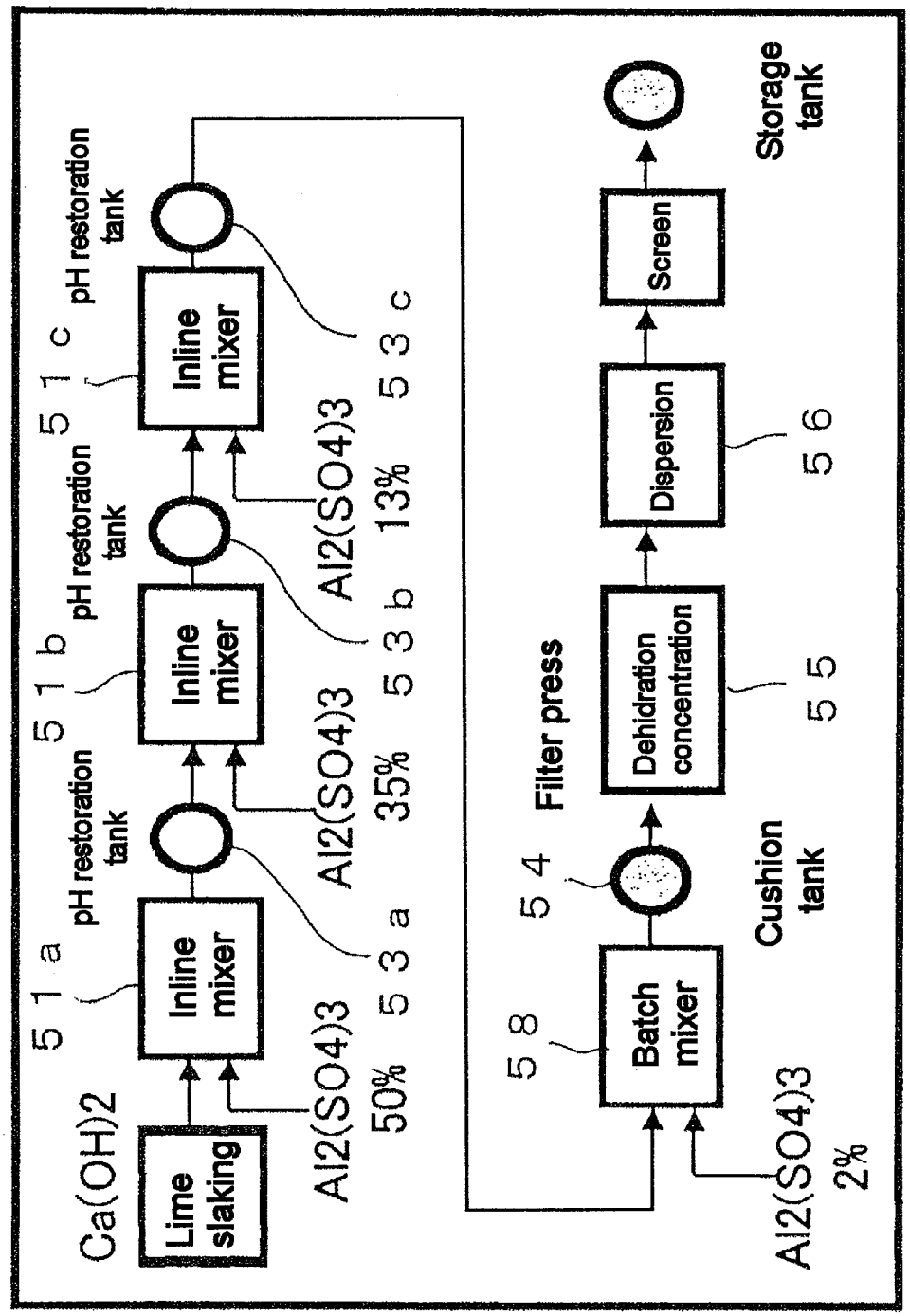
FIG. 5 shows a flow chart illustrating operational procedures of Example 5.

FIG. 5 shows a general flow diagram that illustrates the operating procedure of Example 5. The operation of Example 5 is explained with reference to FIG. 5. The inline mixer shown in FIG. 5 is a single-stirrer inline mixer (the same as the Pipeline Homo Mixer manufactured by Tokushu Kika Kogyo Co., Ltd. as shown in FIG. 1), where the first stirring element 15a was removed from the stirring part 15 and was composed of only the second stirring element 15b. (In other words, the stirring part used here is a single-stirrer Pipeline Homo Mixer.)

(1) Addition of Aqueous Aluminum Sulfate Solution to Calcium Hydroxide Suspension in First Stage The previously mentioned 6% calcium hydroxide suspension and 6% aqueous aluminum sulfate solution were simultaneously and continuously injected at 300 g/min and 115 g/min (50% of the reference molar number), respectively, into the inline mixer 51a (Pipeline Homo Mixer, mixing means), which was set to rotate at 9000 rpm. The injection was carried out for 16 minutes continuously. The mixture composition thus obtained (the composition discharged from the inline mixer 15a) was then continuously fed into the pH restoration tank 53a (intermediate tank in this invention) to stay there for 30 minutes and the pH was restored. The pH value of the mixture composition (hereinafter referred to as the first composition") after pH restoration was 12.8.

(2) Addition of Aqueous Aluminum Sulfate Solution in Second Stage

As mentioned in (1) above, the previously mentioned mixture composition (first composition) and 6% aqueous aluminum sulfate solution were simultaneously and continuously injected at 415 g/min and 81 g/min (35% of the reference molar number), respectively, into the inline mixer 51b (Pipeline Homo Mixer), which was set to rotate at 9000 rpm. The injection was carried out for 14 minutes continuously. The mixture composition thus obtained (the composition discharged from the inline mixer 51b) was continuously fed into the pH restoration tank 53b (intermediate tank in this invention) to stay there for 30 minutes and restore the pH. The pH value of the mixture composition following the pH restoration (hereinafter referred to as the "second composition") was 12.7.

(3) Addition of Aqueous Aluminum Sulfate Solution in Third Stage

As mentioned in (2) above, the previously mentioned mixture composition (second composition) and 6% aqueous aluminum sulfate solution were continuously and simultaneously injected at 496 g/min and 30 g/min (13% of the reference molar number), respectively, into the inline mixer 51c (Pipeline Homo Mixer), which was made to rotate at 9000 rpm. The injection was carried out for 12 minutes continuously. The mixture composition thus obtained (the composition discharged from the inline mixer 51c) was continuously fed into the pH restoration tank 53c (intermediate tank in this invention) to stay there for 30 minutes and to restore the pH. The pH value of the mixture composition (hereinafter referred to as the "third composition") following the pH restoration was 12.4.

(4) Addition of Aqueous Aluminum Sulfate Solution in Fourth Stage (End of Reaction)

The addition of aqueous aluminum sulfate solution in the fourth stage was carried out by batch operation (batch method). Using a reaction vessel 58, which has a stirring apparatus (propeller mixer) inside it, 5260 g of the aforementioned mixture composition (part of the third composition, which was added for 10 minutes continuously) was firstly stocked up in the reaction vessel 58 and stirred by the stirring apparatus (propeller mixer, not shown in the figure). Furthermore, 46 g of 6% aqueous aluminum sulfate solution (equivalent to 4.6 g/min (=2% of reference molar number)×10 minutes) was dropped by the "batch method" at the rate of 1.0 g/min so as to add the aqueous aluminum sulfate solution to the aforementioned mixture composition (third composition). In this way, a composition after the after the end of the reaction (hereinafter referred to as "post-reaction composition") was obtained. Here, the post-reaction composition was received by the cushion tank 54 for the sake of convenience.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 5, is briefly explained here.

The amount of 6% calcium hydroxide last used is 3000 g, while its solid content is 180 g. Thus the molar number 'a' of $Ca(OH)_2$ is 2.43 moles.

Furthermore, the total amount of 6% aluminum sulfate added in the plurality of stages is 2306 g, while its solid content is 138.4 g. Thus the molar number 'b' of $Al_2(SO_4)_3$ is 0.404 moles.

Therefore, the mole ratio $(Ca(OH)_2/Al_2(SO_4)_3=a/b)$ is 6.0.

The proportion of total amount of aluminum sulfate added was 100% of the reference molar number. The pH value of the mixture composition after the end of the reaction (post-reaction composition) was 9.4.

The composition after the end of the reaction (post-reaction composition) was dehydrated by filter press 55 to form an approximate solid content 32%-34% composition. This was followed by the redispersion 56 of the dehydrated composition in water to make the solid content 27%. In this redispersion process 56, a polyacrylic dispersion agent (trademark Aron T-50, manufactured by Toa Gosei Kagaku) was added to the water at a ratio of 0.5 parts to the amount of solid content of the composition (dehydration composition). The amount of dispersion added was adjusted so that the viscosity of the redispersed composition solution was approximately 10 mPa·s. The amount of dispersion agent required to attain the prescribed viscosity (around 10 mPa·s) was in the ratio of 1.0 part to the solid content in the composition.

EXAMPLE 6

Five Additions in Five Stages, Continuous Additions were Carried Out in Five Stages (1) Addition of Aqueous Aluminum Sulfate Solution to Calcium Hydroxide Suspension in First Stage The previously mentioned 6% calcium hydroxide suspension and 6% aqueous aluminum sulfate solution were continuously and simultaneously injected at 300 g/min and 69/min (30% of the reference molar number), respectively, into the inline mixer (Pipeline Homo Mixer). (All the inline mixers used in Example 6 are of the single-stirrer inline mixer type. It is same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer inline mixer.) The mixer was set to rotate at 9000 rpm. The injection was carried out for 18 minutes continuously. The mixture composition thus obtained (the composition discharged from said inline mixer) was continuously fed into the pH restoration tank (intermediate tank in this invention) to reside there for 30 minutes and restore the pH. The pH value of the mixture composition following the pH restoration (hereinafter referred to as the "first composition") was 12.8.

(2) Addition of Aqueous Aluminum Sulfate Solution in Second Stage

As mentioned in (1) above, the previously mentioned mixture composition (first composition) and 6% aqueous aluminum sulfate solution were continuously and simultaneously injected at 369 g/min and 46 g/min (20% of the reference molar number), respectively, into the inline mixer (Pipeline Homo Mixer), which was set to rotate at 9000 rpm. The injection was carried out for 16 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as the "second composition") was 12.7.

(3) Addition of Aqueous Aluminum Sulfate Solution in the Third Stage

As mentioned in (2) above, the previously mentioned mixture composition (second composition) and 6% aqueous aluminum sulfate solution were continuously and simultaneously injected at 415 g/min and 46 g/min (20% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter referred to as the "third composition") was 12.4.

(4) Addition of Aqueous Aluminum Sulfate Solution in the Fourth Stage

As mentioned in (2) above, the previously mentioned mixture composition (third composition) and 6% aqueous aluminum sulfate solution were continuously and simultaneously injected at 461 g/min and 46 g/min (20% of the reference molar number), respectively, into the inline mixer (Pipeline Homo Mixer), which was set to rotate at 9000 rpm. The injection was carried out for 12 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter referred to as the "fourth composition") was 12.4.

(5) Addition of Aqueous Aluminum Sulfate Solution in The Fifth Stage (End of Reaction)

As mentioned in (2) above, the previously mentioned mixture composition (fourth composition) and 6% aqueous aluminum sulfate solution were continuously and simultaneously injected at 507 g/min and 35 g/min (15% of the reference molar number), respectively, into the inline mixer (Pipeline Homo Mixer), which was set to rotate at 9000 rpm. The injection was carried out for 10 minutes until the end, and the composition after the end of the reaction (post-reaction composition) was thus obtained.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 6 is briefly explained.

The amount of 6% calcium hydroxide last used was 300 g/min×10 minutes=3000 g, while its solid content was 180 g. Thus, the molar number 'a' of $Ca(OH)_2$ is 2.43 moles.

Furthermore, the total amount of 6% aluminum sulfate added in the plurality of stages is 242 g/min×10 minutes=2420 g, while its solid content is 145.2 g. Thus the molar number 'b' of $Al_2(SO_4)_3$ is 0.424 moles.

Therefore, the mole ratio $(Ca(OH)_2/Al_2(SO_4)_3=a/b)$ is 5.7.

Additionally, the proportion of total amount of aluminum sulfate added was 105% of the reference molar number. The pH value of the mixture composition after the end of the reaction (post-reaction composition) was 9.2.

Furthermore, the amount of dispersion agent required to redisperse the composition after the end of the reaction (post-reaction composition) to form a 27% dispersion solution and attain the prescribed viscosity was in the ratio of 1.5 parts to the solid content in the composition.

EXAMPLE 7

Seven Additions in Seven Stages, Continuous Additions were Carried Out in Seven Stages (1) Addition of Aqueous Aluminum Sulfate Solution to Calcium Hydroxide Suspension in First Stage The previously mentioned 6% calcium hydroxide suspension and 6% aqueous aluminum sulfate solution were continuously and simultaneously injected at 300 g/min and 34.5 g/min (15% of the reference molar number), respectively, into the inline mixer (Pipeline Homo Mixer. All the inline mixers used in Example 7 are single-stirrer inline mixer. (It is same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer Pipeline Homo Mixer.") The mixer was set to rotate at 9000 rpm. The injection was carried out for 22 minutes continuously. The mixture composition thus obtained (the composition discharged from said inline mixer) was continuously fed into the pH restoration tank (intermediate tank in this invention) to stay there for 30 minutes and restore the pH. The pH value of the mixture composition following the pH restoration (hereinafter referred to as the "first composition") was 12.8.

(2) Addition of Aqueous Aluminum Sulfate Solution in Second Stage

As mentioned in (1) above, the previously mentioned mixture composition (first composition) and 6% aqueous aluminum sulfate solution were continuously and simultaneously injected at 334.5 g/min and 34.5 g/min (15% of the reference molar number), respectively, into the inline mixer (Pipeline Homo Mixer), which was set to rotate at 9000 rpm. The injection was carried out for 20 minutes continuously. The mixture composition thus obtained (the composition discharged from the inline mixer) was continuously fed into the pH restoration tank (intermediate tank in this invention) and stayed there for 30 minutes to regain the pH. The pH value of said mixture composition following the pH restoration (hereinafter referred to as the "second composition") was 12.8.

(3) Addition of Aqueous Aluminum Sulfate Solution in Third Stage

As mentioned in (2) above, the previously mentioned mixture composition (second composition) and 6% aqueous aluminum sulfate solution were continuously and simultaneously injected at 369 g/min and 34.5 g/min (15% of the reference molar number), respectively, into the inline mixer (Pipeline Homo Mixer), which was set to rotate at 9000 rpm. Said injection was carried out for 18 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter referred to as the "third composition") was 12.8.

(4) Addition of Aqueous Aluminum Sulfate Solution in the Fourth Stage

As mentioned in (2) above, the previously mentioned mixture composition (third composition) and 6% aqueous aluminum sulfate solution were continuously and simultaneously injected at 403.5 g/min and 34.5 g/min (15% of the reference molar number), respectively, into the inline mixer (Pipeline Homo Mixer), which was set to rotate at 9000 rpm. The injection was carried out for 16 minutes continuously. The mixture composition thus obtained (the composition discharged from the inline mixer) was continuously fed into the pH restoration tank (intermediate tank in this invention) to stay there for 30 minutes and restore its pH. The pH value of the mixture composition following the pH restoration (hereinafter referred to as "fourth composition") was 12.6.

(5) Addition of Aqueous Aluminum Sulfate Solution in the Fifth Stage

As mentioned in (2) above, the previously mentioned mixture composition (fourth composition) and 6% aqueous aluminum sulfate solution were continuously and simultaneously injected at 438 g/min and 34.5 g/min (15% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as the "fifth composition") was 12.6.

(6) Addition of Aqueous Aluminum Sulfate Solution in the Sixth Stage

As mentioned in (2) above, the previously mentioned mixture composition (fifth composition) and 6% aqueous aluminum sulfate solution were continuously and simultaneously injected at 472.5 g/min and 34.5 g/min (15% of the reference molar number), respectively, into the inline mixer (Pipeline Homo Mixer), which was set to rotate at 9000 rpm. The injection was carried out for 12 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as the "sixth composition") was 12.4.

(7) Addition of Aqueous Aluminum Sulfate Solution in the Seventh Stage (End of Reaction)

As mentioned in (2) above, the previously mentioned mixture composition (sixth composition) and 6% aqueous aluminum sulfate solution were continuously and simultaneously injected at 507 g/min and 23 g/min (10% of the reference molar number), respectively, into the inline mixer (Pipeline Homo Mixer), which was set to rotate at 9000 rpm. The injection was carried out for 10 minutes until the end, and the composition after the end of the reaction (post-reaction composition) was thus obtained.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 7 is briefly explained here.

The amount of 6% calcium hydroxide last used is 300 g/min×10 minutes=3000 g, while its solid content is 180 g. Thus, the molar number 'a' of $Ca(OH)_2$ is 2.43 moles.

Furthermore, the total amount of 6% aluminum sulfate added in the plurality of stages is 230 g/min×10 minutes=2300 g, while its solid content is 138 g. Thus, the molar number 'b' of $Al_2(SO_4)_3$ is 0.403 moles.

Therefore, the mole ratio $(Ca(OH)_2/Al_2(SO_4)_3=a/b)$ is 6.0.

Additionally, the proportion of total amount of aluminum sulfate added was 100% of the reference molar number. The pH value of the mixture composition after the end of the reaction (post-reaction composition) was 9.6.

Furthermore, the amount of dispersion agent required to redisperse the composition after the end of the reaction (post-reaction composition) to form a 27% dispersion solution and attain the prescribed viscosity was in the ratio of 1.5 parts to the solid content in the composition.

EXAMPLE 8

Increase of Concentration in the Calcium Hydroxide Suspension (1) Addition of Aqueous Aluminum Sulfate Solution to Calcium Hydroxide Suspension in First Stage The previously mentioned 10% calcium hydroxide suspension and 6% aqueous aluminum sulfate solution were continuously and simultaneously injected at 180 g/min and 115 g/min (50% of the reference molar number), respectively, into the inline mixer. (This was the Pipeline Homo Mixer. All the inline mixers used in Example 7 are of the single-stirrer inline mixer type. This is the same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer Pipeline Homo Mixer.) The mixer was set to rotate at 9000 rpm. The injection was carried out for 16 minutes continuously. The mixture composition thus obtained (the composition discharged from the inline mixer 15a) was continuously fed into the pH restoration tank (intermediate tank in this invention) to stay there for 30 minutes and restore the pH. The pH value of the mixture composition following the pH restoration (hereinafter referred to as the "first composition") was 12.8.

(2) Addition of Aqueous Aluminum Sulfate Solution in Second Stage

As mentioned in (1) above, the previously mentioned mixture composition (first composition) and 6% aqueous aluminum sulfate solution were continuously and simultaneously injected at 295 g/min and 81 g/min (35% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as the "second composition") was 12.7.

(3) Addition of Aqueous Aluminum Sulfate Solution in Third Stage

As mentioned in (2) above, the previously mentioned mixture composition (second composition) and 6% aqueous aluminum sulfate solution were continuously and simultaneously injected at 376 g/min and 30 g/min (13% of the reference molar number), respectively, into the inline mixer (Pipeline Homo Mixer), which was set to rotate at 9000 rpm. The injection was carried out for 12 minutes. The mixture composition thus obtained (the composition discharged from said inline mixer) was continuously fed into the pH restoration tank (intermediate tank in this invention) to stay there for 30 minutes and regain the pH. The pH value of the mixture composition (hereinafter referred to as the "third composition") following the pH restoration was 12.4.

(4) Addition of Aqueous Aluminum Sulfate Solution in Fourth Stage (End of Reaction)

The addition of aqueous aluminum sulfate solution in the fourth stage was carried out by batch operation (batch method), as in the Example 5. Using a reaction vessel 58, which has a stirring apparatus (propeller mixer) inside it, 4060 g of the aforementioned mixture composition (part of the third composition which was added for 10 minutes continuously) was firstly stocked-up in the reaction vessel and was stirred by the stirring apparatus (propeller mixer). Furthermore, 46 g of 6% aqueous aluminum sulfate solution (4.6 g/min (=2% of the reference molar number)×part of aqueous aluminum sulfate solution which was added for 10 minutes continuously) was dropped at the rate of 1.0 g/min by the "batch method" and added to the aforementioned mixture composition (third composition). In this way the composition (hereinafter referred to as the "post-reaction composition") was obtained following the reaction.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 8 is briefly explained here.

The amount of 10% calcium hydroxide last used is 1800 g, while its solid content is 180 g. Thus the molar number 'a' of $Ca(OH)_2$ is 2.43 moles.

Furthermore, the total amount of 6% aluminum sulfate added in the plurality of stages is 2306 g, while its solid content is 138.4 g. Thus, the molar number 'b' of $Al_2(SO_4)_3$ is 0.404 moles.

Therefore, the mole ratio $(Ca(OH)_2/Al_2(SO_4)_3=a/b)$ is 6.0.

Additionally, the proportion of total amount of aluminum sulfate added was 100% of the reference molar number. The pH value of the mixture composition after the end of the reaction (post-reaction composition) was 9.6.

Furthermore, the amount of dispersion agent required to redisperse the composition after the end of the reaction (post-reaction composition) to form a 27% dispersion solution and attain the prescribed viscosity was in the ratio of 2.0 parts to the solid content in the composition.

EXAMPLE 9

Increase of Concentration in the Calcium Hydroxide Suspension (1) Addition of Aqueous Aluminum Sulfate Solution to Calcium Hydroxide Suspension in First Stage The previously mentioned 6% calcium hydroxide suspension and 10% aqueous aluminum sulfate solution were continuously and simultaneously injected at 300 g/min and 69 g/min (50% of the reference molar number), respectively, into the inline mixer. (This was the Pipeline Homo Mixer. All the inline mixers used in Example 9 are of the single-stirrer inline mixer type. It is same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer Pipeline Homo Mixer.) The mixer was set to rotate at 9000 rpm. The injection was carried out for 16 minutes continuously. The mixture composition thus obtained (the composition discharged from the inline mixer 15a) was continuously fed into the pH restoration tank (intermediate tank in this invention) to reside there for 30 minutes and regain the pH. The pH value of the mixture composition following pH restoration (hereinafter referred to as the "first composition") was 12.8.

(2) Addition of Aqueous Aluminum Sulfate Solution in Second Stage

As mentioned in (1) above, the previously mentioned mixture composition (first composition) and 10% aqueous aluminum sulfate solution were continuously and simultaneously injected at 369 g/min and 49 g/min (35% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following pH restoration (hereinafter referred to as the "second composition") was 12.7.

(3) Addition of Aqueous Aluminum Sulfate Solution in Third Stage

As mentioned in (2) above, the previously mentioned mixture composition (second composition) and 10% aqueous aluminum sulfate solution were continuously and simultaneously injected at 418 g/min and 18 g/min (13% of the reference molar number), respectively, into the inline mixer (Pipeline Homo Mixer), which was set to rotate at 9000 rpm. The injection was carried out for 12 minutes continuously. The mixture composition thus obtained (the composition discharged from the inline mixer) was continuously fed into the pH restoration (intermediate tank in this invention) to stay there for 30 minutes and restore the pH. The pH value of said mixture composition following the pH restoration (hereinafter referred to as the "third composition") was 12.4.

(4) Addition of Aqueous Aluminum Sulfate Solution in the Fourth Stage (End of Reaction)

The addition of aqueous aluminum sulfate solution in the fourth stage was carried out by batch operation (batch method), as in the Example 5. Using a reaction vessel that has a stirring apparatus (propeller mixer) inside it, 4180 g of the aforementioned mixture composition (part of the third composition, which was added for 10 minutes continuously) was first stocked up in the reaction vessel and stirred by the stirring apparatus (propeller mixer). Furthermore, 27 g of 10% aqueous aluminum sulfate solution (2.7 g/min (=2% of the reference molar number)×part of aqueous aluminum sulfate solution which was added for 10 minutes continuously) was dropped at the rate of 1.0 g/min by the "batch method" and added to the aforementioned mixture composition (third composition). In this way the composition (hereinafter referred to as the "post-reaction composition") was obtained following the reaction.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 9 is briefly explained here.

The amount of 6% calcium hydroxide last used is 3000 g, while its solid content is 180 g. Thus the molar number 'a' of $Ca(OH)_2$ is 2.43 moles.

Furthermore, the total amount of 10% aluminum sulfate added in the plurality of stages is 1387 g, while its solid content is 138.7 g. Thus, the molar number 'b' of $Al_2(SO_4)_3$ is 0.405 moles.

Therefore, the mole ratio $(Ca(OH)_2/Al_2(SO_4)_3=a/b)$ is 6.0.

Additionally, the proportion of total amount of aluminum sulfate added was 100% of the reference molar number. The pH value of the mixture composition after the end of the reaction (post-reaction composition) was 9.7.

Furthermore, the amount of dispersion agent required to redisperse the composition after the end of the reaction (post-reaction composition) to form a 27% dispersion solution and attain the prescribed viscosity was in the ratio of 2.0 parts to the solid content in the composition.

EXAMPLE 10

Additions in Plural Stages, Short pH Restoration Time

The mixture composition (post-reaction composition) was obtained in the same way as in Example 1, except for the pH restoration time of 0.15 min (9 seconds) set before carrying out the second and third stages of the addition of aluminum sulfate. The pH value of each mixture composition after the pH restoration and before the second and third additions of aqueous aluminum sulfate solution in the second and third stages, were 11.6 (first composition) and 10.8 (second composition), respectively.

The molar ratio '(a/b)' of the molar number 'a' of the calcium hydroxide suspension (A) to the molar number 'b' of the total amount of the aqueous aluminum sulfate solution (B) added in the multistage addition in Example 10 was 7.1, which is the same as in Example 1.

Additionally, the proportion of total amount of aluminum sulfate added was 85% of the reference molar number. The pH value of the mixture composition after the end of the reaction (post-reaction composition) was 12.5.

Furthermore, the amount of dispersion agent required to redisperse the composition after the end of the reaction (post-reaction composition) to form a 27% dispersion solution and attain the prescribed viscosity was in the ratio of 3.5 parts to the solid content in the composition.

EXAMPLE 11

Additions in Plural Stages, Molar Ratio 'a/b' of Final Mixture Less Than 5.5

The mixture composition (post-reaction composition) was obtained in the same way as in Example 6, except that the addition of aqueous aluminum sulfate solution in the final and fifth stage of Example 6 was done with 6% aqueous aluminum sulfate solution added at 58 g/min (25% of the reference molar number).

The calculation method of the ratio '(a/b)' of the molar number 'a' of the calcium hydroxide suspension (A) to the molar number 'b' of the total amount of the aqueous aluminum sulfate solution (B) added in the plurality of stages in Example 11 is briefly explained here.

The amount of 6% calcium hydroxide last used is 300 g/min×10 minutes=3000 g, while its solid content is 180 g. Therefore, the molar number 'a' of $Ca(OH)_2$ is 2.43 moles.

Furthermore, the total amount of 6% aluminum sulfate added in the plurality of stages is 265 g/min×10 minutes=2650 g, while its solid content is 159 g. Thus, the molar number 'b' of $Al_2(SO_4)_3$ is 0.465 moles.

Therefore, the mole ratio $(Ca(OH)_2/Al_2(SO_4)_3=a/b)$ is 5.2.

Additionally, the proportion of total amount of aluminum sulfate added was 115% of the reference molar number. The pH value of the mixture composition after the end of the reaction (post-reaction composition) was 8.9.

Furthermore, the amount of dispersion agent required to redisperse the composition after the end of the reaction (post-reaction composition) to form a 27% dispersion solution and attain the prescribed viscosity was in the ratio of 4.0 parts to the solid content in the composition.

EXAMPLE 12

Addition in Plural Stages, Molar Ratio 'a/b' of Final Mixture Exceeding 8.0

(1) Addition of Aqueous Aluminum Sulfate Solution to Calcium Hydroxide Suspension in First Stage The previously mentioned 6% calcium hydroxide suspension and 6% aqueous aluminum sulfate solution were continuously and simultaneously injected at 300 g/min and 104 g/min (45% of the reference molar number), respectively, into the inline mixer. (This was the Pipeline Homo Mixer. All the inline mixers used in Example 12 are of the single-stirrer inline mixer type. It is same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer Pipeline Homo Mixer.) The mixer was set to rotate at 9000 rpm. The injection was carried out for 12 minutes continuously. The mixture composition thus obtained (the composition discharged from said inline mixer) was continuously fed into the pH restoration tank (intermediate tank in this invention) to stay there for 30 minutes and restore the pH. The pH value of the mixture composition following the pH restoration (hereinafter referred to as the "first composition") was 12.8.

(2) Addition of Aqueous Aluminum Sulfate Solution in the Second Stage

As mentioned in (1) above, the previously mentioned mixture composition (first composition) and 6% aqueous aluminum sulfate solution were continuously and simultaneously injected at 404 g/min and 65 g/min (28% of the reference molar number), respectively, into the inline mixer (Pipeline Homo Mixer), which was set to rotate at 9000 rpm. The injection was carried out for 10 minutes until the end, and the composition after the end of the reaction (post-reaction composition) was thus obtained.

The calculation method of the ratio '(a/b)' of the molar number 'a' of the calcium hydroxide suspension (A) to the molar number 'b' of total amount of the aqueous aluminum sulfate solution (B) added in the plurality of stages in Example 12 is briefly explained here.

The amount of 6% calcium hydroxide last used is 300 g/min×10 minutes=3000 g, while its solid content is 180 g. Thus, the molar number 'a' of $Ca(OH)_2$ is 2.43 moles.

Furthermore, the total amount of 6% aluminum sulfate added in the plurality of stages is 169 g/min×10 minutes=1690 g, while its solid content is 101.4 g. Thus, the molar number 'b' of $Al_2(SO_4)_3$ is 0.269 moles.

Therefore, the mole ratio $(Ca(OH)_2/Al_2(SO_4)_3$=a/b) is 8.2.

Additionally, the proportion of total amount of aluminum sulfate added was 73% of the reference molar number. The pH value of the mixture composition after the end of the reaction (post-reaction composition) was 12.6.

Furthermore, the amount of dispersion agent required to redisperse the mixture composition after the end of the reaction (post-reaction composition) to form a 27% dispersion solution and attain the prescribed viscosity was in the ratio of 5.5 parts to the solid content in the composition.

EXAMPLE 13

Concentration of Aqueous Aluminum Sulfate Solution Exceeding 12%

(1) Addition of Aqueous Aluminum Sulfate Solution to Calcium Hydroxide suspension in first stage The previously mentioned 6% calcium hydroxide suspension and 14% aqueous aluminum sulfate solution were continuously and simultaneously injected at 300 g/min and 49.5 g/min (50% of the reference molar number), respectively, into the inline mixer. (This was the Pipeline Homo Mixer. All the inline mixers used in Example 13 are of the single-stirrer inline mixer type. It is the same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer Pipeline Homo Mixer.) The mixer was set to rotate at 9000 rpm. The injection was carried out for 16 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter referred to as the "first composition") was 12.8.

(2) Addition of Aqueous Aluminum Sulfate Solution in Second Stage

As mentioned in (1) above, the previously mentioned mixture composition (first composition) and 14% aqueous aluminum sulfate solution were continuously and simultaneously injected at 349.5 g/min and 34.5 g/min (35% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as the "second composition") was 12.7.

(3) Addition of Aqueous Aluminum Sulfate Solution in Third Stage

As mentioned in (2) above, the previously mentioned mixture composition (second composition) and 14% aqueous aluminum sulfate solution were continuously and simultaneously injected at 384 g/min and 13 g/min (13% of the reference molar number), respectively, into the inline mixer (Pipeline Homo Mixer), which was set to rotate at 9000 rpm. The injection was carried out for 12 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter referred to as the "third composition") was 12.4.

(4) Addition of Aqueous Aluminum Sulfate Solution in Fourth Stage (End of Reaction)

The addition of aqueous aluminum sulfate solution in the fourth stage was carried out by batch operation (batch method), as in the Example 5. Using the reaction vessel which has a stirring apparatus (propeller mixer) inside it, 3970 g of the aforementioned mixture composition (part of the third composition which was continuously added in 10 minutes) was first stocked up in the reaction vessel and stirred by the stirring apparatus (propeller mixer). Furthermore, 20 g of 14% aqueous aluminum sulfate solution (2.0 g/min (=2% of the reference molar number)×part of the third composition, which was added for 10 minutes continuously) was dropped at the rate of 1.0 g/min by "batch method" and added to the aforementioned mixture composition (third composition). In this way the composition (hereinafter referred to as the "post-reaction composition") was obtained following the reaction.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 13 is briefly explained here.

The amount of 6% calcium hydroxide last used is 3000 g, while its solid content is 180 g. Thus, the molar number 'a' of $Ca(OH)_2$ is 2.43 moles.

Furthermore, the total amount of 14% aluminum sulfate added in the plurality of stages is 990 g/min, while its solid content is 138.6 g. Thus the molar number 'b' of $Al_2(SO_4)_3$ is 0.405 moles.

Therefore, the mole ratio $(Ca(OH)_2/Al_2(SO_4)_3=a/b)$ is 6.0.

Additionally, the proportion of total amount of aluminum sulfate added was 100% of the reference molar number. The pH of the mixture composition after the end of the reaction (post-reaction composition) was 12.2.

Furthermore, the amount of dispersion agent required to redisperse the composition after the end of the reaction (post-reaction composition) to form a 27% dispersion solution and attain the prescribed viscosity was in the ratio of 4.0 parts to the solid content in the composition.

EXAMPLE 14

Concentrations of Both Calcium Hydroxide Suspension and Aqueous Aluminum Sulfate Solution Exceeding 12%

(1) Addition of Aqueous Aluminum Sulfate Solution to Calcium Hydroxide Suspension in First Stage The previously mentioned 14% calcium hydroxide suspension and 14% aqueous aluminum sulfate solution were continuously and simultaneously injected at 129 g/min and 49.5 g/min (50% of the reference molar number), respectively, into the inline mixer. (This was the Pipeline Homo Mixer. All the inline mixers used in Example 14 are of the single-stirrer inline mixer type. It is same as the Pipeline Homo Mixer manufactured by Tokushu Kika Kogyo Co., Ltd. in FIG. 1, where the first stirring element 15*a* was removed from the stirring part 15 and was composed of only the second stirring element 15*b*. In other words, the stirring part used here is a single-stirrer Pipeline Homo Mixer.) The mixer was set to rotate at 9000 rpm. The injection was carried out for 16 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following pH restoration (hereinafter referred to as the "first composition") was 12.8.

(2) Addition of Aqueous Aluminum Sulfate Solution in Second Stage

As mentioned in (1) above, the previously mentioned mixture composition (first composition) and 14% aqueous aluminum sulfate solution were continuously and simultaneously injected at 178.5 g/min and 34.5 g/min (35% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as the "second composition") was 12.7.

(3) Addition of Aqueous Aluminum Sulfate Solution in Third Stage

As mentioned in (2) above, the previously mentioned mixture composition (second composition) and 14% aqueous aluminum sulfate solution were continuously and simultaneously injected at 213 g/min and 13 g/min (13% of the reference molar number), respectively, into the inline mixer (Pipeline Homo Mixer), which was set to rotate at 9000 rpm. The injection was carried out for 12 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter referred to as the "third composition") was 12.4.

(4) Addition of Aqueous Aluminum Sulfate Solution in Fourth Stage (End of Reaction)

The addition of aqueous aluminum sulfate solution in the fourth stage was carried out by batch operation (batch method), as in Example 5. Using a reaction vessel which has a stirring apparatus (propeller mixer) inside it, 2260 g of the aforementioned mixture composition (part of the third composition, which was added for 10 minutes continuously) was firstly stocked-up in the reaction vessel and was stirred by the stirring apparatus (propeller mixer). Furthermore, 20 g of 14% aqueous aluminum sulfate solution (2.0 g/min (=2% of the reference molar number)×part of aqueous aluminum sulfate solution which was added for 10 minutes continuously) was dropped by the "batch method" at the rate of 1.0 g/min and added to the aforementioned mixture composition (third composition). In this way, the composition (hereinafter referred to as "post-reaction composition") was obtained following the reaction.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 14 is briefly explained here.

The amount of 14% calcium hydroxide last used is 1290 g, while its solid content is 180.6 g. Therefore, the molar number 'a' of $Ca(OH)_2$ is 2.44 moles.

Furthermore, the total amount of 14% aluminum sulfate added in the plurality of stages is 990 g, while its solid content is 138.6 g. Thus, the molar number 'b' of $Al_2(SO_4)_3$ is 0.405 moles.

Therefore, the mole ratio $(Ca(OH)_2/Al_2(SO_4)_3=a/b)$ is 6.0.

Additionally, the proportion of total amount of aluminum sulfate added was 100% of the reference molar number. The pH value of the mixture composition after the end of the reaction (post-reaction composition) was 12.4.

Furthermore, the amount of dispersion agent required to redisperse the composition after the end of the reaction (post-reaction composition) to form a 27% dispersion solution and attain the prescribed viscosity was in the ratio of 4.5 parts to the solid content in the composition.

EXAMPLE 15

Five Additions in Five Stages, Continuous Additions in All Five Stages; Addition Condition of Aqueous Aluminum Sulfate Solution: Very Small Amount of Addition in First Stage and Very Large Amount in Second Stage (1) Addition of Aqueous Aluminum Sulfate Solution to Calcium Hydroxide Suspension in First Stage The previously mentioned 6% calcium hydroxide suspension and 6% aqueous aluminum sulfate solution were continuously and simultaneously injected at 300 g/min and 2.3 g/min (1% of the reference molar number), respectively, into the single-stirrer inline mixer (Pipeline Homo Mixer), which was set to rotate at 9000 rpm. The injection was carried out for 18 minutes continuously. The mixture composition thus obtained (the composition discharged from said inline mixer) was continuously fed into the pH restoration tank (intermediate tank in this invention) to stay there for 30 minutes and restore the pH. The pH value of the mixture composition following the pH restoration (hereinafter referred to as "first composition") was 12.8.

(2) Addition of Aqueous Aluminum Sulfate Solution in Second Stage

As mentioned in (1) above, the previously mentioned mixture composition (first composition) and 6% aqueous aluminum sulfate solution were continuously and simultaneously injected at 302.3 g/min and 194 g/min (84% of the reference molar number), respectively, into the inline mixer (Pipeline Homo Mixer), which was set to rotate at 9000 rpm. The injection was carried out for 16 minutes continuously. The mixture composition thus obtained (the composition discharged from the inline mixer) was continuously fed into the pH restoration tank (intermediate tank in this invention) and stayed there for 30 minutes to restore the pH. The pH value of the mixture composition following the pH restoration (hereinafter referred to as "second composition") was 12.7.

(3) Addition of Aqueous Aluminum Sulfate Solution in Third Stage

As mentioned in (2) above, the previously mentioned mixture composition (second composition) and 6% aqueous aluminum sulfate solution were continuously and simultaneously injected at 496.3 g/min and 20.8 g/min (9% of the reference molar number), respectively, into the inline mixer (Pipeline Homo Mixer), which was set to rotate at 9000 rpm. The injection was carried out for 14 minutes continuously. The mixture composition thus obtained (the composition discharged from the inline mixer) was continuously fed into the pH restoration tank (intermediate tank in this invention) to stay there for 30 minutes and restore the pH. The pH value of the mixture composition following the pH restoration (hereinafter, referred to as "third composition") was 12.2.

(4) Addition of Aqueous Aluminum Sulfate Solution in Fourth Stage

As mentioned in (2) above, the previously mentioned mixture composition (third composition) and 6% aqueous aluminum sulfate solution were continuously and simultaneously injected at 517.1 g/min and 6.9 g/min (3% of the reference molar number), respectively, into the inline mixer (Pipeline Homo Mixer), which was set to rotate at 9000 rpm. The injection was carried out for 12 minutes continuously. The mixture composition thus obtained (the composition discharged from the inline mixer) was continuously fed into the pH restoration tank (intermediate tank in this invention) to stay there for 30 minutes and restore its pH. The pH value of the mixture composition following the pH restoration (hereinafter referred to as "fourth composition") was 11.2.

(5) Addition of Aqueous Aluminum Sulfate Solution in Fifth Stage (End of Reaction)

As mentioned in (2) above, the previously mentioned mixture composition (fourth composition) and 6% aqueous aluminum sulfate solution were continuously and simultaneously injected at 524 g/min and 6.9 g/min (3% of the reference molar number), respectively, into the inline mixer (Pipeline Homo Mixer), which was set to rotate at 9000 rpm. The injection was carried out for 10 minutes until the end, and the composition after the end of the reaction (post-reaction composition) was thus obtained.

The calculation method of the ratio '(a/b)' of the molar number 'a' of the calcium hydroxide suspension (A) to the molar number 'b' of the total amount of the aqueous aluminum sulfate solution (B) added in the plurality of stages in Example 15 is briefly explained here.

The amount of 6% calcium hydroxide last used is 300 g/min×10 minutes=3000 g, while its solid content is 180 g. Therefore, the molar number 'a' of $Ca(OH)_2$ is 2.43 moles.

Furthermore, the total amount of 6% aluminum sulfate added in the plurality of stages is 230.9 g/min×10 minutes=2309 g, while its solid content is 138.5 g. Thus, the molar number 'b' of $Al_2(SO_4)_3$ is 0.405 moles.

Therefore, the mole ratio $(Ca(OH)_2/Al_2(SO_4)_3=a/b)$ is 6.0.

Additionally, the proportion of total amount of aluminum sulfate added was 100% of the reference molar number. The pH value of the mixture composition after the end of the reaction (post-reaction composition) was 9.7.

Furthermore, the amount of dispersion agent required to redisperse the composition after the end of the reaction (post-reaction composition) to form a 27% dispersion solution and attain the prescribed viscosity was in the ratio of 2.0 parts to the solid content in the composition.

Before carrying out the Example 15, the inventors observed the following. That is, the particle diameters of the produced satin white tended to be greater when the number of additions (=number of reaction stages) of aqueous aluminum sulfate solution was increased and the aluminum sulfate was added in small amounts. The inventors were of the position that, due to the increased number of stages for the addition of aluminum sulfate, the minute satin white crystals formed at the first stage gradually grew bigger through the subsequent addition of aluminum sulfate in the reaction stages that followed the first stage.

Therefore, in order to minimize the diameters of satin white particles, it was considered necessary to "add the largest possible amount of aluminum sulfate at one time (short period) in the initial stage of the reaction (to produce minute and homogenous crystals at one time)" and to "reduce the number of stages of reaction (to control the growth of the crystals thus produced)." The inventors conducted earnest study on this and found that the upper limit of the addition rate of the aluminum sulfate in each of the plurality of stages changed according to the addition rates of the aluminum sulfate among additions in the plurality of stages. Particularly, it was observed that a large quantity of aluminum sulfate could be added in the subsequent second stage by controlling the proportion of aluminum sulfate in the first stage below 10%, while the favorable proportion was 0.1 to 5% and the more favorable proportion was 0.1 to 2%. Furthermore, the crystals can be made minute and homogenous by changing the proportion of aluminum sulfate. Finally, satin white of a minuteness not heretofore available was obtained.

EXAMPLE 16

Three Additions in Three Stages, and Carbon Dioxide Gas Blown with Mixer after Additions (Reaction Molar ratio: 7.1)

The composition after the end of the reaction (post-reaction composition) obtained in Example 1 was brought into contact with carbon dioxide gas (carbon dioxide gas contact process) as follows. In other words, the post-reaction composition and carbon dioxide gas were continuously and simultaneously injected at 496 g/min and 546 g/min (ratio of gas/liquid (mass ratio)=1.1), respectively, into the inline mixer (Pipeline Homo Mixer as the single-stirrer inline mixer), which was set to rotate at 9000 rpm. The injection was carried out for 10 minutes continuously. The pH value of the post-reaction composition which was exposed to carbon dioxide gas in said inline mixer (hereinafter referred to as "carbon dioxide gas contact composition") was 11.7.

Furthermore, the amount of dispersion agent required to redisperse the carbon dioxide gas contact composition to form a 27% dispersion solution and attain the prescribed viscosity was in the ratio of 3.0 parts to the solid content in the composition.

EXAMPLE 17

Carbon Dioxide Gas Blown with Mixer after Redispersion

In the Example 1 mentioned earlier, the composition after the end of the reaction (post-reaction composition) was dehydrated by the filter press 55 (the solid content in the dehydrated composition was approximately 32 to 34%). This was followed by the redispersion 56 of the dehydrated composition in water to make the solid content of 27%. During redispersion 56, poly-acrylic acid dispersion agent (trademark Aron T-50, manufactured by Toa Gosei Kagaku) was added to the water at a ratio of 0.5 parts to the amount of solid content of the composition (the dehydrated composition). The amount of dispersion added was adjusted so that the viscosity of the redispersed composition solution was approximately 10 mPa·s. The "dispersion agent required in the redispersion" (part) in Table 1-2, which will be mentioned later, shows the total amount of redispersion agent used. The composition obtained in this manner by redispersion (hereinafter referred to as "redispersed composition") was exposed to carbon dioxide gas (carbon dioxide gas contact process) as follows. The redispersed composition and carbon dioxide gas were simultaneously and continuously injected at 100 g/min and 500 g/min (ratio of gas/liquid (mass ratio)=5.0), respectively, into the inline mixer (Pipeline Homo Mixer: single-stirrer inline mixer), which was set to rotate at 9000 rpm. The injection was carried out for 10 minutes.

EXAMPLE 18

Addition of Dispersion Agent into Cushion Tank

In the Example 1, the polyacrylic acid dispersion agent (trademark Aron T-50, manufactured by Toa Gosei Kagaku) was simultaneously added to the cushion tank 54, which received the post-reaction composition, at a ratio of 0.5 parts to the amount of solid content of the mixture composition (post-reaction composition). The post-reaction composition that was mixed with the dispersion agent in the cushion tank 54 in this manner was dehydrated by the filter press 55 in the same manner as in Example 1, so as to obtain a composition with solid content of approximately 32 to 34%. This was followed by redispersion 56 of the dehydrated composition in the water to make the solid content 27%.

Furthermore, the amount of dispersion agent required to redisperse the post-reaction composition to form a 27% dispersion solution and attain the prescribed viscosity was in the ratio of 3.0 parts to the solid content in the composition.

The time taken for dehydration by filter press 55 in the Example 18 was reduced as compared to that of Example 1.

COMPARATIVE EXAMPLE 1

Satin White Production by Batch Method

Figure 6:
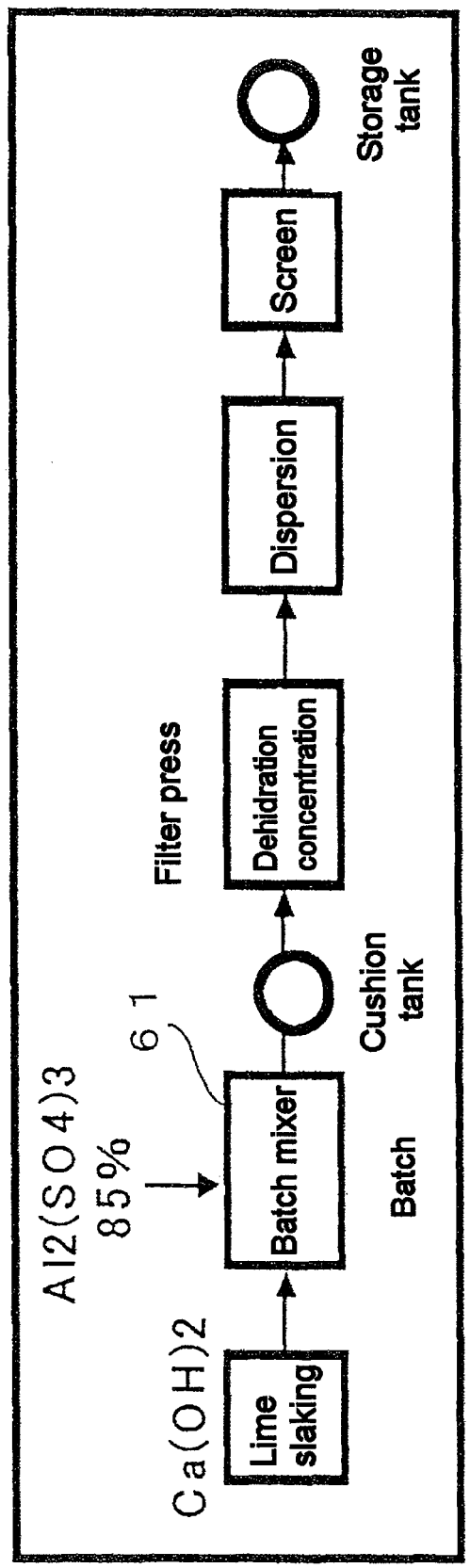
FIG. 6 shows a flow chart illustrating operational procedures of comparative Example 1.

FIG. 6 shows a general flow diagram that illustrates the operating procedure of Comparative example 1. The operation of Comparative example 1 is explained with reference to FIG. 6.

The addition of aqueous aluminum sulfate solution to the calcium hydroxide suspension was similar to the addition of aqueous aluminum sulfate solution in the fourth stage of Example 5 and was carried out by batch operation (batch method). Using a reaction vessel 61, which has a stirring apparatus (propeller mixer, not shown in the figure) inside it, 3000 g of 6% calcium hydroxide suspension was first stocked up in the reaction vessel 61 and stirred by a stirring apparatus (propeller mixer). Furthermore, 1950 g of 6% aqueous aluminum sulfate solution was dropped at the rate of 30 g/min by the "batch method" and added to the calcium hydroxide suspension. In this way the composition (hereinafter referred to as "post-reaction composition") was obtained following the reaction.

The calculation method of the ratio '(a/b)' of the molar number 'a' of the calcium hydroxide suspension (A) to the molar number 'b' of the total amount of the aqueous aluminum sulfate solution (B) added in the plurality of stages in Comparative example 1 is briefly explained here.

The amount of 6% calcium hydroxide last used is 3000 g, while its solid content is 180 g. Thus, the molar number 'a' of $Ca(OH)_2$ is 2.43 moles.

Furthermore, the total amount of 6% aluminum sulfate added in the plurality of stages is 1950 g, while its solid content is 117 g. Thus, the molar number 'b' of $Al_2(SO_4)_3$ is 0.342 moles.

Therefore, the mole ratio $(Ca(OH)_2/Al_2(SO_4)_3=a/b)$ is 7.1.

Additionally, the proportion of total amount of aluminum sulfate added was 85% of the reference molar number, and the pH value of the mixture composition after the end of the reaction (post-reaction composition) was 12.5.

Furthermore, the amount of dispersion agent required to redisperse the composition after the end of the reaction (post-reaction composition) to form a 27% dispersion solution and attain the prescribed viscosity was in the ratio of 3.0 parts to the solid content in the composition.

COMPARATIVE EXAMPLE 2

Addition of Prescribed Amount of Aqueous Aluminum Sulfate Solution at Once

Figure 7:
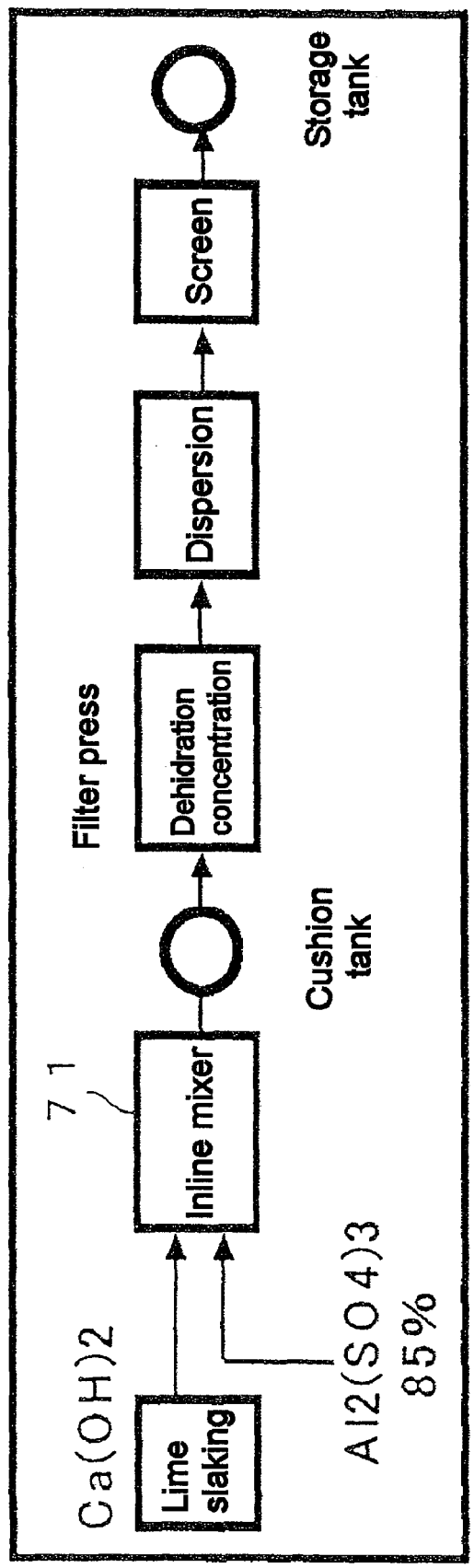
FIG. 7 shows a flow chart illustrating operational procedures of comparative Example 2.

FIG. 7 shows a general flow diagram that illustrates the operating procedure of Comparative example 2. The operation of Comparative example 2 is explained with reference to FIG. 7.

The previously mentioned 6% calcium hydroxide suspension and 6% aqueous aluminum sulfate solution were continuously and simultaneously injected at 300 g/min and 196 g/min (85% of the reference molar number), respectively, into the inline mixer 71. (This was the Pipeline Homo Mixer. The inline mixer used in Comparative example 2 is a single-stirrer inline mixer. It is same as the Pipeline Homo Mixer manufactured by Tokushu Kika Kogyo Co., Ltd. in FIG. 1, where the first stirring element 15a was removed from the stirring part 15 and was composed of only the second stirring element 15b. In other words, the stirring part used here is a single-stirrer Pipeline Homo Mixer.) The mixer was set to rotate at 9000 rpm. The injection was carried out for 10 minutes. Thus, a composition was obtained after the reaction (post-reaction composition).

The calculation method of the ratio '(a/b)' of the molar number 'a' of the calcium hydroxide suspension (A) to the molar number 'b' of the total amount of the aqueous aluminum sulfate solution (B) added in the plurality of stages in Comparative example 2 is briefly explained here.

The amount of 6% calcium hydroxide last used is 300 g/min×10 minutes=3000 g, while its solid content is 180 g. Thus, the molar number 'a' of $Ca(OH)_2$ is 2.43 moles.

Furthermore, the total amount of 6% aluminum sulfate added in the plurality of stages is 196 g/min×10 min=1960 g, while its solid content is 117.6 g. Thus, the molar number 'b' of $Al_2(SO_4)_3$ is 0.344 moles.

Therefore, the mole ratio $(Ca(OH)_2/Al_2(SO_4)_3=a/b)$ is 7.1.

Additionally, the proportion of total amount of aluminum sulfate added was 85% of the reference molar number, and the pH value of the mixture composition after the end of the reaction (post-reaction composition) was 12.5.

Furthermore, the amount of dispersion agent required to redisperse the composition after the end of the reaction (post-reaction composition) to form a 27% dispersion solution and attain the prescribed viscosity was in the ratio of 3.0 parts to the solid content in the composition.

The results of the assessment of satin white mixture compositions thus obtained in the examples and comparative examples are given below in Tables 1-1 and 1-2.

TABLE 1-1

| | | | | | | | | | | | | | | pH restration time in between additions (min) | pH of mixture composition in subsequent addition |
|---|---|---|---|---|---|---|---|---|---|---|---|---|---|---|---|
| | | | | | | | Reaction conditions | | | | | | | | |
| | | | | | | $Al_2(SO_4)_3$ addition rate*[1] | | | | | | | Reaction molar ratio (a/b)*[3] | | |
| | $Ca(OH)_2$ Conc. (%) | $Al_2(SO_4)_3$ Conc. (%) | Reaction Temp (°C.) | 1st stage (%) | 2nd stage (%) | 3rd stage (%) | 4th stage (%) | 5th stage (%) | 6th stage (%) | 7th stage (%) | Total*[2] (%) | | | | |
| Example 1 | 6 | 6 | 40 | 45 | 35 | 5 | | | | | 85 | 7.1 | | 30 | 12.5~12.7 |
| Example 2 | 6 | 6 | 40 | 45 | 35 | 5 | | | | | 85 | 7.1 | | 1 | 11.8~12.2 |
| Example 3 | 6 | 6 | 40 | 80 | 15 | 5 | | | | | 100 | 6.0 | | 30 | 12.4~12.8 |
| Example 4 | 6 | 6 | 40 | 25 | 70 | 5 | | | | | 100 | 6.0 | | 30 | 12.4~12.8 |
| Example 5 | 6 | 6 | 40 | 50 | 35 | 13 | (B)2 | | | | 100 | 6.0 | | 30 | 12.4~12.8 |
| Example 6 | 6 | 6 | 40 | 30 | 20 | 20 | 20 | 15 | | | 105 | 5.7 | | 30 | 12.4~12.7 |
| Example 7 | 6 | 6 | 40 | 15 | 15 | 15 | 15 | 15 | 15 | 10 | 100 | 6.0 | | 30 | 12.4~12.8 |
| Example 8 | 10 | 6 | 40 | 50 | 35 | 13 | (B)2 | | | | 100 | 6.0 | | 30 | 12.4~12.8 |
| Example 9 | 6 | 10 | 40 | 50 | 35 | 13 | (B)2 | | | | 100 | 6.0 | | 30 | 12.4~12.8 |
| Example 10 | 6 | 6 | 40 | 45 | 35 | 5 | | | | | 85 | 7.1 | | 0.15 | 10.8~11.6 |
| Example 11 | 6 | 6 | 40 | 30 | 20 | 20 | 20 | 25 | | | 115 | 5.2 | | 30 | 12.4~12.7 |
| Example 12 | 6 | 6 | 40 | 45 | 28 | | | | | | 73 | 8.2 | | 30 | 12.6~12.8 |
| Example 13 | 6 | 14 | 40 | 50 | 35 | 13 | (B)2 | | | | 100 | 6.0 | | 30 | 12.4~12.8 |
| Example 14 | 14 | 14 | 40 | 50 | 35 | 13 | (B)2 | | | | 100 | 6.0 | | 30 | 12.4~12.8 |
| Example 15 | 6 | 6 | 40 | 1 | 84 | 9 | 3 | 3 | | | 100 | 6.0 | | 30 | 11.2~12.8 |
| Example 16 | 6 | 6 | 40 | 45 | 35 | 5 | $CO_2$gas | | | | 85 | 7.1 | | 30 | 12.5~12.7 |
| Example 17 | 6 | 6 | 40 | 45 | 35 | 5 | *$CO_2$ gas after redispersion | | | | 85 | 7.1 | | 30 | 12.5~12.7 |
| Example 18 | 6 | 6 | 40 | 45 | 35 | 5 | | | | | 85 | 7.1 | | 30 | 12.5~12.7 |
| Comparative example 1 | 6 | 6 | 40 | (B)85 | | | | | | | 85 | 7.1 | | — | — |
| Comparative example 2 | 6 | 6 | 40 | 85 | | | | | | | 85 | 7.1 | | — | — |

*[1](B) indicates the "batch method" was employed in the addtion.
*[2]Ratio (%) of molar number of $Al_2(SO_4)_3$ to reference molar number assuming molar ratio of $Ca(OH)_2/Al_2(SO_4)_3 = 6/1$ is the reference molar ratio.
*[3]Molar ratio of $Ca(OH)_2/Al_2(SO_4)_3$

TABLE 1-2

| | Product evaluation | | | | | | | | |
|---|---|---|---|---|---|---|---|---|---|
| | Observation by electron microscope | | | | | | | | |
| | Particle shape Sensory evaluation | Unreacted raw materials Sensory evaluation | Aggregates Sensory evaluation | By-product Sensory evaluation | Average particle diameter μm | pH of Slurry | pH of dispersion liquid | Disperser necessary for redispersion part | Area ratio of peak by XRD (X1/X2) |
| Example 1 | ◎ | Δ | Δ | ○ | 0.44 | 12.5 | 12.5 | 3.0 | 0.2 |
| Example 2 | ◎ | Δ | Δ | ○ | 0.41 | 12.5 | 12.5 | 3.0 | 0.2 |
| Example 3 | ◎ | ○ | ○ | ○ | 0.49 | 10.6 | 10.6 | 2.5 | 0.13 |
| Example 4 | ◎ | ○ | ○ | ○ | 0.46 | 9.7 | 9.7 | 2.5 | 0.11 |
| Example 5 | ◎ | ○ | ○ | ○ | 0.48 | 9.4 | 9.4 | 1.0 | 0.1 |
| Example 6 | ○ | ○ | ○ | Δ | 0.73 | 9.2 | 9.2 | 1.5 | 0.08 |
| Example 7 | ○ | ○ | ○ | ○ | 1.17 | 9.6 | 9.6 | 1.5 | 0.05 |
| Example 8 | ◎ | ○ | ○ | ○ | 0.56 | 9.6 | 9.6 | 2.0 | 0.11 |
| Example 9 | ○ | ○ | ○ | ○ | 0.62 | 9.7 | 9.7 | 2.0 | 0.12 |
| Example 10 | ○ | Δ | Δ | Δ | 0.62 | 12.5 | 12.5 | 3.5 | 0.22 |
| Example 11 | ○ | ○ | ○ | Δ | 0.68 | 8.9 | 8.9 | 4.0 | 0.03 |
| Example 12 | ◎ | X | Δ | ○ | 0.47 | 12.6 | 12.6 | 5.5 | 0.45 |
| Example 13 | ○ | Δ | Δ | Δ | 0.58 | 12.2 | 12.2 | 4.0 | 0.12 |

TABLE 1-2-continued

| | Product evaluation | | | | | | | |
|---|---|---|---|---|---|---|---|---|
| | Observation by electron microscope | | | | | | | |
| | Particle shape Sensory evaluation | Unreacted raw materials Sensory evaluation | Aggregates Sensory evaluation | By-product Sensory evaluation | Average particle diameter μm | pH of Slurry | pH of dispersion liquid | Disperser necessary for redispersion part | Area ratio of peak by XRD (X1/X2) |
|---|---|---|---|---|---|---|---|---|---|
| Example 14 | ○ | Δ | Δ | Δ | 0.62 | 12.4 | 12.4 | 4.5 | 0.12 |
| Example 15 | ◎ | ○ | ○ | ○ | 0.26 | 9.7 | 9.7 | 2.0 | 0.12 |
| Example 16 | ◎ | ○ | ○ | ○ | 0.44 | 11.7 | 11.7 | 3.0 | 0.15 |
| Example 17 | ◎ | Δ | Δ | ○ | 0.44 | 12.5 | 12 | 3.0 | 0.2 |
| Example 18 | ◎ | Δ | Δ | ○ | 0.44 | 12.5 | 12.5 | 3.0 | 0.2 |
| Comparative example 1 | Δ | Δ | Δ | ○ | 0.88 | 12.5 | 12.5 | 3.0 | 0.23 |
| Comparative example 2 | X | Δ | X | X | 0.56 | 12.5 | 12.5 | 4.0 | 0.5 |

Here, in the Examples 1 through 18, the aqueous aluminum sulfate solution was added to calcium hydroxide suspension in the plurality of stages (More than one stage. In Table 1-1, the stages from 1 to 7 in "addition rate of $Al_2(SO_4)_3$" in the "reaction conditions" are the stages for adding aqueous aluminum sulfate solution to calcium hydroxide suspension.) Furthermore, at least any one of the plurality of additions in respective stages thereof of the aqueous aluminum sulfate solution to the calcium hydroxide suspension was carried out by a continuous addition in which the aqueous aluminum sulfate solution was continuously added to the calcium hydroxide suspension, which was being transferred continuously. In Table 1-1, the letter "B" in the stages 1 to 7 columns in "additive rate of $Al_2(SO_4)_3$" in the "reaction condition" indicates that the additions in the corresponding stages are carried out by the batch method. Wherever "B" is not indicated, the additions are carried out by the continuous addition method.

In other words, the first addition in the first stage of the plurality of stages of the aqueous aluminum sulfate solution to the calcium hydroxide suspension in the Examples 1 through 18 was carried out by the continuous addition method.

Furthermore, in the Examples 1 through 18, all the additions of the aqueous aluminum sulfate solution to the calcium hydroxide suspension except the last-stage addition (for example, the third stage is the last stage in Example 1, while the fourth stage is the last stage in Example 5). (For example, additions in the first and second stages excluding the third stage as the last stage in Example 1, and additions in the first through the third stages excluding the fourth stage as the last stage in Example 5 were done using the continuous addition.

The period between the subsequent addition, which is applied to the second or later stage of the addition of the aqueous aluminum sulfate solution to the calcium hydroxide suspension, and the immediately preceding addition of the subsequent addition is shown as the "pH restoration time (min) between two additions" in "Reaction Conditions" in Table 1-1. It is 1 minute in the case of Example 2, 0.15 minutes in Example 10 and 30 minutes in the other examples.

Furthermore, in Table 1-1, the pH value of the composition where the aqueous aluminum sulfate solution (B) is to be added in the subsequent addition which is applied to the second or later stage of the addition of the aqueous aluminum sulfate solution to the calcium hydroxide suspension is shown as "pH of mixture composition in subsequent addition" in "Reaction Conditions," which is at least 11.0 in all the examples except Example 10.

Additionally, the ratio '(a/b)' of the molar number 'a' of the calcium hydroxide suspension (A) to the molar number 'b' of the total amount of the aqueous aluminum sulfate solution (B) added in the plurality of stages is shown as "reaction molar ration (a/b)" in "Reaction conditions" in Table 1-1 and it is in the range of 5.5 to 8.0 except Examples 11 and 12.

The amounts of the aqueous aluminum sulfate solution added to the calcium hydroxide suspension in the plurality of stages are shown as a percentage amount of aqueous aluminum sulfate solution in the reference molar number (as described before, the reference molar number is one-sixth of the molar number of calcium hydroxide suspension). It is given as "$Al_2SO_4$ addition rate" in "Reaction Conditions" in Table 1-1. For example, in Example 1, the amount of aqueous aluminum sulfate solution added in the first stage is 45% of the reference molar number, 35% of the reference molar number in second stage and 5% in third stage. Thus, the total (the total of stages 1 to 3 in Example 1) amount of aqueous aluminum sulfate solution added is shown as 85% of the reference molar number (in the total column in %).

Therefore, in Examples 1 through 18 the amount of the aqueous aluminum sulfate solution (B) added in the first stages in (the "First Stage" column in Table 1-1) are not more than 85% of the reference molar number. Similarly, the molar numbers of the total amounts of the aqueous aluminum sulfate solution (B) added in the second stage (the "Second Stage" column in Table 1-1) and the first stage (the "First Stage" column in Table 1-1) in the Examples 1 through 18 do not exceed 98% of the reference molar number.

Furthermore, in Example 15 the molar number of the amount of the aqueous aluminum sulfate solution (B) added in stage 1 (the "First Stage" column in Table 1-1) is not more than 10% of the aforementioned reference molar number (1% to be precise).

Additionally, the number of additions of the aqueous aluminum sulfate solution to the calcium hydroxide suspension in all the examples except Example 12 are at least three times. (In Table 1-1 the number of additions are indicated with numbers in stages 1 to 7, while the columns with no numbers indicate that no addition is carried out in that particular stage.)

Furthermore, the pH of the composition (post-reaction composition) that include the calcium trisulfoaluminate (C) obtained after the completion of the additions of the aqueous aluminum sulfate solution (B), in the examples and comparative examples, are shown in Table 1-2 as "slurry pH" under "Product Evaluation".

Additionally, in all examples and comparative examples, the compositions (post-reaction composition, original composition), which include the calcium trisulfoaluminate (C) obtained after the completion of adding the aqueous aluminum sulfate solution (B), are dehydrated and further redispersed in water to form slurry-state redispersed compositions. In other words, the post-reaction compositions in all the working and comparative examples are dehydrated by the filter press 55 to make the 32 to 34% solid-content dehydrated compositions. This is followed by the redispersion 56 of the dehydrated composition in water to make 27% solid content compositions. The pH value of these redispersed composition are shown in Table 1-2 as "pH of dispersion liquid" under "Product evaluation."

Furthermore, in Example 18 polyacrylic acid dispersion agent is placed in the cushion tank 54 (dispersion agent and post-reaction composition are mixed in the cushion tank 54; disperser addition process), which has received the post-reaction composition, followed with dehydration by filter press 55 to obtain a composition with a solid content of 32 to 34%. This is followed by redispersion 56 of the dehydrated composition in water to make 27% solid content compositions. Thus, the dispersion addition process is carried out before dehydrating the post-reaction composition, obtained after completing all the stages (stages 1-3) of adding the aqueous aluminum sulfate solution (B), which includes the calcium trisulfoaluminate (C).

Additionally, in Examples 16 and 17, the composition (post-reaction composition) produced after all additions of the aqueous aluminum sulfate solution (B) in the plurality of stages, wherein the composition includes the calcium trisulfoaluminate (C), was brought into contact with carbon dioxide gas in the carbon dioxide gas contact process. In other words, in the Example 16 the post-reaction composition and carbon dioxide gas are injected into the inline mixer, and the post-reaction composition is contacted to carbon dioxide gas in the inline mixer. Furthermore, in Example 17 the mixture composition after the end of the reaction (post-reaction composition) is dehydrated by filter press 55 and further redispersed 56 in water. Thus, the redispersed composition and carbon dioxide gas are then injected into the inline mixer. In this way, the carbon dioxide gas contact process is carried out to make the post-reaction composition contact with the carbon dioxide gas inside the inline mixer.

Furthermore, the concentration of the basic ingredient calcium hydroxide suspension (A) is shown in Table 1-1 as "Ca(OH)$_2$ concentration (%)" under "Reaction Conditions," while the concentration of the basic ingredient aqueous aluminum sulfate solution (B) is shown in Table 1-1 as "Al$_2$(SO$_4$) concentration (%)" under "Reaction Conditions." Additionally, the reaction temperature in all the working and comparative examples is 40° C. (in the "Reaction Temperature" column).

Additionally, the average particle diameters of the calcium trisulfoaluminate (C) obtained in these working and comparative examples are shown in Table 1-1 as "average particle diameter" (unit: micrometer) under "Product evaluation." The method for measurement of the average particle diameter is described below:

(Determination of Average Particle Diameter by Precipitation Method)

The particle size distribution of the composition including satin white was determined using the Sedigraph 5100 manufactured by Micromeritics Corporation in the USA, and the average particle diameter (d50) corresponding to 50 accumulated mass % was then calculated. The composition including satin white used in the determination of particle size distribution was obtained by the dilution and dispersion of the dispersion solution (redispersed composition), including the satin white thus produced, in 0.1% aqueous solution of phosphate dispersing agent (pyrophosphate of soda) so that the pigment solid content concentration became about 4%. Furthermore, the measurement conditions used were as follows: specific gravity of satin white: 1.77 g/cm$^3$; and measurement temperature: 35° C.

Incidentally, average particle diameter of the satin white reference sample (satin white BL, manufactured by Shiraishi Kogyo) measured using the above method was 0.47 micrometer.

Furthermore, the particle shape of the obtained calcium trisulfoaluminate (satin white), presence or absence of unreacted raw materials, presence or absence of aggregates and presence or absence of byproducts in these examples and comparative examples were evaluated using electron microscopy.

Specifically, the composition (approximately 4% dispersion solution) used in the determination of average particle diameter was applied to fine paper and left to dry. Then the particulate shape of the calcium trisulfoaluminate (satin white), presence or absence of unreacted raw materials, presence or absence of aggregates and presence or absence of byproducts were observed by putting the fine paper coated in satin white under an electron microscope at 5000× magnification. The items were evaluated by comparing the results with that of the reference sample (satin white BL, manufactured by Shiraishi Kogyo) which was also treated and observed by the same methods. The item-wise results of the assessment are given in Table 1-2 as "Particle shape," presence or absence of "Unreacted raw materials," presence or absence of "aggregates", and presence or absence of "Byproducts" under the subheading "Observation by electron microscope" under "Product evaluation".

Item: Subjective evaluation of particle shape of satin white (In Table 1-2, "Particle shape" in "Observation by electron microscope" under "Product evaluation")

◎: The needle shapes are nearly uniform and minute, like the reference sample.

○: The needle shapes are nearly uniform but slightly larger than the reference sample.

Δ: The sizes of the needle shapes are irregular, and are mixed with particles that are clearly larger than the reference sample.

×: Do not possess a needle shape

Item: Presence or absence of unreacted raw materials (in Table 1-2, presence or absence of "Unreacted raw materials" under "Observation by electron microscope" in "Product evaluation")

○: No unreacted calcium hydroxide was found.

Δ: Unreacted calcium hydroxide was found in a small amount.

×: Unreacted calcium hydroxide was found in a large amount.

Item: Presence or absence of large size aggregates (aggregates of mainly unreacted slaked lime) (Table 1-2, presence or absence of "aggregates" under Observation by electron microscope" in "Product evaluation")

○: Aggregates were not present.

Δ: Aggregates were present in a small amount.

×: Aggregates were present in a large amount.

Item: Presence or absence of reaction byproduct (Table 1-2, presence or absence of "Byproduct" under "Observation by electron microscope" in "Product evaluation")

○: No formation of calcium sulfate byproduct was found.

Δ: Formation of calcium sulfate byproduct was found in a small amount.

×: Formation of calcium sulfate byproduct was found in a large amount.

Furthermore, in the examples and comparative examples, absorption filtration (solid components separation method which extracts solid components from a suspension) is carried out on the composition (post-reaction composition, suspension), which includes the calcium trisulfoaluminate (C) to be obtained, by using #6 filter paper (manufactured by Advantec Co., Ltd.), and a solid cake-shaped dehydration cake is prepared from the post-reaction composition. The cake is then placed (laid out) on the sample stage (made of glass) for X-ray diffraction. After that, the surface of the sample placed on the glass sample stage is properly leveled using a spatula or spurtle so that there is no roughness or scratching on the surface. Thus, the surface conditioning of the sample to be used for X-ray diffractometry is done (sample placement method wherein the solid components extracted by solid components separation method are placed on the sample stage for X-ray diffractometry).

In this manner, the conditioned dehydration cake, which is placed on the sample stage, is analyzed by X-ray diffractometry using Rigaku Corporation's MiniFlex desktop type X-ray diffractometer (X-ray generation part: output 30 KV, 15 mA; X-ray tube standard: Cu) (X-ray radiation method wherein the solid components placed on the sample stage by the sample placement method are irradiated by X-rays). The operating conditions of said diffraction apparatus are as follows: X-ray wavelength 1.5421 angstrom ($\lambda$=1.5421 Å), measurement rate (step): 0.04 count/second, determination range: 5-20, and the data-conversion mode.

The amount (concentration) of the calcium trisulfoaluminate (C) was assessed in the X-ray diffractometry using the two peak areas produced by the calcium trisulfoaluminate (C), i.e., first peak of 8-10 counts range (take the first peak area as s1) and second peak of 15.5-17 counts range (take the second peak area as s2). Because calcium hydroxide produces a third peak in the 17.5-19 counts range (take the third peak area as s3), the ratio (WA/WC) (where, WA is the amount of calcium hydroxide in the dehydration cake and WC is the amount of (C) calcium trisulfoaluminate) is assessed here by the equation $s3/(s1+s2)$.

The values of $s3/(s1+s2)$ in the working and comparative examples are shown in Table 1-2 in the "Peak Area Ratio by XRD (X1/X2)" column under "Product evaluation."

As mentioned above, the manufacturing method of this invention can produce a very small, homogenous particle shape of calcium trisulfoaluminate that is applicable to the blade coating of coated paper used for printing. Furthermore, it can prevent or decrease the formation of unreacted calcium hydroxide residue, as well as prevent or decrease the formation of byproducts such as aluminum oxide and calcium sulfate. Thus the manufacturing method of this invention can produce high-quality calcium trisulfoaluminate.

Additionally, if a high-quality satin white (where there is almost no unreacted calcium hydroxide residue and no adulteration of calcium sulfate produced by the collateral reaction) is produced through the manufacturing method of this invention, the stability of the satin white dispersion solution will improve and subsequently decrease the amount of dispersion agent required. Therefore, this method is also economical. Additionally, the high-quality satin white produced by the manufacturing method of this invention also has the excellent characteristic of preventing color-fade in the coated paper for printing due to alkali since the alkaline of the satin white dispersed liquid may be maintained low.

Additionally, as shown in Example 15, a heretofore unobtainable very minute satin white (average particle diameter 0.26 micrometer), was obtained by controlling the addition rate of aluminum sulfate to a reference molar number of less than 10% in the first stage of reaction. The more preferable rate is 0.1 to 5% and the most preferable rate is 0.1 to 2% (the rate in Example 15 is 1%).

Furthermore, as given in the "Area ratio of peak (X1/X2) by XRD" column under "Product evaluation" in Table 1-2, the evaluation of the amount (concentration, quality) of the calcium trisulfoaluminate (C) produced has also become more accurate by XRD peak area ratio and '$s3/(s1+s2)$'.

It was thus made clear in Examples 16 and 17 that carrying out the carbon dioxide gas contact process, wherein the composition including the calcium trisulfoaluminate (C) (which was produced after the completion of all additions in the plurality of stages of the aqueous aluminum sulfate solution (B)) is in contact with carbon dioxide gas, can reduce the alkaline of the composition including the calcium trisulfoaluminate (C). For example, the conditions in Examples 16 and 17 would be same as Example 1 without the carbon dioxide gas contact process. Now, the dispersion solution pH in both Example 16 (dispersion solution pH 11.7) and Example 17 (dispersion solution pH 12) are lower than that of the Example 1 (dispersion solution pH 12.5).

In Example 18, a polyacrylic acid dispersion agent was added to the cushion tank 54, which received the post-reaction composition (the dispersion agent mixes with the post-reaction composition in the cushion tank 54), followed by dehydration (dehydration process) by filter press 55 to make the solid content approximately 32 to 34%. The dehydrated composition was further redispersed 56 in water (redispersion process) to make the solid content 27%. If in the composition including the calcium trisulfoaluminate (C) (post-reaction composition), which was obtained following completion of the aforementioned stages of adding the aqueous aluminum sulfate solution (B) (stages 1 to 3), the disperser addition process is carried out before the dehydration process, dehydration can be smoothly carried out in the dehydration process. Additionally, the calcium trisulfoaluminate (C) can be properly dispersed in the redispersed composition in the redispersion process.

Furthermore, the mixing means, which produces the mixture composition by continuously stirring and mixing the aqueous aluminum sulfate solution (B) to the continuously transferred calcium hydroxide suspension (A), used in the non-last continuous additions (the non-last continuous additions in FIG. 4, which shows the operation of Example 1, are carried out by inline mixer 51a and 51b, while the last addition in the same diagram is carried out by inline mixer 51c) in all the examples are inline mixers. (The inline mixers used in all the examples are single-stirrer inline mixers, specifically Tokushu Kika Kogyo Co., Ltd. of Pipeline Homo Mixer, whose first stirring element 15a is removed from the stirring part 15 and is composed of only the second stirring element 15b. In other words, the procedure used a single-stirrer Pipeline Homo Mixer). Then, the intermediate tank, which continuously collects the mixture composition produced by the inline mixer and stores it for a prescribed period of time, is the pH restoration tank that is placed just next to the inline mixer. For example, in FIG. 4 which shows the operation of Example 1 the pH restoration tank 53a is the intermediate tank for the mixing means inline mixer 51a. Similarly, the pH restoration tank 53b is the intermediate tank for the mixing means inline mixer 51b.

As mentioned earlier, the predetermined period of time that the mixture composition stays in the intermediate tank, as shown in the column "pH restoration time (min.) between additions" under "Reaction conditions" in Table 1-1, are 1 minute in Example 2 and 0.15 minutes in Example 10. This residence time is 30 minutes in all the other examples.

Furthermore, the staying time is set in all the examples except in Example 10 in such a way that the pH ("pH of mixture composition in subsequent addition" under "Reaction condition" in Table 1-1) of the mixture composition, to which the aqueous aluminum sulfate solution (B) is added in the immediately subsequent addition (in other words, addition after the intermediate tank) of any of the aforementioned additions (addition by mixing means), is at least 11.0.

Additionally, the above-mentioned additions (addition by mixing means) are non-last continuous additions.

Additionally, the mixing means "inline mixer" (single-stirrer inline mixer, specifically Tokushu Kika Kogyo Co., Ltd. of Pipeline Homo Mixer, whose first stirring element 15a was removed from the stirring part 15 and was thus composed of only the second stirring element 15b; in other words, a single-stirrer Pipeline Homo Mixer)], as shown in FIG. 1, also includes the main body 13, which has an internal space 13a wherein the mixture of the calcium hydroxide suspension (A) and the aqueous aluminum sulfate solution (B) continuously flows, and stirring part 15 (composed of the second stirring element 15b) which moves (rotates, in this case) when the mixture is in contact with the mixture in the internal space 13a.

What is claimed is:

1. A method for producing calcium trisulfoaluminate (C) by reaction of a calcium hydroxide suspension (A) with an aqueous aluminum sulfate solution (B), comprising:
adding the aqueous aluminum sulfate solution (B) to the calcium hydroxide suspension (A) in a plurality of stages wherein the aqueous aluminum sulfate solution (B) is added to the calcium hydroxide suspension (A) by a continuous addition in at least one of the plurality of stages and wherein the aqueous aluminum sulfate solution (B) is added continuously in the at least one of the plurality of stages to the calcium hydroxide suspension (A) being transferred continuously.

2. The method according to claim 1 wherein the continuous addition in the at least one of the plurality of stages comprises an addition in a first stage.

3. The method according to claim 2 wherein all additions in the plurality of stages except an addition in a last stage are the continuous addition.

4. The method according to claim 1 wherein a subsequent addition corresponding to an addition in a second or later stage is conducted after a predetermined period of time lapses from an addition immediately preceding the subsequent addition.

5. The method according to claim 4 wherein the predetermined period of time is 15 or more seconds.

6. The method according to claim 1 wherein a subsequent addition corresponding to an addition in a second or later stage is made for a composition which the aqueous aluminum sulfate solution (B) is added to in the subsequent addition as a pH value of the composition is 11.0 or higher.

7. The method according to claim 1 wherein a ratio '(a/b)' of a molar number 'a' of the calcium hydroxide suspension (A) to a molar number 'b' of the total aqueous aluminum sulfate solution (B) added in the plurality of stages is from 5.5 to 8.0.

8. The method according to claim 1 wherein a molar number of the aqueous aluminum sulfate solution (B) is added in a first stage of the plurality of stages, the molar number being 85% or less of a reference molar number of $1/6$ of a molar number of the calcium hydroxide suspension (A), and
wherein a total addition molar number of the aqueous aluminum sulfate solution (B) added in the first stage and a second stage of the plurality of stages is 98% or less of the reference molar number.

9. The method according to claim 8 wherein the molar number of the aqueous aluminum sulfate solution (B) added in the first stage is 10% or less of the reference molar number.

10. The method according to claim 8 wherein additions in the plurality of stages comprise additions in at least three stages.

11. The method according to claim 10 wherein a pH value of a composition including the calcium trisulfoaluminate (C) produced after completion of all additions of the aqueous aluminum sulfate solution (B) in the plurality of stages is 12.0 or less.

12. The method according to claim 1 further comprising:
a dehydration process for making a dehydrated composition by dehydrating a composition including the calcium trisulfoaluminate (C) after completion of additions of the aqueous aluminum sulfate solution (B) in the plurality of stages; and
a redispersion process for making a redispersed slurry composition by adding water to the dehydrated composition obtained in the dehydration process.

13. The method according to claim 12 further comprising: a disperser addition process for adding a disperser, before the dehydration process, to the composition including the calcium trisulfoaluminate (C) after completion of all additions of the aqueous aluminum sulfate solution (B) in the plurality of stages.

14. The method according to claim 1 further comprising: a carbon dioxide contact process for making carbon dioxide gas contact with the composition including the calcium trisulfoaluminate (C) produced after completion of all additions of the aqueous aluminum sulfate solution (B) in the plurality of stages.

15. The method according to claim 1 wherein at least either concentration of the calcium hydroxide suspension (A) or the aqueous aluminum sulfate solution (B) is 12 or less wt%.

16. The method according to claim 1 wherein an average particle diameter of the calcium trisulfoaluminate (C) is from 0.1 to 1.5 μm.

17. A method for producing calcium trisulfoaluminate (C) by reaction of a calcium hydroxide suspension (A) being transferred continuously with an aqueous aluminum sulfate solution (B), comprising:
adding the aqueous aluminum sulfate solution (B) to the calcium hydroxide suspension (A) in a plurality of stages; and
in each stage, adding an amount of the aqueous aluminum sulfate solution (B) which is limited within a tolerable capacity of the reaction to a composition of the calcium hydroxide suspension (A) and the calcium trisulfoaluminate (C),
between a stage and a subsequent stage, taking a predetermined time interval so as to restore the reactivity of the calcium hydroxide.

18. The method according to claim 17, wherein restoration of the reactivity is measured by a pH value of the composition.

* * * * *